(12) United States Patent
Kitano et al.

(10) Patent No.: US 6,752,444 B2
(45) Date of Patent: Jun. 22, 2004

(54) DEVICE INSTALLATION APPARATUS FOR MOVING BODY

(75) Inventors: Toyoaki Kitano, Tokyo (JP); Masahiro Ieda, Tokyo (JP); Osamu Kono, Tokyo (JP); Yasuhisa Nakamura, Tokyo (JP); Shimon Okada, Tokyo (JP); Kei Kasuga, Tokyo (JP); Shinichi Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/332,399

(22) PCT Filed: May 28, 2001

(86) PCT No.: PCT/JP01/04432

§ 371 (c)(1),
(2), (4) Date: Jan. 8, 2003

(87) PCT Pub. No.: WO02/096712

PCT Pub. Date: Dec. 5, 2002

(65) Prior Publication Data

US 2004/0026947 A1 Feb. 12, 2004

(51) Int. Cl.$^7$ ................................................. B60P 3/05
(52) U.S. Cl. ................... 296/24.1; 296/64; 296/37.8; 296/65.09; 296/65.17
(58) Field of Search ................ 296/24.1, 64, 65.17, 296/37.8, 65.09, 69, 65.01; 224/275; 701/49

(56) References Cited

U.S. PATENT DOCUMENTS

| | | | | |
|---|---|---|---|---|
| 1,306,498 A | * | 6/1919 | Moses | .................... 296/64 |
| 4,685,729 A | * | 8/1987 | Heesch et al. | ........... 296/65.17 |
| 5,067,625 A | * | 11/1991 | Numata | ................... 220/827 |
| 5,397,160 A | * | 3/1995 | Landry | ................... 296/37.8 |
| D361,972 S | * | 9/1995 | Ney et al. | ................ D12/195 |
| 5,611,589 A | * | 3/1997 | Fujii et al. | ............... 296/65.09 |
| 5,897,155 A | * | 4/1999 | Kerner et al. | ............ 296/37.8 |
| 5,951,084 A | * | 9/1999 | Okazaki et al. | ............... 296/64 |
| 6,003,927 A | * | 12/1999 | Korber et al. | ............ 296/37.8 |
| 6,135,529 A | * | 10/2000 | De Angelis et al. | ....... 296/37.8 |
| 6,203,088 B1 | * | 3/2001 | Fernandez et al. | ......... 296/37.8 |
| 2003/0197392 A1 | * | 10/2003 | Clark et al. | ................ 296/24.1 |
| 2003/0234550 A1 | * | 12/2003 | Brooks et al. | ............. 296/24.1 |

FOREIGN PATENT DOCUMENTS

| | | | |
|---|---|---|---|
| FR | 2 829 081 | * | 3/2003 |
| JP | 03-118251 A | | 5/1991 |
| JP | 4-71939 A | | 3/1992 |
| JP | 6-49220 U | | 7/1994 |
| JP | 10-297391 A | | 11/1998 |
| JP | 11-78693 A | | 3/1999 |
| JP | 11-129815 A | | 5/1999 |
| JP | 11321465 | * | 11/1999 |

* cited by examiner

Primary Examiner—Kiran Patel
(74) Attorney, Agent, or Firm—Birch, Stewart, Kolasch & Birch, LLP

(57) ABSTRACT

A central console unit is disposed in a position between a driver's seat and a front-passenger's seat in a motor vehicle as a mobile body and disposes desired devices such as a CD player, a cassette tape player, a DVD player, or the like, is arranged to allow the central console unit to be positioned along a rail to a predetermined position corresponding to each of the seats in the motor vehicle.

13 Claims, 50 Drawing Sheets

FIG.12

| | CENTER CONSOLE UNIT POSITION | DISPLAY PART SET VALUE | DEVICE OPERATION CONTROL SET VALUE |
|---|---|---|---|
| 1 (INITIAL) | 0 cm | HOUSED | HOUSED |
| 2 (DRIVER'S SEAT) | 5 cm | HOUSED | PROJECTED |
| 3 (FRONT-PASSENGER'S SEAT) | 15 cm | PROJECTED | PROJECTED |
| 4 (INTERMEDIATE SEATS) | 60 cm | PROJECTED | PROJECTED |
| 5 (REAR SEATS) | 120 cm | PROJECTED | PROJECTED |

FIG.20

XXXX BOOKSTORE — 2001

6-CHOME, ICHIBAN-CHO, TACHIKAWA-SHI, TOKYO — 2002

MAY 28, 2001 (MON) — 2003

| | |
|---|---|
| BOOKS (EXCLUSIVE OF CONSUMPTION TAX) | ¥3,000 |
| CONSUMPTION TAX | ¥150 |
| EXPENSED | ¥3,150 |
| RECEIVED | ¥10,000 |
| CHARGE | ¥6,850 |

2004　　2005

DEVICE INSTALLATION APPARATUS FOR MOVING BODY

This application is the national phase under 35 U.S.C. §371 of PCT International Application No. PCT/JP01/04432 which has an International filing date of May 28, 2001, which designated the United States of America.

TECHNICAL FIELD

The present invention relates to a device disposing apparatus for a mobile body in which disposing means for disposing therein audio devices and video reproducing devices to be mounted on a mobile body such as a motor vehicle is provided in a position between a driver's seat and a front-passenger's seat.

BACKGROUND ART

FIG. 46 is a schematic drawing showing an arrangement inside a vehicle compartment of a conventional motor vehicle.

Referring to FIG. 46, reference numeral 1 denotes an instrument panel provided in a front inside the vehicle compartment, reference numeral 2 audio devices such as a radio receiver, a cassette tape deck, a compact disc (CD) player, or the like, reference numeral 3 a dashboard provided in a central upper part of the instrument panel 1, reference numeral 4 a steering wheel provided on the right side of the instrument panel 1, and reference numeral 5 front seats which are made up of a driver's seat 5a and a front passenger's seat 5b arranged in the right and left positional relationship.

Reference numeral 6 denotes a central console box disposed in a position between the driver's seat 5a and the front passenger's seat 5b.

Conventionally, the audio devices 2 are arranged, as the dominant influence of the times, to be disposed in the center 1a of the instrument panel 1.

However, with the recent spreading of navigation apparatuses, various devices are gradually emerging, i.e.,: an arrangement in which a navigation apparatus main body (not shown) is disposed under the front-side seat such as the driver's seat or the front passenger's seat and a display for displaying thereon the map information outputted from the navigation apparatus is disposed in the neighbourhood of the center of the instrument panel 1; an arrangement in which the space for disposing the audio devices is made smaller and the display is disposed in a central upper part of the instrument panel 1, i.e., is buried inside the dashboard 3; and an arrangement in which the instruments which show the state of a brake system and are conventionally disposed on the side of the driver's seat of the instrument panel 1 are disposed in the center of the instrument panel 1. This kind of arrangements are going to dominating influence of the times in the future.

In addition, in disposing the display, there is appeared an arrangement in which the display is disposed in the central upper part of the instrument panel 1, i.e., is buried inside the dashboard 3, or an arrangement in which the display is provided on a head rest, which forms an upper part of the driver's seat 5a or the front-passenger's seat 5b, through a supporting part.

There is further appeared an arrangement in which a monitor fixed to the intermediate of the ceiling which corresponds to the neighbourhood of an intermediate between the front seats and the rear seats so that the rear-seat passengers can display the images such as a television set, a video, a digital versatile disk (DVD), or the like, by using the monitor.

Under such a background, in Published Unexamined Japanese Patent Application No. 297391/1998 an arrangement is disclosed in which the switches for the audio devices, an air conditioner, or the like, which used to be disposed in the center of the instrument panel 1 are provided in the central console 6 which is disposed between the driver's seat and the front-passenger's seat.

FIG. 47 is a schematic diagram showing a purview thereof.

Referring to FIG. 47, reference numeral 1 denotes an instrument panel provided in a front inside the vehicle compartment, reference numeral 3 a dashboard provided in a central upper part of the instrument panel 1, reference numeral 4 a steering wheel provided on the right side of the instrument panel 1, and reference numeral 5 front seats which are made up of a driver's seat 5a and a front passenger's seat 5b arranged in the right and left positional relationship.

Reference numeral 6 denotes a central console box disposed in a position between the driver's seat 5a and the front-passenger's seat 5b, reference numeral 7 a gearshift lever provided in the central lower part of the instrument panel 1 and reference numeral 8 a display provided in a central upper part of the instrument panel 1.

As shown in FIG. 48, the central console box 6 is provided with a lid 6a, and a housing to be opened and closed by this lid 6a is formed inside the central console box 6.

In a part of the front of the central console box 6, there is provided a switch disposing part 9 which is formed into a recessed shape. A remote control unit 10 is removably fit into this switch disposing part 9.

the arrangement thus constructed as above described makes it possible for the passenger seated in the driver's seat or in the front-passenger's seat to readily operate the switches while keeping an ordinarily seated posture.

Further, in Japanese Utility Model Registration Application No. 86638/1992 (Published Unexamined Japanese Utility Model Registration Application No. 49220/1994), a carriage case for carrying, in the back and forth direction in a bus compartment, facilities for service to the passengers such as a television receiver, a heater/refrigerator, or the like, as well as articles such as foods and drinks for the passengers.

FIG. 49 is a schematic diagram showing an arrangement of the apparatus and FIG. 50 is a sectional view showing a state where the television receiver is housed inside the carriage case.

Referring to FIGS. 49 and 50, reference numeral 21 denotes a display of the television receiver which is disposed in one surface of the carriage case 25 (to be mentioned in more detail later), reference numeral 22 the bus as a mobile body, reference numerals 23 seats disposed inside the bus 22, reference numeral 24 a rail provided substantially in the center of the ceiling of the bus 22, reference numeral 25 the carriage case which is movably suspended from the rail 24, and reference numeral 26 a roller by which the carriage case 25 is slidably supported by the rail 24.

The arrangement thus constructed as described above easily moves the carriage case containing therein facilities for service to the passengers such as the television receiver, or the like, as well as articles for the passengers such as foods and drinks inside the bus compartment. When the facilities and the foods and drinks are not needed, the carriage case is out of sight of the passengers. The articles such as foods and drinks can, at the same time, be easily distributed to each of the passengers.

Still further, in Published Unexamined Japanese Patent Application No. 78693/1999, a monitoring apparatus for a vehicle is disclosed in which a monitor is disposed inside a room mirror main body in a motor vehicle.

FIG. 51 is an exploded perspective view showing an arrangement of a purview of the apparatus, FIG. 52 is a sectional view showing a section of a purview thereof, and FIG. 53 is an explanatory drawing showing an example of display on a purview.

In these FIGS. 51, 52 and 53, the room mirror main body 30 is disposed on a ceiling surface inside the vehicle compartment in front of the driver's seat in the vehicle body. This room mirror main body 30 has a function of a rear-view mirror to reflect the rear of the vehicle body and a capability as a rear monitor of a rear-imaging camera which images the rear of the vehicle body. It is made up of a casing 31, a monitor 32, a half-mirror 33, a frame 34 and an arm 35. Once the power source of the monitor 32 is switched on, when the vehicle is put in reverse gear, an image is displayed on the monitor 32 as shown in FIG. 53. In FIG. 53, the display is divided into two screens of the right and the left. The right screen displays the backward image picked up by the camera and the left screen displays the remarks to be noted.

The arrangement, by looking at the image from the rear-imaging camera, makes it possible to visually check the rear of the vehicle body.

Still further, in the conventional motor vehicle, the rear-view mirror (room mirror) is mounted on the ceiling near the driver's seat. In checking the rear of the motor vehicle when passing another car ah ad or changing lanes, the driver can check the rearward state by looking at the reflection of the rear view on the rear-view mirror. In case there is an obstacle that comes in the backward view inside the vehicle compartment behind the rear-view mirror, it is sometimes difficult to check the rear with the rear-view mirror. For example, where a lot of luggage is loaded behind the driver's seat such as in a delivery truck, the rear view is often obstructed by the luggage between the rear-view mirror and a window at the back of the vehicle (rear window).

Under such a background, an apparatus has been proposed in Published Unexamined Japanese Patent Application No. 71939/1992 solve the above-described problem.

FIG. 54 is an explanatory drawing showing a purview as disclosed in this application.

In FIG. 54, the apparatus includes an imaging device (not shown) disposed in the rear of the vehicle at a position to secure the wide vehicle's rear scope of view; the display 41 disposed on a ceiling of the vehicle which displays thereon the image picked up by the imaging device toward a windshield; and a reflecting mirror 42 which reflects the image projected by this display 41 so as to come it to the driver's scope of view. Having been taken such an arrangement, even if the rear scope of view is obstructed by luggage or the like inside the vehicle compartment, the driver can always see the rear view.

On the other hand, the rear check apparatus with a display which is in the rear-seat passenger's disposal seated inside the vehicle compartment, is proposed in a Published Unexamined Japanese Patent Application No. 129815/1999. As shown in FIG. 55. In this FIG. 55, the apparatus is made up of a reverse switch 51 which is switched on when a reverse gear of the vehicle is operated; a charge-coupled device (CCD) camera 52 which images the rearward dead spot of the vehicle; an antenna 53 for receiving television broadcasting; a television tuner 54; a television operating switch 55 for the rear-seat passengers; a liquid crystal display 56 disposed in a position near a ceiling in an intermediate between the front seats and the rear seats; a display drive part 57 which supports this liquid crystal display from the ceiling of the vehicle and is made up of an electric motor for rotatably driving the screen of the liquid crystal display to the driver's seat side and to the rear-seat passengers side; and a control part 58 for controlling the operation of each of these devices.

Having been taken such an arrangement, in a vehicle in which the rear and sides of the vehicle can be checked from inside the vehicle through the window glasses, when the driver moves the vehicle back, while looking backward, he/she may change his/her eyes to the display, whereby he/she can the dead angle behind the vehicle by visually checking the contents of the display. This reduces the driver's burden imposed on the rearward check at the time of moving the vehicle back.

Further, when going out by a motor vehicle, it is not seldom avail himself of shopping. Receipts to be handed over by shops' salesclerks in shopping are brought home for use in domestic bookkeeping, and a memo is made of a favorite shop, if any.

In addition, when try to set a favorite place in a navigation apparatus as a destination by consulting sight-seeing guide books, or the like, a user has to successively operate the menu screen formed by several structured screens.

The conventional audio devices and video reproducing devices for a motor vehicle are mounted and fixed inside the motor vehicle as described above. In other words, mostly, they are disposed near the center of the instrument panel so as to be removable. The arrangement thus constructed as above has a limited space for disposition of the center of the instrument panel. Therefore, it is necessary to carefully select the devices to be disposed in this space. In particular, for a user who wishes to use various kinds of audio devices and video reproducing devices inside the motor vehicle, one has to submit to a poor convenience such as a limited freedom in selection.

Still further, since the audio devices are disposed in the center of the instrument panel, the changes of the cassette tapes, digital audio tapes (DATs), CDs, mini discs (MDs), DVDs, or the like, as well as the setting operations of each of the devices, or setting a plurality of devices can be made only by the passengers seated in the front seats, i.e., the driver's seat and the front-passenger's seat. The others who a reseated in seats other than the front seats, i.e., the passengers seated in the rear seats cannot perform the above-described operations while seating. Therefore, the rear passengers encounter in convenience.

Still further, in an apparatus in which the display means for displaying thereon the visible information from the video reproducing apparatus, or the like, is disposed in the center of the instrument panel, although the passengers in the front seats have a high visibility, the passengers in the rear seats are far from the display means, resulting in a lower visibility.

In addition, since the operating means for the audio devices and video reproducing devices are ordinarily constituted integral with the devices, when one wishes to operate them, it is obliged to stretch his hand toward the center of the instrument panel. Besides, the rear-seat passengers cannot as much as access to them, and even the front-seat passengers must change their posture from the one deeply reclined on the seats to the one slouching before operating them, disabling an expectation of easy operation.

Exceptionally, there are rarely existed in which the operating means are separated from the devices in the form of remote controllers (hereinafter referred to as a remocon). This kind of arrangement, after having operated the remote controllers, they are often left detached from its housing. Since the remote controllers are ordinarily small in size, the operating means sometimes missing and, when he/she operates the devices, the remote controllers must be looking for.

Still further, since the audio devices and the video reproducing devices are disposed in the center of the instrument panel and are fixed in position where wiring connection is done inside the instrument panel, the instrument panel having the narrow space compels the number of devices to be disposed therein to be limited. In disposing the devices, therefore, they must be carefully selected, providing a little possibility of mounting various devices and undergoing inconvenience.

In addition, in the center of the instrument panel, there are provided, together with the display means, the operating means as a touch-panel or the like for operating the displayed contents on the display means. In operating this operating means, one must change his posture from the one deeply reclined on the seat to the posture slouching before operating, or he/she must stretch his/her hand, disabling an expectation of an easy operation.

Further, among the mobile bodies, in case the space between the seats serves as a passage for the passengers like in a bus, nothing can be disposed on the floor because they obstruct the passage of the passengers.

On the other hand, there are rarely existed in which a television receiver is suspended from a rail provided on the ceiling of a bus so as to be movable back and forth inside the bus. However, no attention has been paid to the relationship between the positions of the seats disposed inside the vehicle compartment and the movement stopping positions of the television receiver. Therefore, the user must switch off the television receiver for adjusting the position thereof so that the position accommodates to the seat in which the user is seated whenever he/she looks at the television receiver. Therefore, the user encounters inconvenience.

Further, even when the rear-seat passengers do not look at the television receiver, it is always independently disposed. Therefore, it obstructs the passengers such as the driver.

In case there is a projected object in the ceiling behind a room mirror, this projected object shuts off the rear view behind the room mirror. The driver has a difficulty in checking the rear, and this kind of situation occurs not only at the time of moving back but also at the time of starting an ordinary running, changing the lanes, or tuning to the right/left while running, i.e., when one should check the back.

However, a conventional arrangement includes a display which projects the image picked up by the imaging device on the ceiling of the driver's seat of the vehicle toward the windshield; and the reflecting mirror which reflects the image picked up by this imaging device so as to come it to the driver's scope of view. Therefore, when the rear image is looked at by the reflecting mirror, he/she always looks at the rear image picked up by the imaging device. Even when there is no luggage in the rear seats inside the vehicle compartment, i.e., even in case the rear scope of view is good, the imaging device and the display are in operation. Therefor, the electric power consumes, leading to be the battery's running down.

Still furthermore, an arrangement is conventionally employed in which, when the driver backs the vehicle, he must change his eyesight, while looking backward of the vehicle, to the display provided near the ceiling in the intermediate between the front seats and the rear seats so that he can confirm by looking at the displayed contents. Therefore, there is required a display drive part to rotatably drive the direction of the screen of the display to the side of the driver's seat and to the side of the rear-seat passengers, resulting in a problem in that the number of parts becomes large.

In addition, at the time of reversing the vehicle, even when the rear seat passengers are enjoying the contents of the display which is provided near the ceiling in the intermediate between the front seats and the rear seats, the screen of the display must be rotated to the side of the driver's seat, with the result that the rear seat passengers cannot use the screen of the display during that period of time. There was therefore a problem in that the convenience of the rear seat passengers becomes poor.

Further, there was a problem in that it is complicated and troublesome to keep in good order and to process the information such as the receipts to be received at the time of shopping when going out by a motor vehicle.

Still furthermore, the user must read out the address of a favorite shop from the receipt or from the sightseeing guide book or to make the setting of the address, or the like, by the user's operation of the navigation apparatus. There was therefore a problem in that the operation is complicated and troublesome.

The present invention has been made to solve the above and other problems and has an object of obtaining a device disposing apparatus for a mobile body comprising a disposing means which is provided in a position between a driver's seat and a front-passenger's seat in the mobile body and in which desired devices are disposed; a guide means for guiding the disposing means so as to be movable in a back and forth direction of the mobile body; a moving means for moving the disposing means along the guide means based on a command; a memory means having stored therein each of seat positions of a plurality of seats provided in the mobile body and a movement set value for positioning the disposing means to a predetermined position by the moving means, the seat positions and the movement set value being stored with a correlation to each other; an operating means for outputting a command signal so as to move the disposing means; a set value selecting means for selecting a predetermined movement set value from the memory means based on a command from the operating means; and a movement control means for controlling such that the moving means moves the disposing means along the guide means to the predetermined position based on the movement set value selected by the set value selecting means whereby, only by operating, the troublesome setting operation of the disposing means is not required and the user's convenience is improved.

Further, the present invention has an object of obtaining a device disposing apparatus for a mobile body further comprising a display means adapted to be housed inside, or to be projected from, the disposing means, wherein the memory means stores therein, together with the movement set value, a display means projection set value which is set with a correlation to each of the seats as to whether the display means shall be projected or not, wherein the set value selecting means selects the predetermined movement set value and the display means projection set value from the memory means, and wherein the movement control means moves the disposing means by the moving means along the guide means for positioning to the predetermined position based on the movement set value and the display means projection set value selected by the set value selecting means and controls the display means so as to be projected to a predetermined position or to be housed whereby, only by operating, the setting of the display means together with the disposing means is appropriately positioned with a correlation to the seat position, with the result that no troublesome setting operation is required and the user's convenience is further improved.

Further, the present invention has an object of obtaining a device disposing apparatus for a mobile body, wherein the display means comprises an angle adjusting means to enable to adjust an angle thereof relative to a supporting means which supports the display means when the display means is projected from the disposing means, whereby the adjustment to suit the physical shape of the user can be freely made and the convenience of the apparatus is improved.

Further, the present invention has an object of obtaining a device disposing apparatus for a mobile body, wherein the disposing means comprises a device operation control means which operates a predetermined device and which is adapted to be projected from a surface of a casing of the disposing means, wherein the memory means stores therein, together with the movement set value, a device operation control means projection set value which is set with a correlation to each of the seats as to whether the device operation control means shall be projected or not, wherein the set value selecting means selects the predetermined movement set value and the device op ration control means projection set value from the memory means, and wherein the movement control means moves the disposing means by the moving means along the guide means for positioning to the predetermined position based on the movement set value and the device operation control means projection set value selected by the set value selecting means and controls the device operation control means so as to be projected to a predetermined position or to be housed, whereby the convenience of the user is further improved.

Still furthermore, the present invention has an object of obtaining a device disposing apparatus for a mobile body, wherein a housing space is formed under equipment disposed in a front of the mobile body so as to house at least a part of the disposing means, and wherein the guide means is adapted to guide the disposing means into the housing space, whereby the limited space inside the mobile body can be effectively utilized.

Furthermore, the present invention has an object of obtaining a device disposing apparatus for a mobile, further including a second operating means for each of the seats provided in the mobile body and wherein, when the moving means moves to position the disposing means along the guide means, a command is given by one of the operating means and the second operating means whereby, even when the operating means is difficult of operation, the operation can be easily performed so that the operability of the apparatus is further improved.

Furthermore, the present invention has an object of obtaining a device disposing apparatus for a mobile body, wherein the disposing means comprises a housing for housing therein a display means, the display means being disposed so as to be projected from the disposing means, wherein the memory means stores therein, together with the movement set value, a display means projection set value which is set with a correlation to each of the seats as to whether the display means shall be projected or not, wherein the set value selecting means selects the predetermined movement set value and the display means projection set value from the memory means, and wherein the movement control means moves the disposing means by the moving means along the guide means for positioning to the predetermined position based on the movement set value and the display means projection set value selected by the set value selecting means and controls the display means so as to be projected to a predetermined position or to be housed and, when the display means is guided into the housing space, the display means is housed inside the disposing means so as to display only by a display disposed in a front of the mobile body, whereby the troublesome operations such as positioning become needless and, when the display means in the disposing means is not used, the display means can be housed so that the limited space is effectively utilised, the operability of the apparatus is further improved, and the convenience of the user is further improved.

Furthermore, the present invention has an object of obtaining a device disposing apparatus for a mobile body including a disposing means which is provided in a position between a driver's seat and a front-passenger's seat in the mobile body and in which desired devices are disposed, the disposing means including a display means which is housed inside, or to be projected from, the disposing means and a device operation control means which is adapted to be projected from a surface of a casing of said disposing means to thereby operate a predetermined device; a guide means for guiding the disposing means so as to be movable in a back and forth direction of the mobile body; a moving means for moving the disposing means along the guide means based on a command; a memory means having stored therein each of seat positions of a plurality of seats provided in the mobile body, a movement set value of the disposing means for positioning the disposing means to a predetermined position by the moving means, a display means projection set value to set as to whether the display means shall be projected or not, and a device operation control means projection set value to set as to whether the device operation control means shall be projected or not, the seat positions and the set values being stored with a correlation to one another; a set value selecting means for selecting a predetermined movement set value, a predetermined display means projection set value, and a predetermined device operation control means projection set value from the memory means based on the command, and a movement control means which controls such that the moving means moves the display means along the guide means to a predetermined position and that the display means and the device operation control means are projected to a predetermined position or housed inside the disposing means based on the movement set value, the display means projection set value, and the device operation control means projection set value selected by the set value selecting means, whereby the setting operation for positioning becomes needless when it is desired to operate or display the troublesome disposing means, and the operability and the convenience of the apparatus are further improved, and the convenience of the user is also further improved.

Still furthermore, the present invention has an object of obtaining a device disposing apparatus for a mobile body including a disposing means which is provided in a position between a driver's seat and a front-passenger's seat in the mobile body and in which desired devices are disposed, the disposing means including a display means which is housed inside, or to be projected from, the disposing means and a device operation control means which is adapted to be projected from a surface of a casing of the disposing means to thereby operate a predetermined device; the mobile body having in a front thereof a housing space into which at least a part of the disposing means is capable of being housed; a guide means for guiding the disposing means so as to be movable in a back and forth direction of the mobile body and be capable of guiding the disposing means up to the housing space; a moving means for moving the disposing means along the guide means based on a command; a memory means having stored therein each of seat positions of a plurality of seats provided in the mobile body, a movement set value of the disposing means for positioning the disposing means to a predetermined position by the moving means, a display means projection set value to set as to whether the display means shall be projected or not, and a device operation control means projection set value to set as to whether the device operation control means shall be projected or not, the seat positions and the set values being stored with a correlation to one another; a set value selecting means for selecting a predetermined movement set value, the display means projection set value, and the device operation control means projection set value from the memory means based on the command; a movement control means which controls such that the moving means moves the display means along the guide means to a predetermined position and that the display means and the device operation control means are projected to a predetermined position or housed inside the disposing means based on the movement set value, the display means projection set value, and the device operation control means projection set value selected by the set value selecting means wherein, when the display means is guided by said moving means into the housing space, the display means is housed inside the disposing means so as to display only by a display disposed in a front of the mobile body, whereby the setting operations for positioning can be eliminated when one wishes to perform the operation and display of the troublesome disposing means, with the result that the operability and the convenience of the apparatus are further improved and the convenience of the user is also further improved.

Furthermore, the present invention has an object of obtaining a device disposing apparatus for a mobile body, wherein an output signal of a device disposed in the disposing means is converted to a wireless signal and, based on this converted wireless signal, a predetermined information is displayed, when visible information is contained therein, on the display disposed in a front of the mobile body, whereby the visible information can be shared by all passengers, the range of using the apparatus can be increased, and the convenience of the apparatus can be further improved.

Still furthermore, the present invention has an object of obtaining a device disposing apparatus for a mobile body, wherein, when the disposing means is moved, the information to show the plurality of seat positions is displayed in a list, a desired seat is selected from the display in the list, a movement set value and a display means projection set value as well as a device operation control means projection set value according to this selected seat position are selected from said memory means, and the moving means moves to position the disposing means to the predetermined position of the guide means, whereby the setting operation can be made based on the displayed information so that the operation in an undue posture is avoided and that the operability of the apparatus can be further improved.

Furthermore, the present invention has an object of obtaining a device disposing apparatus for a mobile body, further including a seat occupant presence judging means for judging whether there is an occupant in each of the seats provided inside the mobile body, wherein the seat position is displayed on the display means if a judgement is made that there is an occupant by the judgement of the seat occupant presence judging means, whereby the selection can be made only from the seats in which there are seated passengers and that the time in making the selecting operation is shortened.

Still furthermore, the present invention has an object of obtaining a device disposing apparatus for a mobile body, further including seated passenger protection operation control means for performing a protecting operation control intended for a seat with a seated passenger among all the seats provided inside the mobile body, wherein information of only the seat that is an object of protecting operation by the seated passenger protection operation control means is displayed in the list on the display means, whereby the number of parts of the apparatus can be reduced by sharing the same constituting parts with the existing parts and that the cost can also be reduced.

DISCLOSURE OF INVENTION

A device disposing apparatus for a mobile body according to the pr sent invention includes disposing means which is provided in a position between a driver's seat and a front-passenger's seat in the mobile body and disposable desired devices; guide means for movably guiding the disposing means in a back and forth direction relative to the mobile body; moving means for moving the disposing means along the guide means based on a command; memory means having stored therein in correspondence with each of seat positions of a plurality of seats provided in the mobile body and a movement set value for positioning the disposing means to a predetermined position by the moving means; operating means for outputting a command signal so as to move the disposing means; set value selecting means for selecting a predetermined movement set value output from the memory means based on a command from the operating means; and movement control means for movement controlling such that the moving means moves the disposing means along the guide means to the predetermined position based on the movement set value selected by the set value selecting means. This disengages a user from the troublesome setting operation of the disposing means excepting an easy operation and improves the user's convenience.

Further, a device disposing apparatus for a mobile body according to the present invention includes disposing means which is provided in a position between a driver's seat and a front-passenger's seat in the mobile body and disposes desired devices, the disposing means including display means which is housed inside thereof and projected therefrom, and device operation control means which is projected from a surface of a casing of the disposing means and operates a predetermined device; guide means for movably guiding the disposing means in a back and forth direction relative to the mobile body; moving means for moving the disposing means along the guide means based on a command; memory means having stored therein in correspondence with each of seat positions of a plurality of seats provided in the mobile body, a movement set value of the disposing means for positioning the disposing means to a predetermined position by the moving means, a display means projection set value to set as to whether the display means should be projected or not, and a device operation control means projection set value to set as to whether the device operation control means should be projected or not; set value selecting means for selecting a predetermined movement set value, predetermined display means projection set value, and predetermined device operation control means projection set value from the memory means based on the command, and movement control means which controls such that the moving means moves the disposing means along the guide means to the predetermined position and that the display means and the device operation control means are projected to a predetermined position or housed inside the disposing means based on the movement set value, the display means projection set value, and the device operation control means projection set value selected by the set value selecting means. This disengages a user from the troublesome operation of the disposing means and the setting operation for positioning when the user wishes to display, thereby improving the operability and the convenience of the apparatus and further the convenience of the user.

Still further, a device disposing apparatus for a mobile body according to the present invention includes disposing means which is provided in a position between a driver's seat and a front-passenger's seat in the mobile body and disposes desired devices, the disposing means including display means which is housed inside thereof and projected therefrom, and device operation control means which is projected from a surface of casing of the disposing means and operates a predetermined device, the mobile body has in a front thereof a housing space into which at least a part of the disposing means is housed, guide means for movably guiding the disposing means in a back and forth direction relative to the mobile body and guiding the disposing means to the housing space; moving means for moving the disposing means along the guide means based on a command; memory means having stored therein in correspondence with each of seat positions of a plurality of seats provided in the mobile body, a movement set value of the disposing means for positioning the disposing means to a predetermined position by the moving means, a display means projection set value to set as to whether the display means should be projected or not, and device operation control means projection set value to set as to whether the device operation control means should be projected or not; set value selecting means for selecting a predetermined movement set value, the display means projection set value, and the device operation control means projection set value from the memory means based on the command; movement control means which controls such that the moving means moves the disposing means along the guide means to a predetermined position and that the display means and the device operation control means are projected to a predetermined position or housed inside the disposing means based on the movement set value, the display means projection set value, and the device operation control means projection set value selected by the set value selecting means wherein, when the display means is guided by the moving means to the housing space, the display means is housed inside the disposing means so as to display only by a display disposed in a front of the mobile body. This disengages a user from the troublesome operation of the disposing means and the setting operation for positioning when the user wishes to display, thereby improving the operability and the convenience of the apparatus and further the convenience of the user.

BRIEF DESCRIPTION OF DRAWINGS

FIG. 12 is a table showing a purview of FIG. 11.

FIG. 20 is an explanatory drawing showing an example of visible information used in FIG. 19.

BEST MODE FOR CARRYING OUT THE INVENTION

In order to describe the present invention in more detail, a description will now be made about the best mode for carrying out the present invention with reference to the accompanying drawings.

First Embodiment

Figure 1:
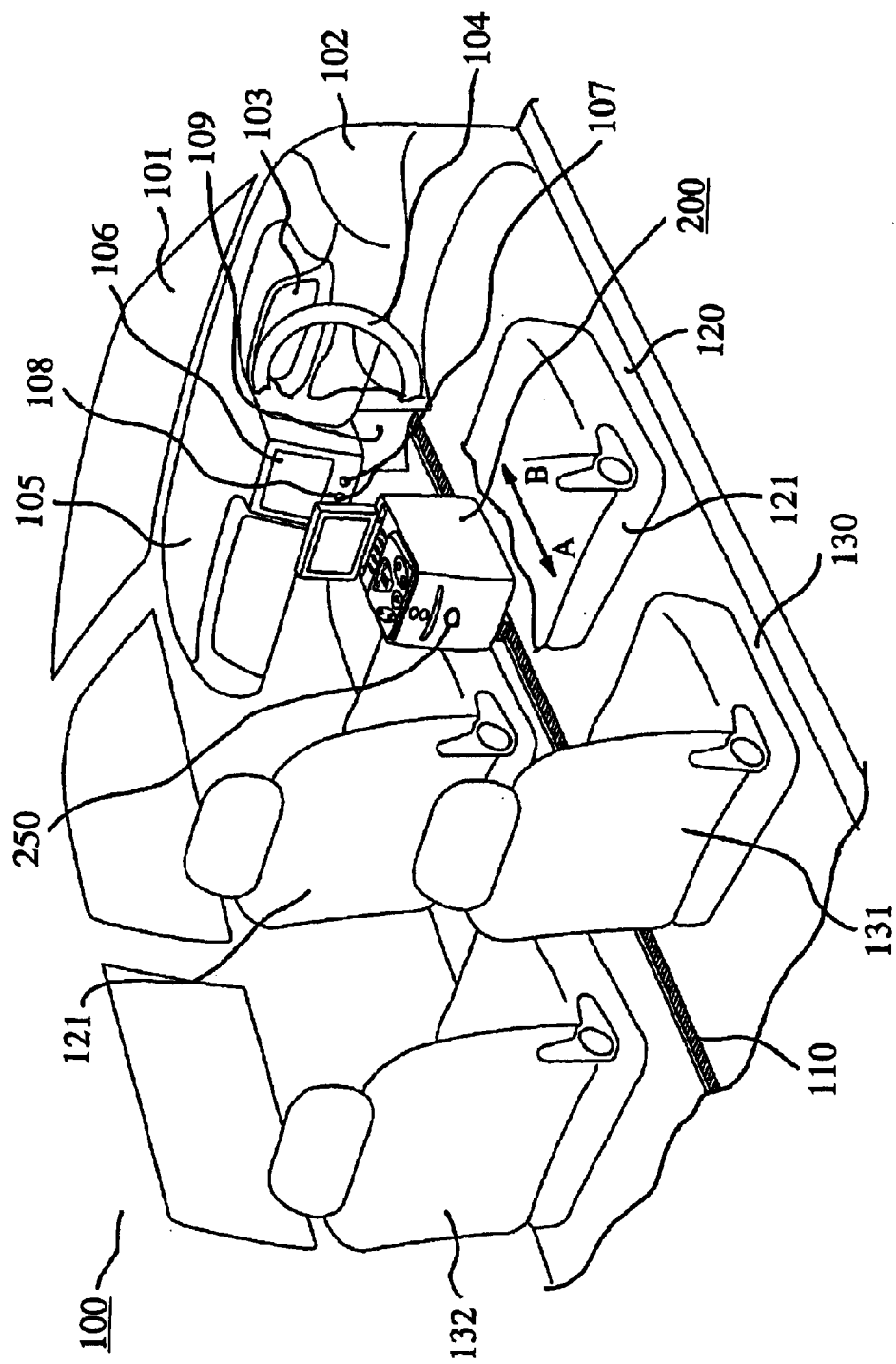
FIG. 1 is a schematic drawing showing an arrangement of a device disposing apparatus for a mobile body and an information processing equipment for a mobile body according to a first embodiment.
Figure 2:
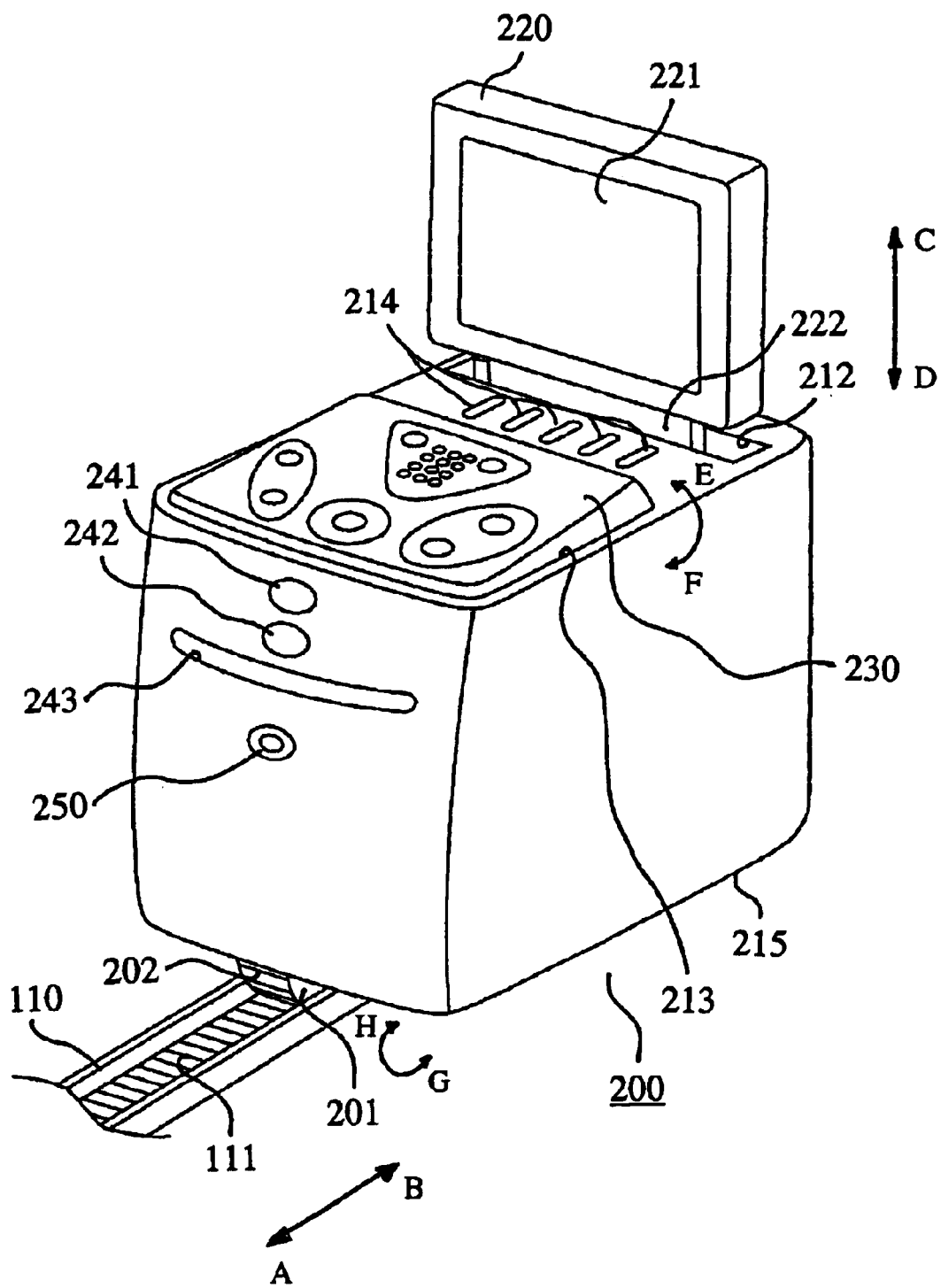
FIG. 2 is a schematic drawing showing an arrangement of essential parts of FIG. 1.
Figure 3:
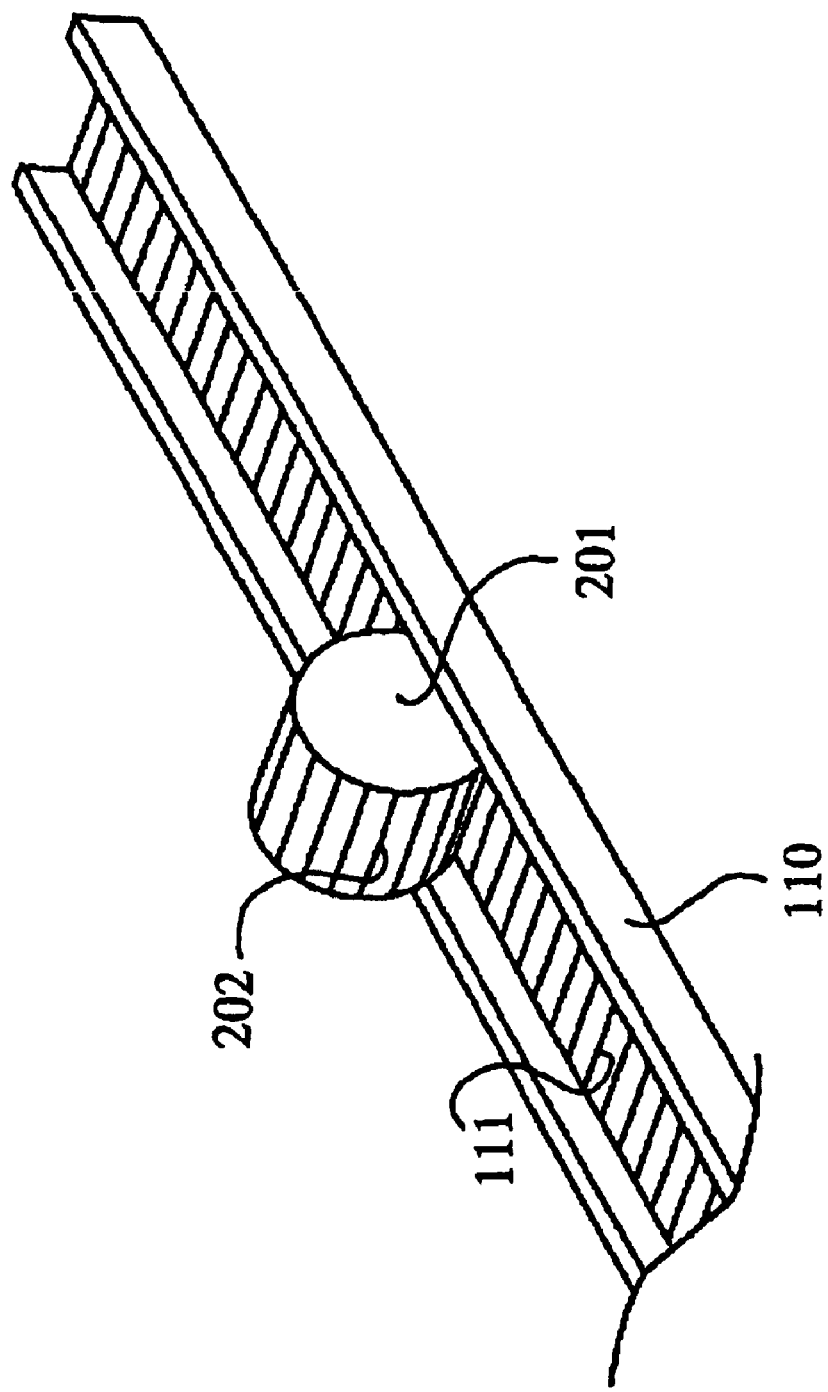
FIG. 3 is a schematic drawing showing essential parts of FIG. 2.

FIG. 1 is a schematic drawing showing an arrangement of a device disposing apparatus for a mobile body according to the first embodiment. FIG. 2 is a perspective view showing an arrangement of essential parts of FIG. 1. FIG. 3 is a perspective view showing essential parts of FIG. 2.

Referring to FIGS. 1 through 3, reference numeral 100 denotes a motor vehicle as a mobile body. In the first embodiment, a description is made on the basis of a mini van type of motor vehicle which can accommodate 6 passengers. Reference numeral 101 denotes a windshield of the motor vehicle 100, reference numeral 102 an instrument panel which is formed of a resin, or the like, and which is disposed in a front of a vehicle compartment of the motor vehicle 100. Reference numeral 103 denotes a combination meter panel which are provided on the side of the driver's seat of the instrument panel 102 and which has disposed therein meters such as a speedometer, a tachometer, or the like. Reference numeral 104 denotes a steering wheel.

Reference numeral 105 denotes a dashboard which corresponds to an upper surface of the instrument panel 102. Reference numeral 106 denotes a display which is provided substantially in a center of the instrument panel 102. Reference numeral 107 denotes a managing part in which each of the parts are laterally disposed in a row at an equal distance from one other. This managing part 107 contains therein in this embodiment a control part for actuating an emergency call system which is pressed for operation in an emergency to thereby report an urgent status by automatically connecting to an outside call center, a control part for switching on and off a hazard lamp for conveying to an outside persons an emergency stopping of the vehicle, a control part for capturing data from an outside electronic notebook (also called a personal digital assistant, PDA), or the like.

Reference numeral 108 denotes a camera as imaging means, reference numeral 109 denotes a housing space for housing therein a central console unit 200 (to be described in more detail hereinafter) when it is moved to the front endmost portion of the motor vehicle, and reference numeral 110 denotes a rail as guide means for movably guiding the central console unit 200 in a back and forth direction of the motor vehicle 100, i.e., in the A direction or B direction in FIG. 1.

This rail 110 has formed therein a groove as illustrated in FIG. 3 and is disposed on the floor inside the vehicle compartment. At the bottom of the groove, there are formed slits at an equal distance from one another so as to extend in a direction perpendicular to the longitudinal direction of the rail 110, thereby forming an engaging part 111.

Reference numeral 120 denotes front seats which are made up of a driver's seat 121 and a front-passenger's seat 121. Reference numeral 130 denotes intermediate seats, which are made up, like the front seats 120, of a seat 131 on the side of the driver's seat 121, i.e., the seat on the right side in FIG. 1, and a seat 132 on the side of the front-passenger's seat 122, i.e., the seat on the left side in FIG. 1. Although not shown, behind the intermediate seats 130, there are provided rear seats which are made up of two seats like in the front seats 120 and the intermediate seats 130.

Although not shown, the instrument panel 102 is provided therein with central control means which manages the control of the entire equipment mounted on the motor vehicle, display control means which controls the display means such as a display, or the like, audio volume control means which controls the audio volume of speakers for making audio outputs, engine control means which controls an engine mounted on the motor vehicle 100, air conditioner control means which controls the operation of an air conditioner mounted on the motor vehicle 100, or the like. These display control means, audio volume control means, engine control means and air conditioner control means are arranged to be controlled based on an operation command from the central control means. The central control means is arranged to perform also a predetermined operational control of audio devices, imaging devices, or the like, which are disposed in the central console unit 200. Therefore, when a passenger inside the motor vehicle operates a device operation control means 230, a CD player, a cassette tape player, a DVD player, or the like, disposed inside the central console unit 200 is operated. Based on a command from the central control means, the audible information is subjected to the volume control to the speakers so that the audio is outputted from the speakers.

When the managing means 107 is operated, the audible information is also subjected, in the same manner as above, to the volume control to the speakers based on the command from the central control means so that the audio is outputted from the speakers.

Based on the operation of the device operation control means 230, the visible information is also subjected to the display control by display means 220 based on the command from the central control means so that the visible information can be displayed on the display means 220. When the managing means 107 is operated, the visible information is also subjected, in the same manner as in the case of the audible information, to the volume control to the speakers based on the command from the central control means so that the audio is outputted from the speakers.

Next, the central console unit 200 will be described with reference to FIGS. 2 and 3.

FIG. 2 is a perspective view showing the entire arrangement of the central console unit 200. FIG. 3 is a perspective view showing the relationship between the central console unit 200 shown in FIG. 2 and the rail 110.

Reference numeral 200 denotes the central console unit which is made up of a casing 210 of the central console unit; a display 220 as second display means which is provided so as to be housed into an opening 212 formed in a part of the casing 210 and which projects above an upper surface 211 of the casing 210 when in use; a device operation control part 230 which is provided so as to be housed into an opening 213 formed in a part of the casing 210 and which projects above the upper surface 211 of the casing 210 when in use; an operating part 241 which is operated to move the central console unit 200 in the direction A; an operating part 242 which is operated to move the central console unit 200 in the direction B; an inserting slot 243 for inserting a memory medium such as a CD, an MD, a DVD, or the like, into a audio device and an imaging device; and a camera 250 as imaging means which is mounted on a front of the casing 210. On the upper surface 211 of the casing 210, there are formed a plurality of openings 214, which serve as inserting ports for inserting thereinto memory cards such as integrated circuit (IC) cards. In this embodiment, it is so arranged that 5 memory cards can be inserted.

The display 220 and the device operation control part 230 will be described with reference to FIGS. 4 through 10.

Figure 4:
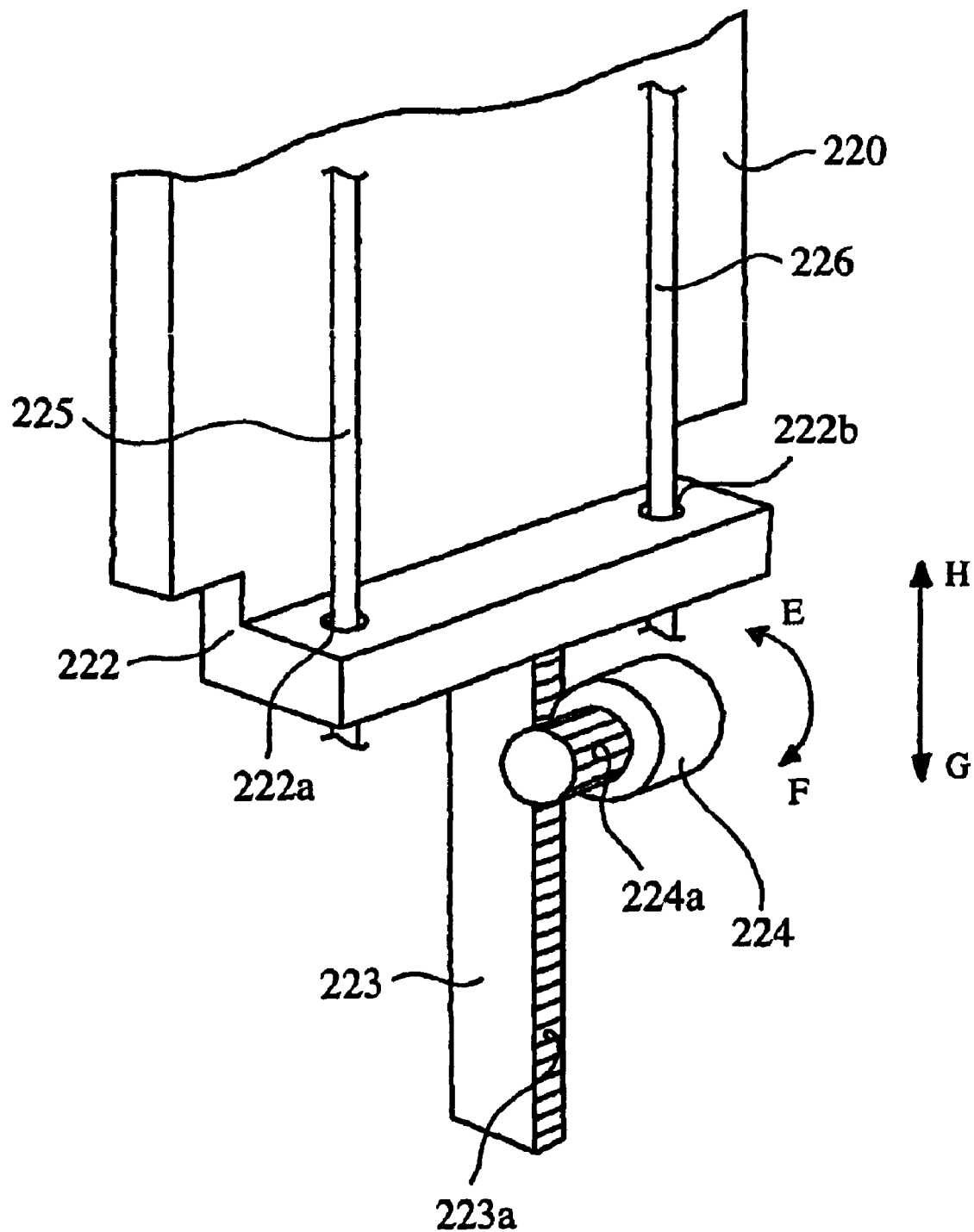
FIG. 4 is a schematic drawing showing an arrangement of essential parts of FIG. 1.
Figure 5:
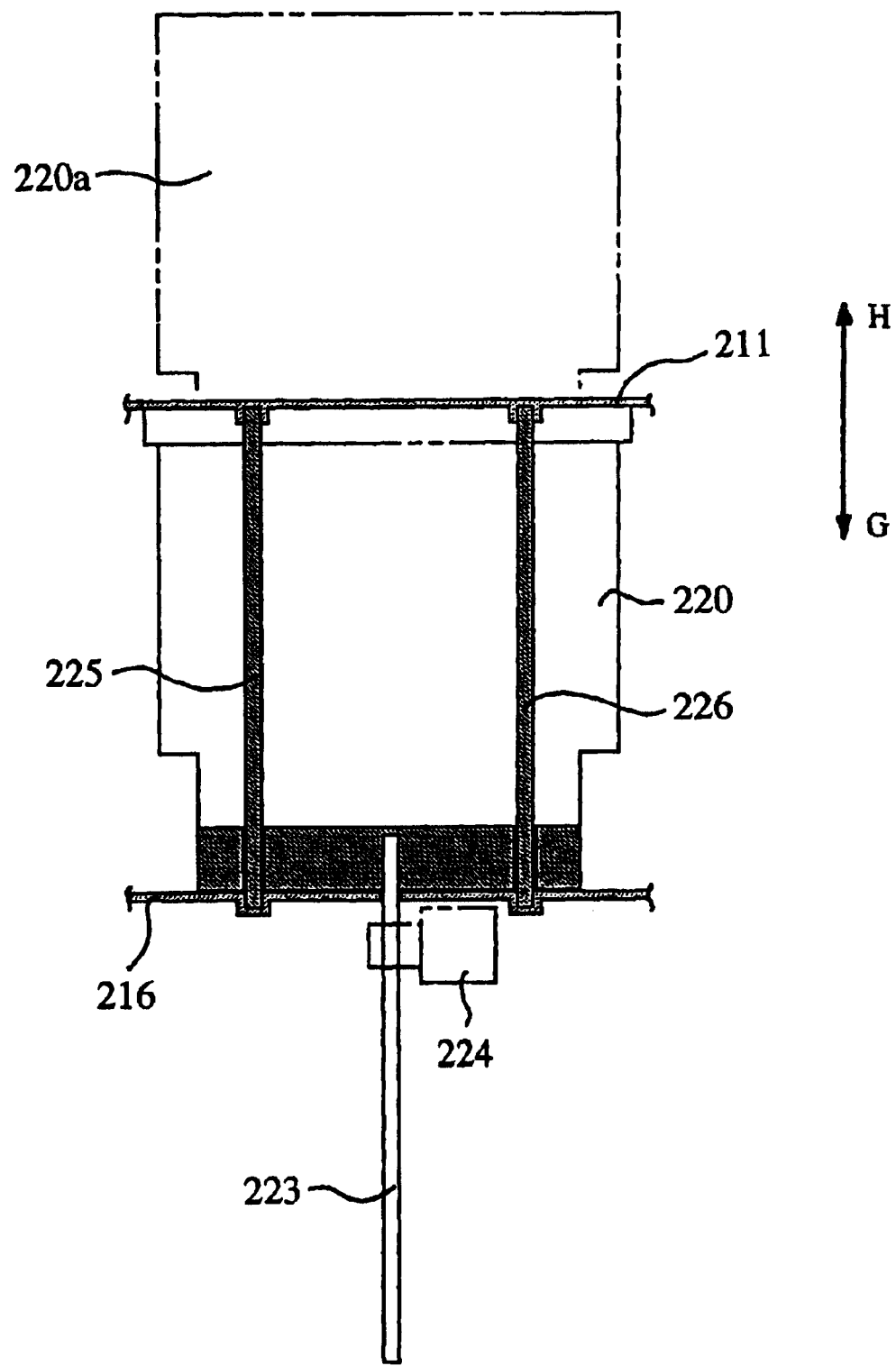
FIG. 5 is a rear view showing the rear surface of essential parts of FIG. 4.
Figure 6:
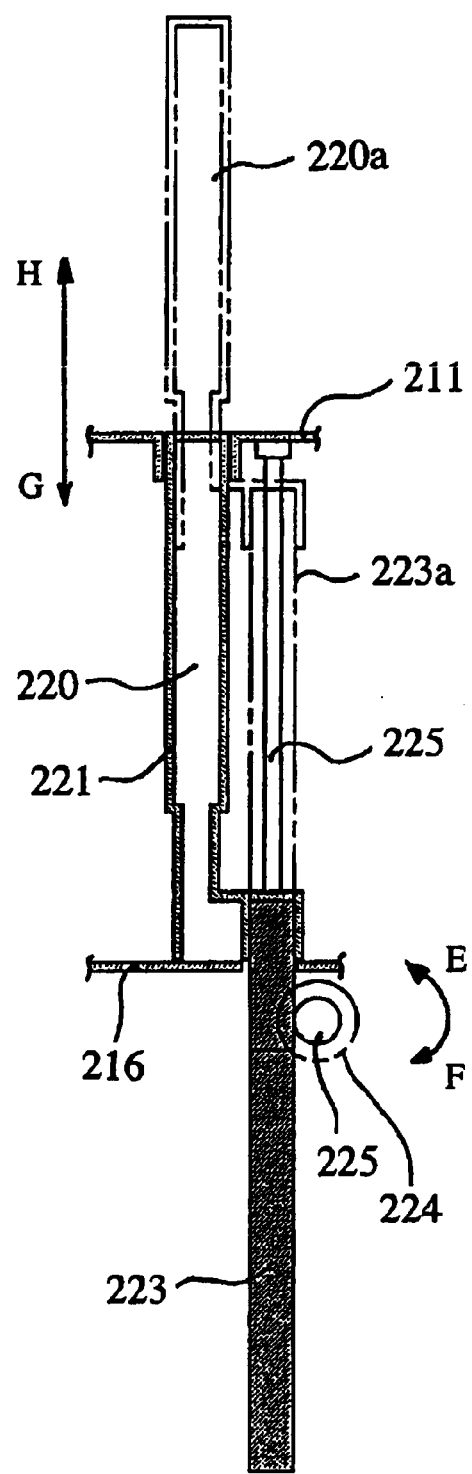
FIG. 6 is a sectional side view showing a side section of essential parts of FIG. 4.

FIG. 4 is a perspective rear view of the display 220 which is an essential part of the central console unit 200. FIG. 5 is a rear view showing the rear surface of the display 220. FIG. 6 is a sectional side view showing a side section of the display 220.

Figure 7:
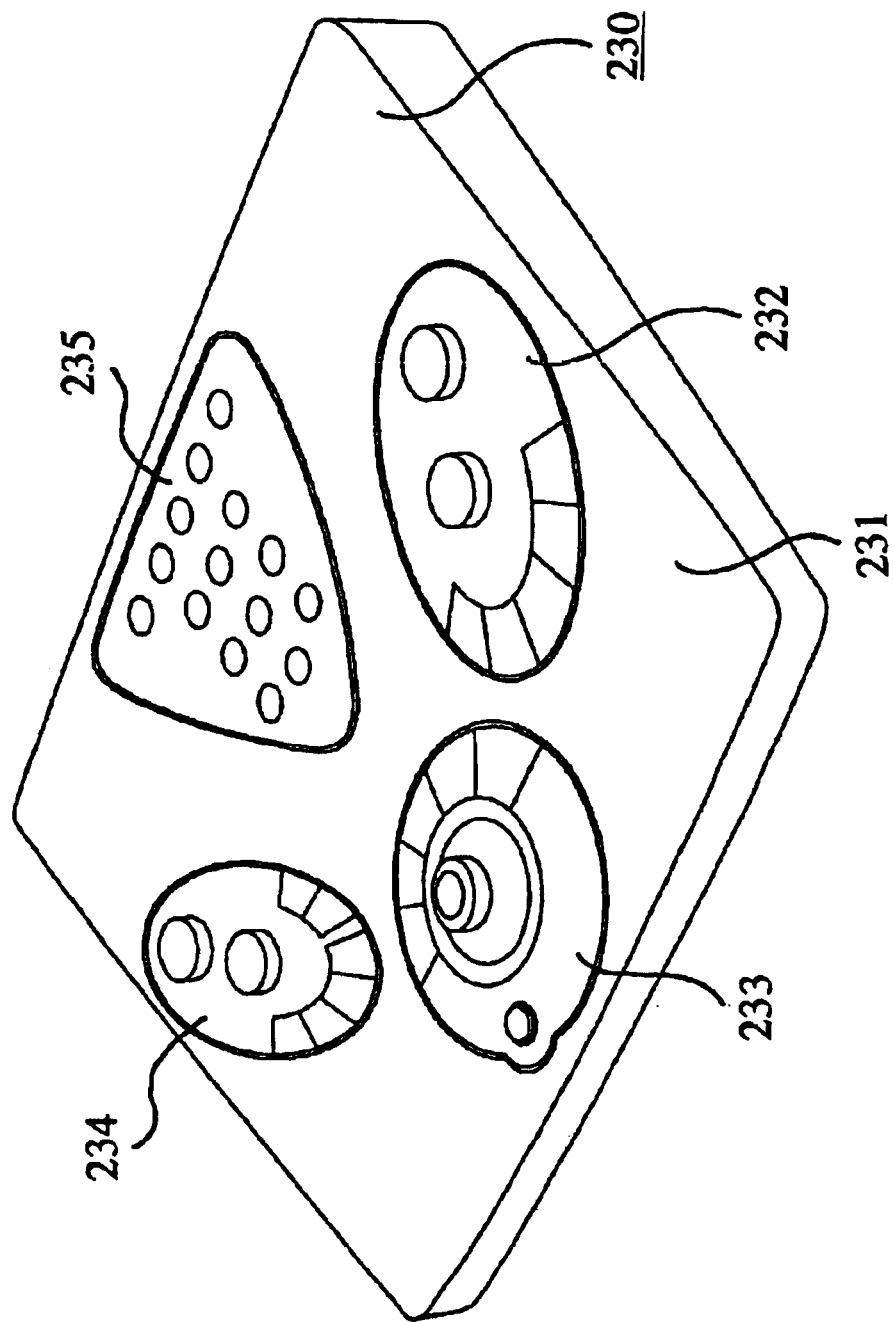
FIG. 7 is a schematic drawing showing an arrangement of essential parts of FIG. 1.
Figure 8:
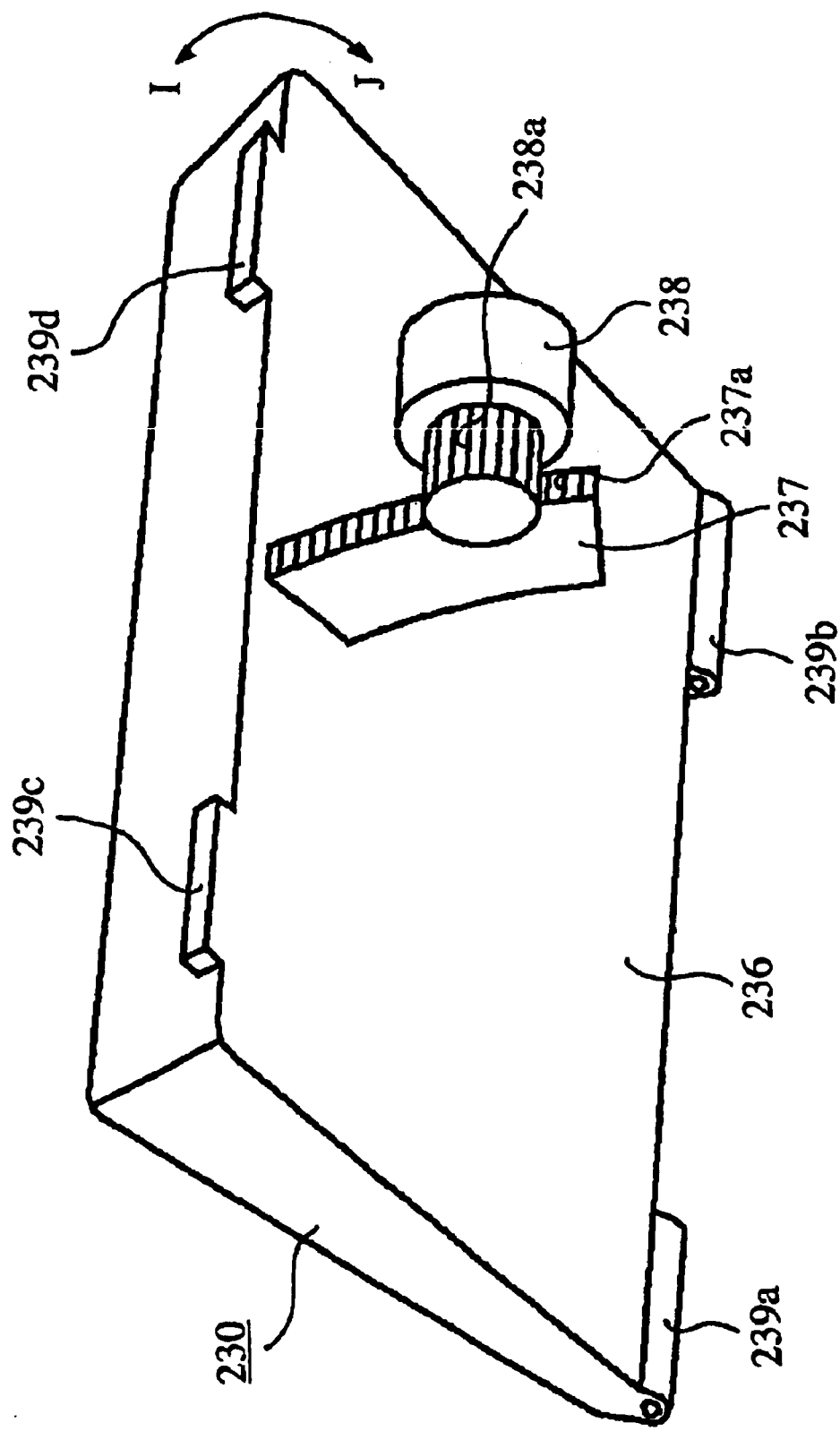
FIG. 8 is a rear view showing the rear surface of essential parts of FIG. 7.
Figure 9:
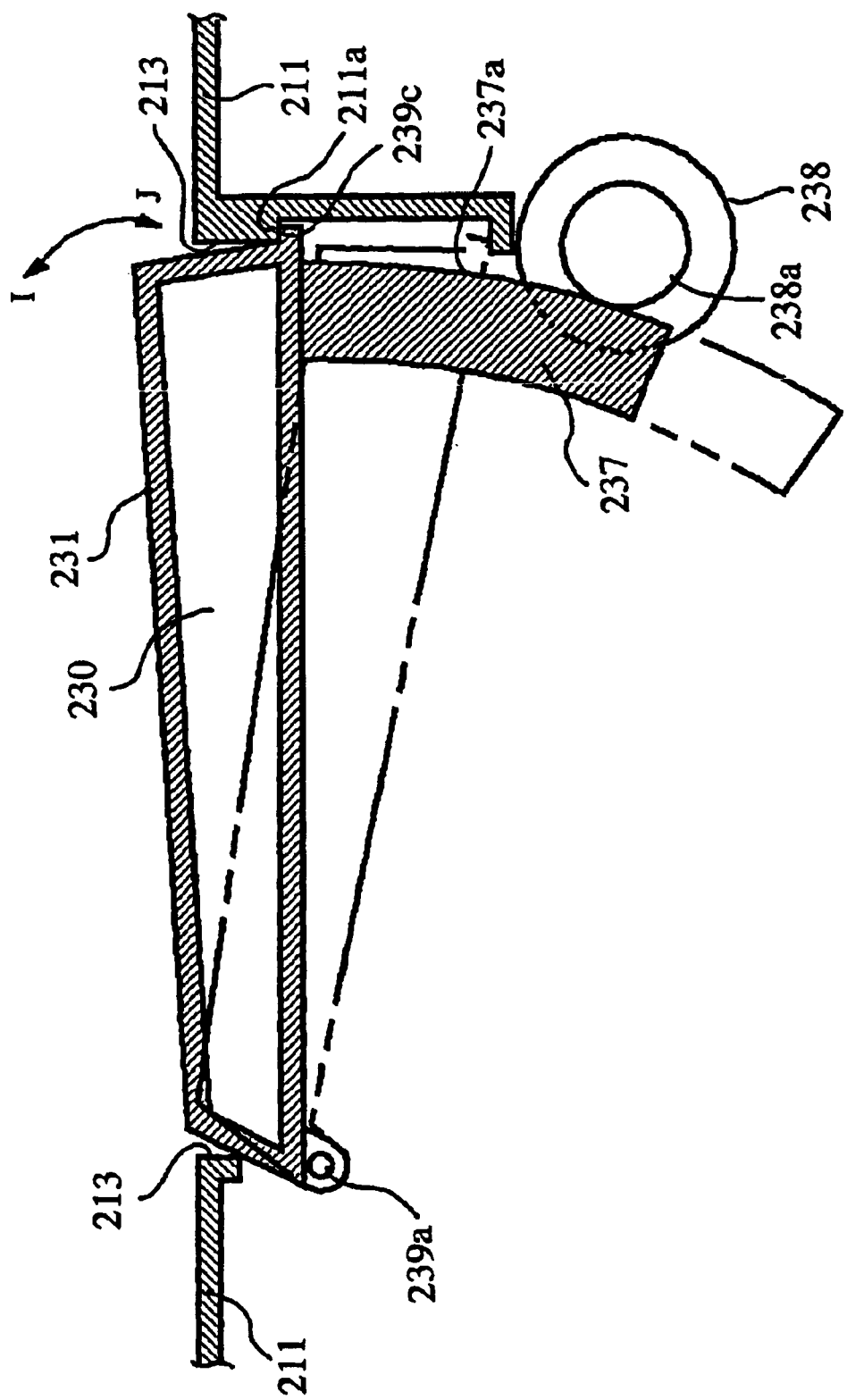
FIG. 9 is a sectional side view showing the side section of essential parts of FIG. 7.
Figure 10:
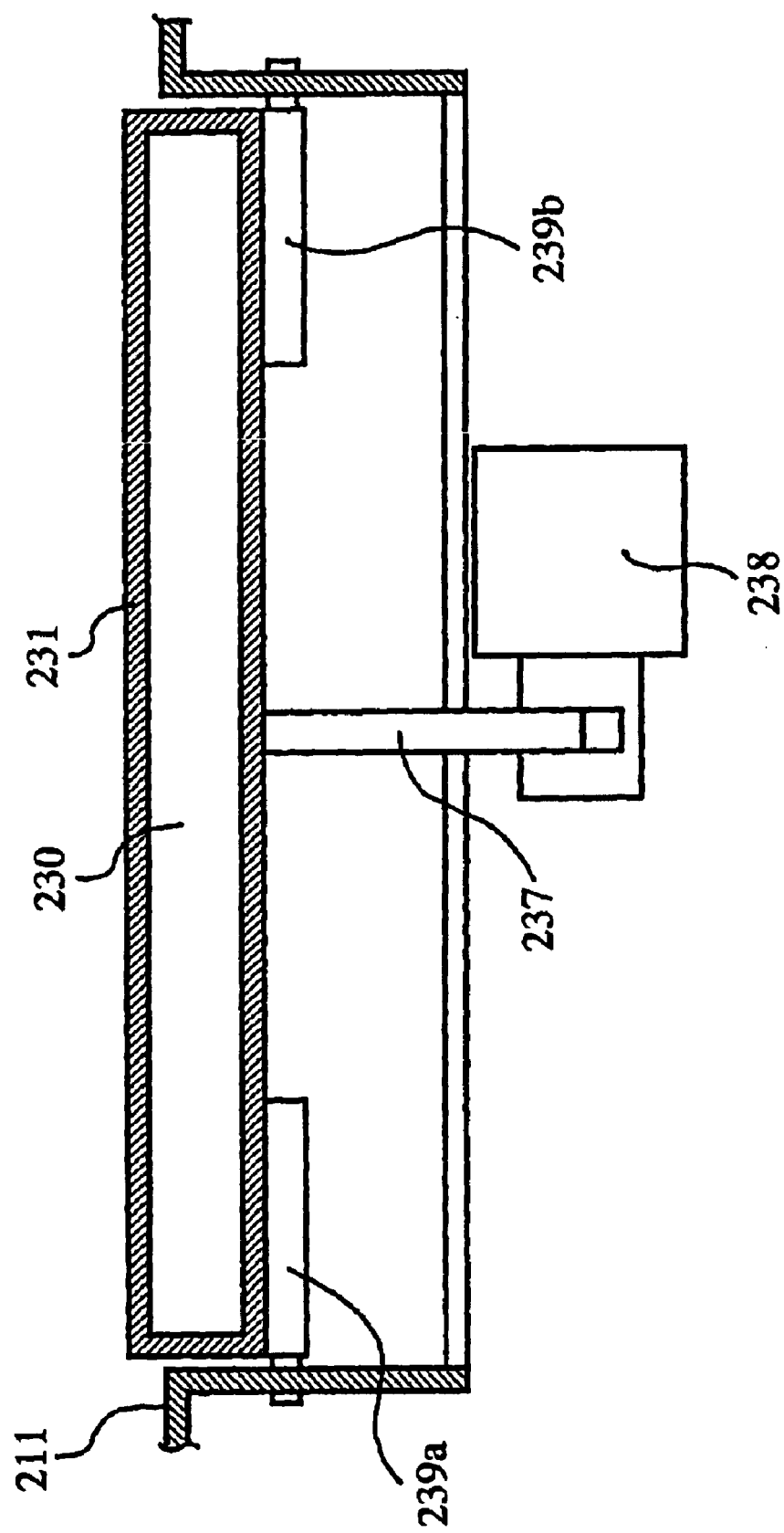
FIG. 10 is a sectional rear view showing a rear section of the essential parts of FIG. 7.

FIG. 7 is an outside view of the device operation control part 230 which is an essential part of the central console unit 200. FIG. 8 is a schematic arrangement of the rear surface showing the rear surface of the device operation control part 230. FIG. 9 is a sectional side view showing the side section of the device operation control part 230. FIG. 10 is a sectional front view showing the front section of the device operation control part 230.

A driving mechanism for the display 220 is provided at the lower part of a supporting part 222 of the display 220. This driving mechanism is made up of a comb-shaped part 223 which has formed on one surface thereof an engaging part 223a; and a driving part 224 which is provided inside the casing 210 and which has formed in a thereof an engaging part 224a so as to be engaged with the engaging part 223a formed in this comb-shaped part 223.

As a result of engagement of the engaging part 224a of this driving art 224 with the engaging part 223a of the comb-shaped part 223 and through rotational driving of the driving part 224 in the E direction or in the F direction, the up and down movement of the comb-shaped part 223 is also performed in H direction or in the G direction. The casing 210 is formed into a fault-like shape in the inside thereof, and one end thereof is fixed to the upper surface 211 of the casing 210 and the other end thereof is fixed to an upper surface 216 of the first layer of the casing 210, and supporting parts 225, 226 which support the display 220 are provided. These bar-shaped supporting parts 225, 226 are inserted into holes 222a, 222b which are formed in the supporting part 222 of the display 220 to thereby prevent the display 220 from unstably swinging sidewise.

As shown in FIG. 6, the display surface side of the display 220 is disposed on the left side of the comb-shaped part 223, i.e., on the rear side inside the motor vehicle.

The control surface 231 of the device operation control part 230 is provided with an air conditioner control part 232 which performs the operational control of an air conditioner (not shown); a joy stick 233 having form d in the center thereof a projected part which performs an operation of selecting a desired content from a menu screen as displayed on a display surface 221 of the display 220 when a predetermined operation is to be performed; an audio visual (AV) device operating part 234 which performs the operation of the operational control of audio devices and video reproducing devices (not shown) housed inside the central console unit 200; and a control part 235 which is provided with 10 keys of 0 through 9, a transmission key and an end key so as to operate at the time of inputting numerals into a hand-free telephone (not shown) installed inside the motor vehicle, a navigation device, or at the time of making calculations.

As shown in FIG. 8, a driving mechanism is arranged on the rear surface 236 of the device operation control part 230. This driving mechanism is made up of a comb-shaped part 237 having formed an engaging part 237a along a surface which is formed into an arc; and a driving part 238 which is provided inside the casing 210 and which has formed in a portion thereof an engaging part 238a. In a portion of the driving mechanism, there are formed rotatably supporting parts 239a, 239b into which are inserted rotary shafts (not shown) and which serve as fulcrums when the device operation control part 230 is to be projected from the casing 210 or housed inside the casing 210. At the surfaces opposite to these rotatably supporting parts 239a, 239b, there are formed engaging parts 239c, 239d which come into engagement with engaging parts 211a which are formed inside the casing 210 to prevent the control part 230 from getting out of engagement with the casing 210.

Since the above-described arrangement is employed, the engaging part 238a of the driving part 238 is engaged with the engaging part 237a of the comb-shaped part 237, and the device operation control part 230 moves in an arcuate shape in the J direction or in the I direction through the rotating drive of the driving part 238 in the I direction or in the J direction.

Further, depending on which particular position of the rail 110 the casing 210 is located, the display 220 moves in the H direction so as to be projected above the upper surface 211 of the casing 210, or moves in the G direction so as to be housed inside the casing 210. Further, depending on which particular position of the rail 110 the casing pat 230 is located, the device operator control part 230 moves in the I direction so as to be projected above the upper surface 211 of the casing 210, or moves in the J direction so as to be housed inside the casing 210.

A description will now be made about the relationship between the rail 110 and the central console unit 200. On the lower surface 215 of the casing 210, there is provided a rotatable wheel 201 having formed in the periphery thereof an engaging part 202 so as to be engaged with an engaging part 111 which is formed in the groove inside the rail 110. A driving source (not shown) is housed inside the wheel 201, and the wheel 201 is rotated by the rotary movement of this driving part.

Here, since the engaging part 202 formed in the periphery of the wheel 201 is in engagement with the engaging part 111 formed in the rail 110, the central console unit 200 moves in the A direction or in the B direction as a result of rotation of the driving part. In other words, as shown in FIG. 2, when the wheel 201 rotates in the G direction based on a command from the operating part, the central console unit 200 moves in the A direction and, if the wheel 201 rotates in the H direction, on the other hand, the central console unit 200 moves in the B direction.

If there is no rotational movement of the driving part, there will be movement neither in the A direction nor in the B direction because the wheel 201 is in engagement with the rail 110. It is thus so arranged that the central console unit 200 is fixed at the position in which the driving part is stopped.

Figure 14:
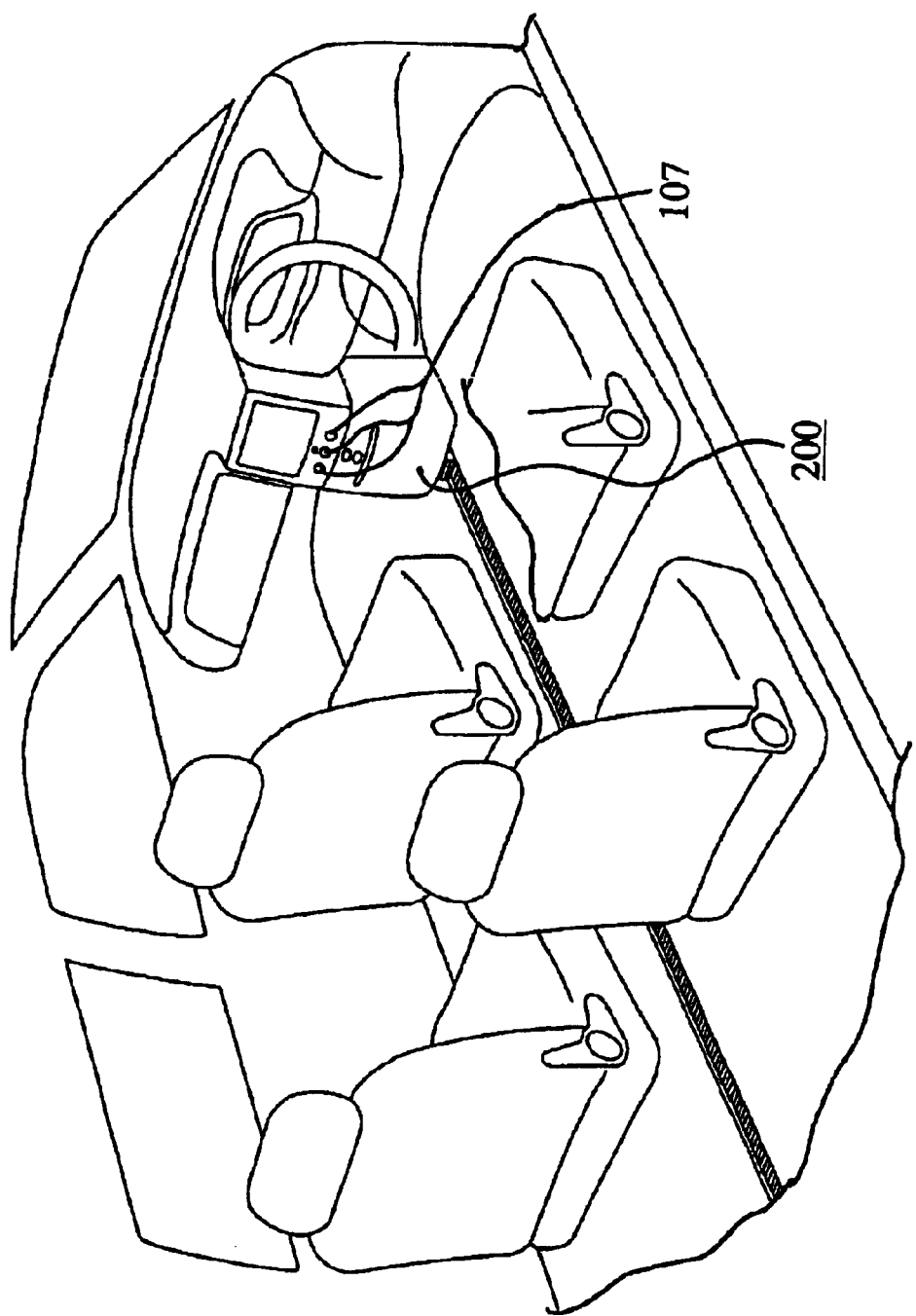
FIG. 14 is a schematic drawing showing essential parts which have been transitioned from the state in FIG. 1.

In addition, when the central console unit 200 is not in use, it is housed inside the housing space 109 (the initial position of the central console unit 200) as illustrated in FIG. 14.

Next, the operation of the central console unit 200 will be described.

Figure 11:
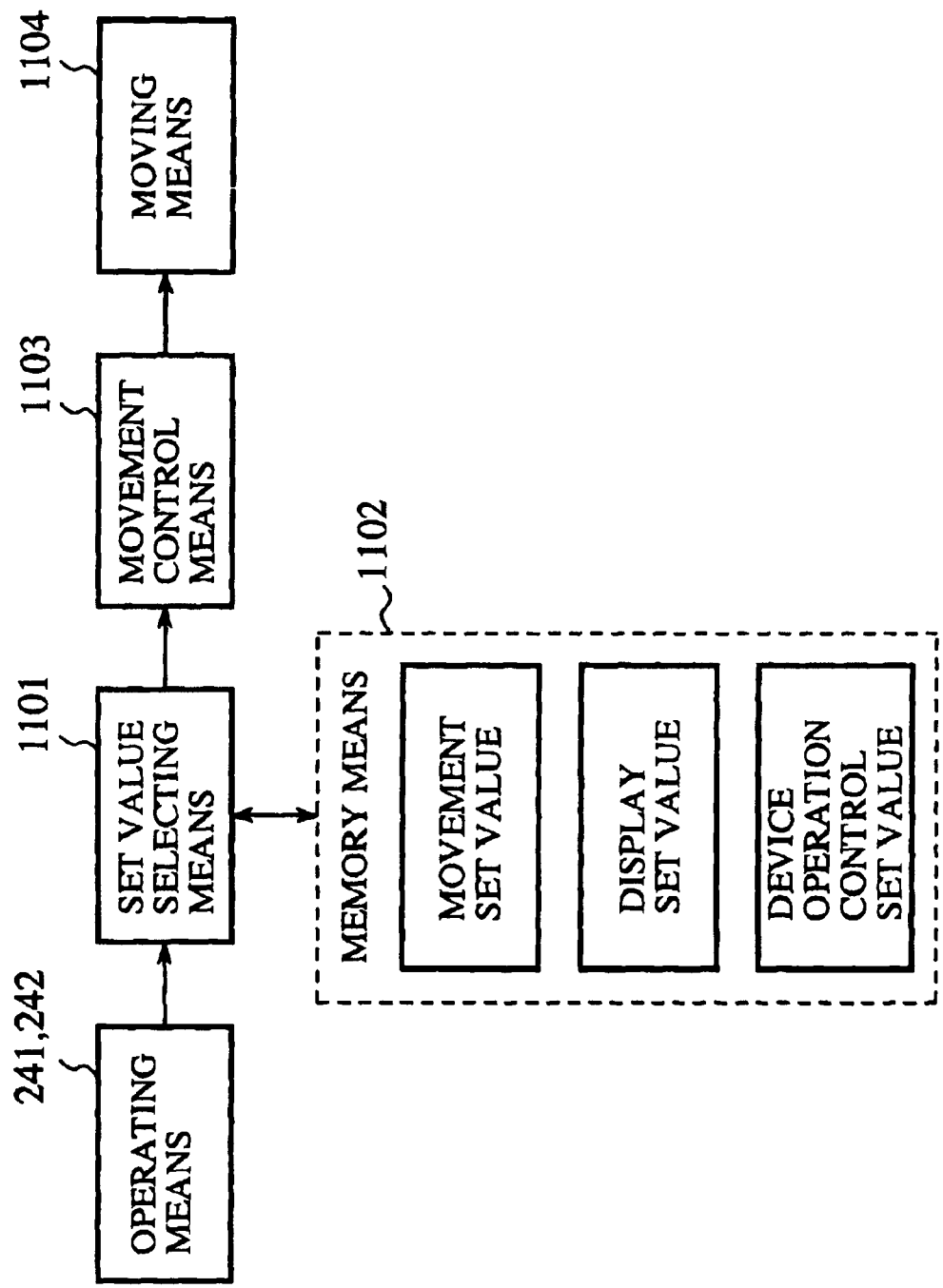
FIG. 11 is a block diagram showing the construction of essential parts of the device disposing apparatus for a mobile body according to a first embodiment.
Figure 13:
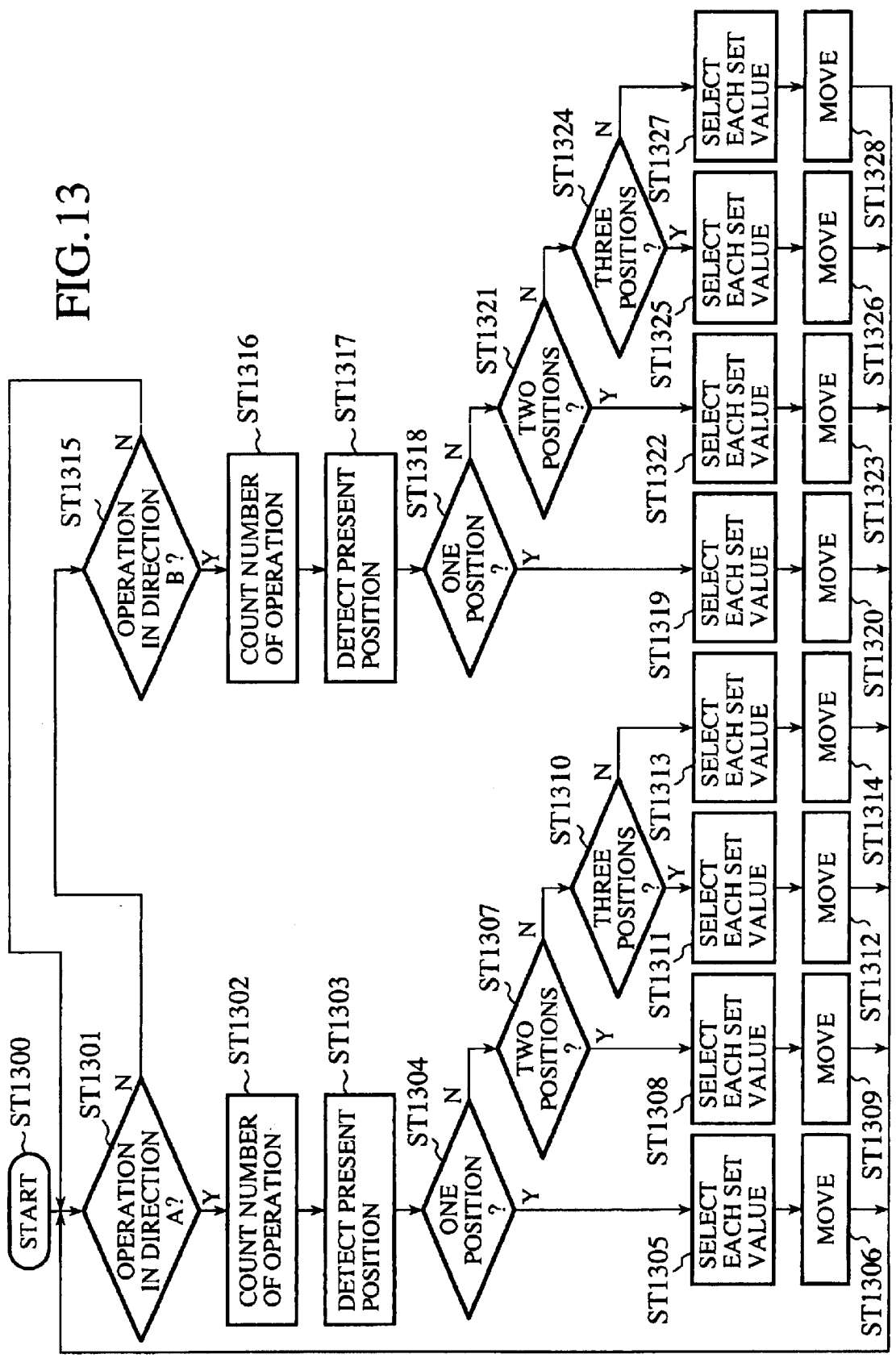
FIG. 13 is a flow chart showing the flow of operations in the device disposing apparatus for a mobile body and in the information processing equipment in a mobile body according to a first embodiment.

FIG. 11 is a block diagram showing the construction of main parts for performing the operational control of the device disposing apparatus in a mobile body according to the first embodiment. FIG. 12 is an explanatory drawing explaining essential parts in FIG. 11. FIG. 13 is a flow chart showing the flow of operations in the device disposing apparatus in a mobile body according to the first embodiment.

Reference numerals 241, 242 denote operating parts. When the central console unit 200 is to be moved in the A direction as shown in FIG. 1, the operating part 241 is operated by pushing, and when it is to be moved in the B direction, the operating part 242 is operated by pushing, whereby a given command signal is respectively outputted. In the first embodiment of the present invention, it is so arranged that, when the operating part 241, 242 is continuously pressed within a predetermined period of time (e.g., within 2 seconds), the number of times of the pressing operations is counted so that set value selecting means 1101 (to be described in more detail hereinafter) determines the setting position of the central console unit 200.

This set value selecting means 1101 selects a predetermined set value based on a command signal outputted by the operating part 241, 242 from movement set values stored in memory means 1102 (to be described in more detail hereinafter) and outputs this set value. Reference numeral 1102 denotes the memory means which stores therein, while keeping a correlation to the position of each of the seats 120, 130 provided inside the compartment of the motor vehicle: a direction and a distance of movement of the wheel 201; a set value as to whether the display 220 provided in the central console unit 200 shall be projected above the upper surface of the central console unit 200 or not; and a set value as to whether the device operation control part 230 provided in the central console unit 200 shall be projected above the upper surface of the central console unit 200 or not. The memory means has stored memory as shown in FIG. 12.

The contents of the memory stored in FIG. 12 will be described. The central console unit 200 has 5 positions as the fixing positions. The first position is an initial position, in which the central console unit 200 is housed inside the housing space 109 and is positioned in the front endmost position of the rail 110. Therefore, the movement set value of the central console unit 200 at the first position is made to be zero (0) cm. The display 220 is housed inside the casing 210 and the device operation control part 230 is also housed inside the casing 210. This first position corresponds to none of the seat positions.

The second position is the position to correspond to the driver's seat. The movement set value is set to 5 cm in the A direction as shown in FIG. 1 the basis of the first position. The display 220 is housed inside the casing 210 and the device operation control part 230 is projected above the upper surface of the casing 210 by a predetermined angle of inclination of θ degrees.

The third position is a position to correspond to the front-passenger's seat. The movement set value is set to 15 cm in the A direction as shown in FIG. 1 on the basis of the first position. It is so arranged that the display 220 is projected above the upper surface of the casing 210. The device operation control part 230 is also projected above the upper surface of the casing 210 so as to have a predetermined inclination.

The fourth position is a position to correspond to the intermediate seats. The movement set value is set to 60 cm in the A direction as shown in FIG. 1 on the basis of the first position. The display 220 and the device operation control part 230 are projected from the upper surface of the casing 210. The fourth position corresponds to both the right and left seats of the intermediate seats.

The fifth position (not shown) is to correspond to the rear seats. The movement set position is set to 120 cm in the A direction as shown in FIG. 1 on the basis of the first position. Like in the fourth position, the display 220 and the device operation control part 230 are projected above the upper surface of the casing 210. In this respect, this fifth position corresponds to both the right and left seats of the rear seats. These first through fifth positions are determined by the number of successive operations, within a predetermined period of time, of the operating means 241, 242. For example, while the central console unit 200 is being set to the first position, if the successive pressing operations are made to the operating means 241 for three times, the setting is made to the fourth position by passing through the second position and the third position. On the other hand, if successive pressing operations are made for two times to the operating means 242 while the central console unit 200 is in this state, i.e., in the fourth position, the setting is made to the second position by passing through the third position.

Here, in case the movement is to be made by one position at a time, the following applies.

Figure 15:
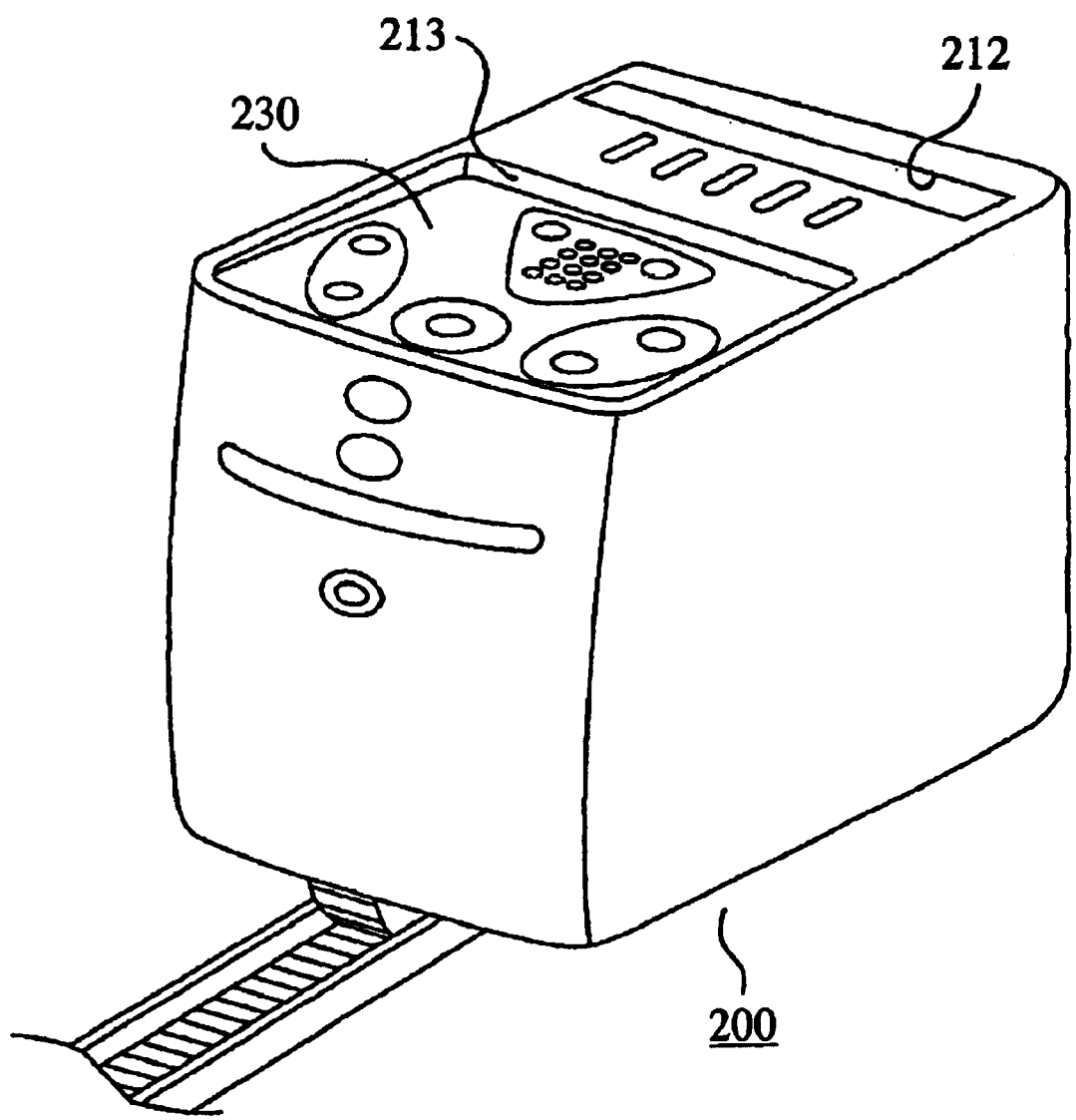
FIG. 15 is a schematic drawing showing the state of essential parts in FIG. 14.

Namely, while the central console unit 200 is not in use, the central console unit 200 is housed under the central lower part of the instrument panel (first position) as shown in FIG. 14. The operating states of the display 200 and the device operation control part 230 of the central console unit 200 are as shown in FIG. 15.

Figure 16:
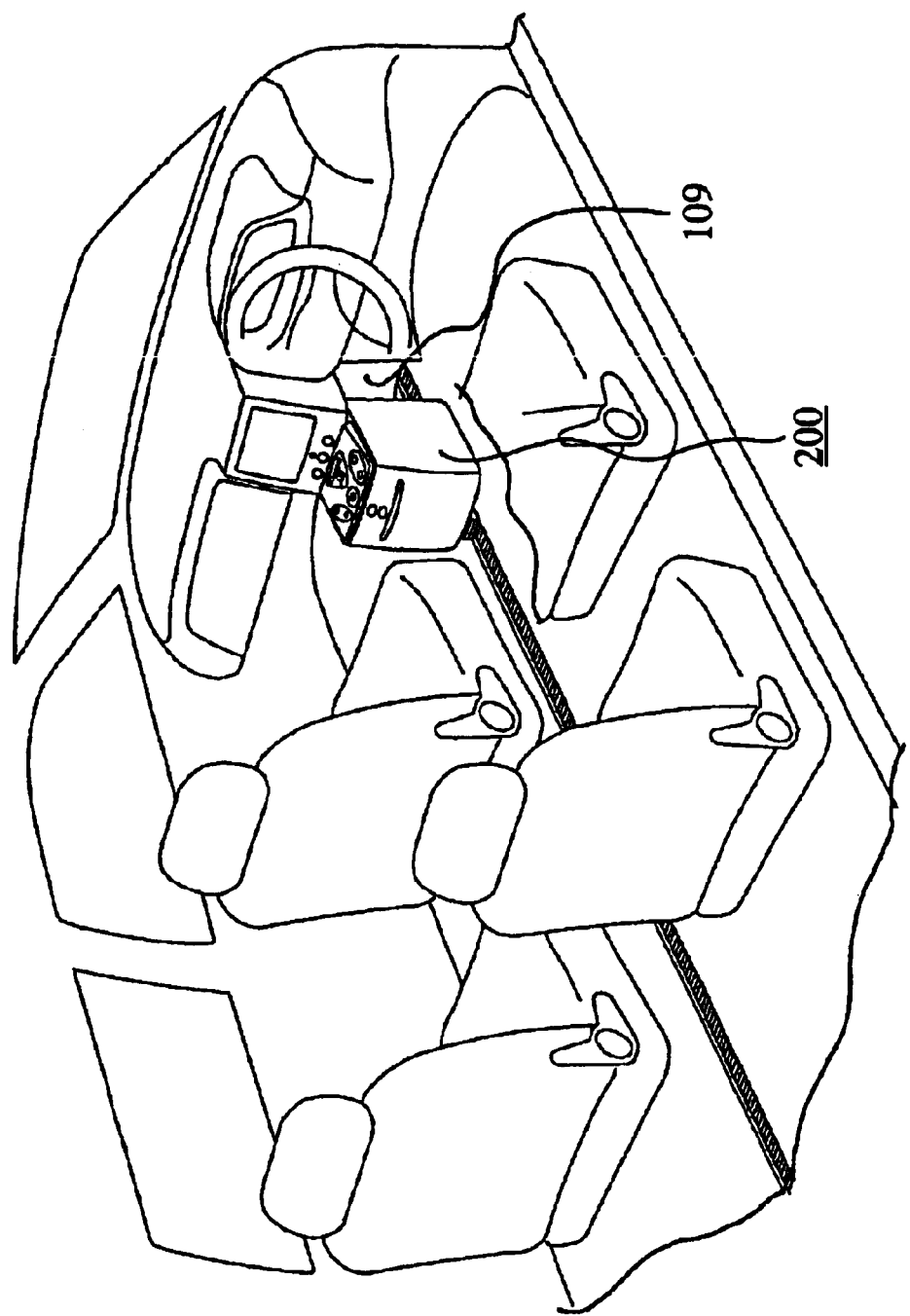
FIG. 16 is a schematic drawing showing a state of essential parts which have been transitioned from the state in FIG. 1.
Figure 17:
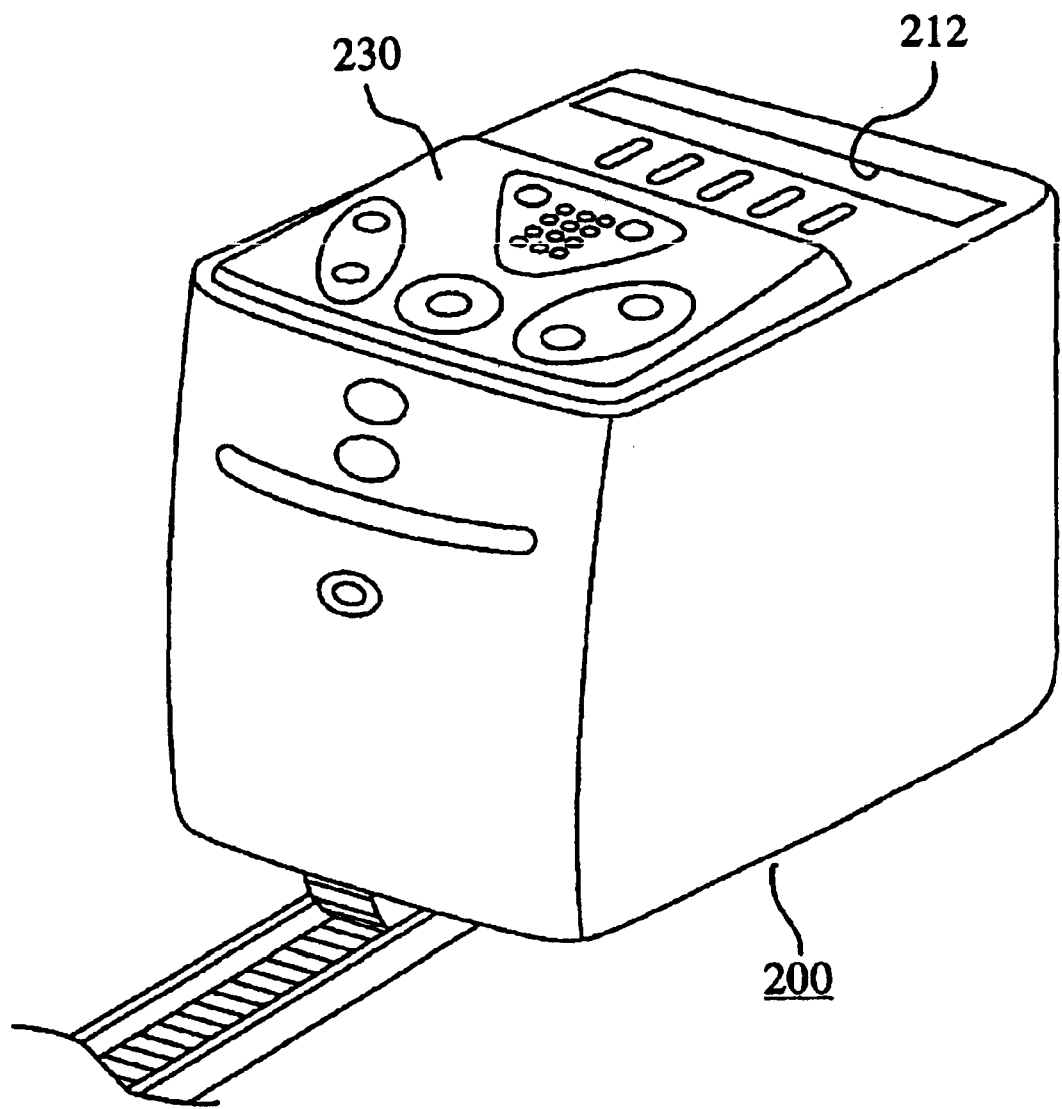
FIG. 17 is a schematic drawing showing the state of essential parts in FIG. 16.

Here, if a pressing operation to the operating part 241 is made for one time, i.e., if an operation is made to command the movement in the A direction by one position, the wheel 201 is rotated so as to move from the first position to the position (second position) as shown in FIG. 16 which corresponds to the driver's seat. The operating states of the display 220 and the device operation control part 230 of the central console unit 200 are as shown in FIG. 17.

If a pressing operation is made for one time to the operating part 241 in the same manner as above, the central console unit 200 moves by one position from the second position in the A direction up to that position (third position) shown in FIG. 1 which corresponds to the front passenger's seat. At this time, the operating state of the central console unit 200 is as shown in FIG. 2.

Figure 18:
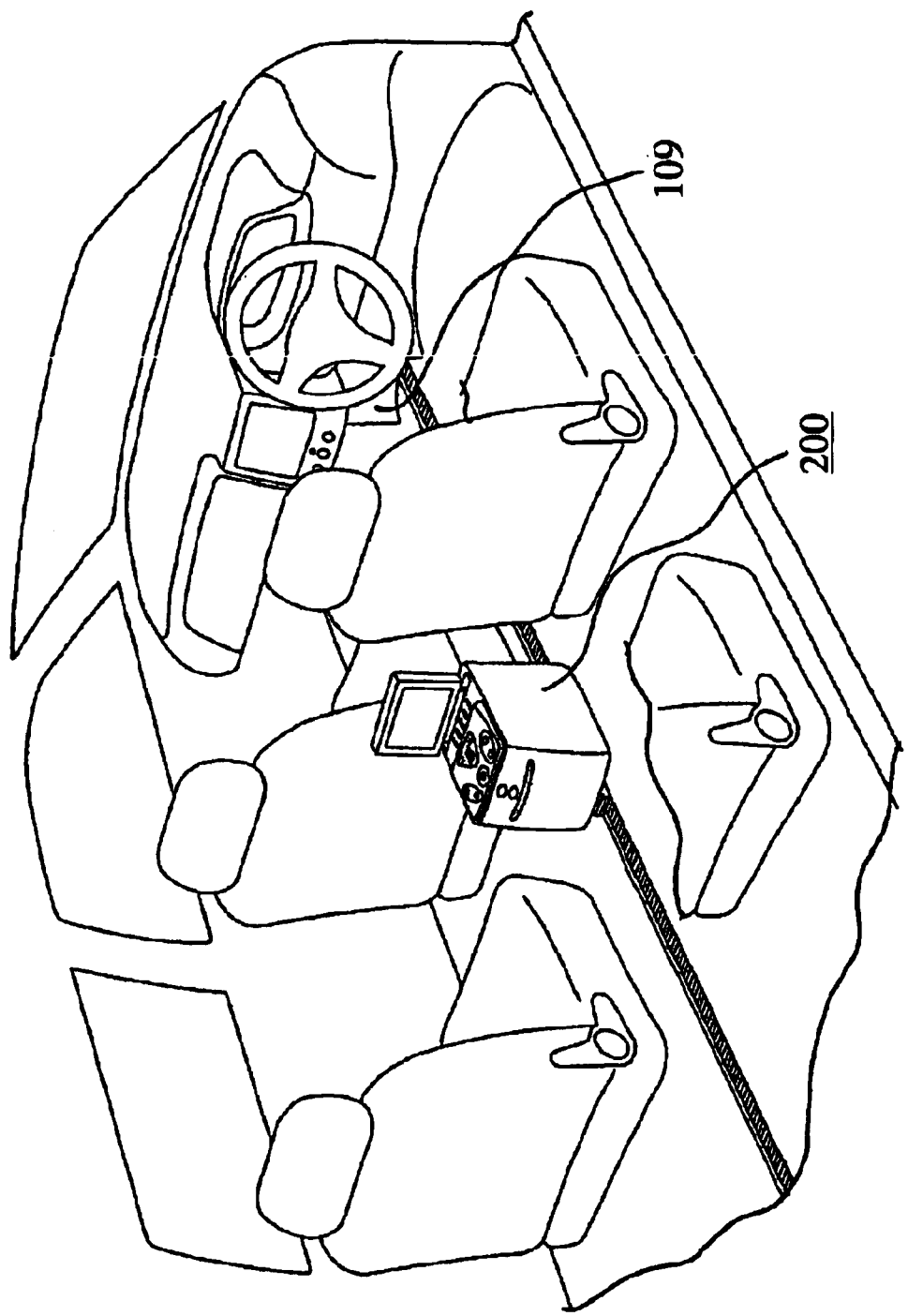
FIG. 18 is a schematic drawing showing a state of essential parts which have been transitioned from the state in FIG. 1.

Further, if an operation is made to command the movement by one position in the same manner as above, the central console unit 200 moves by one position from the third position up to the position (fourth position) shown in FIG. 18. The operating state of the central console unit 200 at this time is also as shown in FIG. 2.

If an operation to command a further movement from the position as shown in FIG. 18 by one position, the central console unit 200 moves, though not shown from the fourth position in the A direction up to the position (fifth position) corresponding to the rear seats. The operating state of the central console unit 200 at this time is also as shown in FIG. 2.

On the other hand, in case of movement in the B direction, the operations in the order opposite to the above are made, i.e., from the fifth position to the position (first position) as shown in FIG. 14 through the positions as shown in FIG. 18 (fourth position), in FIG. 1 (third position) and in FIG. 16 (second position).

When the power of the mobile body is switched off, the central console unit 200 is automatically set to, and is moved to, the initial position as the first position as shown in FIG. 14 whichever position the setting may have been made.

Reference numeral 1103 as shown in FIG. 11 denotes a movement control means which moves the central console unit 200 depending on a movement set value a display projection set value as display means projection set value, and a device operation control part projection set value as a device operation control means projection set value, as selected from the memory means 1102 shown in FIG. 5 and as outputted from the set value selecting means, to thereby project the display 220 and the device operation control part 230 above the upper surface of the casing 210 or to house them inside the casing part 210. Reference numeral 1104 denotes moving means which moves the central console unit 200 in the A direction or in the B direction shown in FIG. 1 based on a control signal outputted by the movement control means 1103 to thereby project the display 220 and the device operation control part 230 above the upper surface of the casing 210 or house them inside the casing 210. This moving means 1104 is made up of the wheel 201; the engaging part 202 which is formed on a peripheral surface of the wheel 201; the driving part (not shown) which is housed inside the wheel 201; the rail 110; the engaging part 111 which is formed inside the groove of the rail 110; and the driving mechanism for the display 220 and the driving mechanism for the device operation control part 230.

Next, a flow chart showing the operation of the device disposing apparatus in a mobile body is shown in FIG. 13 and a description will now be made about the operation of the apparatus of the present invention referring to FIG. 13.

First, when the power source of the mobile body is switched on, there will be started a state of ready for operation (step 1300), whereby the operation is started. At this step 1300, the set value selecting means 1101 judges as to whether an operation for movement in the A direction as shown in FIG. 1 has been made, i.e., whether the operating part 241 of the central console unit 200 has been pressed for operation or not (step 1301). If a judgement is made at this step 1301 that the operation to the operating part 241 has been made, the set value selecting means 1101 judges how many times the pressing operation of the operating part 241 has been made within a predetermined time (e.g., within 2 seconds) (step 1302). The memory contents of a memory (not shown) which is provided inside the casing and which stores therein, with constant renewal, the position presently set for the central console unit 200 are extracted by the set value selecting means 1101 (step 1303).

Then, based on the content of the step 1302, the set value selecting means 1101 judges as to whether the movement is by one position or not (step 1304). If a judgement is made at this step 1304 that the movement is by one position, the set position selecting means 1101 selects based on the contents of the step 1303: the moving direction and the moving distance of the central console unit 200 corresponding to the position obtained by adding one position to the present position; the display set value as to whether the display 220 shall be projected above the upper surface of the casing 210 or not; and the device operation control part set value as to whether the device operation control part 230 shall be projected above the upper surface of the casing 210 or not, thereby outputting them to the movement control means 1103 (step 1305). After processing this step 1305, the movement control means 1103 receives the output from the set value selecting means 1101 and outputs a movement control signal to the moving means 1104 so as to perform the predetermined moving operation. At the same time, if the set value is to project the display 220 and the device operation control part 230, they are projected and, if the set value is to house them inside the casing 210, they are housed inside the casing 210 (step 1306). After the operation of this step 1306, the procedure returns to step 1301, so that the operating parts 241, 242 become a state ready for operation. The operating processes after the step 1301 are the same as the above description.

In case a judgement is made at step 1304 that the movement is not by one position, the set value selecting means 1101 judges as to whether the movement is to be made by two positions or not (step 1307). If a judgement is made at this step 1307 that the movement is to be made by two positions, the set value selecting means 1101 selects based on the contents of the step 1303: the moving direction and the moving distance of the central console unit 200 corresponding to the position obtained by adding two positions to the present position; the display set value as to whether the display 220 shall be projected above the upper surface of the casing 210 or not; and the device operation control part set value as to whether the device operation control part 230 shall be projected above the upper surface of the casing 210 or not, thereby outputting them to the movement control means 1103 (step 1308). After processing this step 1308, the movement control means 1103 receives the output from the set value selecting means 1101 and outputs a movement control signal to the moving means 1104 so as to perform a predetermined movement operation, thereby moving the central console unit 200. At the same time, the display 220 and the device operation control part 230 are projected (step 1309). After the operation of this step 1309, the procedure returns to step 1301, so that the operating parts 241, 242 become a state ready for receiving an operation. The operating processes after the step 1301 are the same as the above description.

In case a judgement is made at step 1307 that the movement is not by two positions, the set value selecting means 1101 makes a judgement as to whether the movement shall be made by three positions or not (step 1310). If a judgement is made at this step 1310 that the movement is to be made by three positions, the set value selecting means 1101 selects based on the contents of the step 1303: the moving direction and the moving distance of the central console unit 200 corresponding to the position obtained by adding three positions to the present position; the display set value as to whether the display 220 shall be projected above the upper surface of the casing 210 or not; and the device operation control part set value as to whether the device operation control part 230 shall be projected above the upper surface of the casing 210 or not, thereby outputting them to the movement control means 1103 (step 1311). After the processing of this step 1311, the movement control means 1103 receives the output from the set value selecting means 1101 and outputs to the moving means 1104 a movement control signal so as to make a predetermined movement operation, thereby moving the central console unit 200 and also projects the display 220 and the device operation control part 230 (step 1312). After the operation of this step 1312, the procedure returns to step 1301, so that the operating parts 241, 242 become a state ready for receiving an operation. The operating processes after the step 1301 are the same as the above description.

In case a judgement is made at step 1303 that the movement is not by three positions, the set value selecting means 1101 judges that the movement is by four positions. The set value selecting means 1101 then selects based on the contents of the step 1303: the moving direction and the moving distance of the central console unit 200 corresponding to the position obtained by adding four positions to the present position; the display set value as to whether the display 220 shall be projected above the upper surface of the casing 210 or not; and the device operation control part set value as to whether the device operation control part 230 shall be projected above the upper surface of the casing 210 or not, thereby outputting them to the movement control means 1103 (step 1313). After processing this step 1313, the movement control means 1103 receives an output from the set value selecting means 1101 and outputs a movement control signal to the moving means 1104 so as to make a predetermined movement, thereby moving the central console unit 200 and, at the same time, the display 220 and the device operation control part 230 are projected (step 1314). After the operation of this step 1314, the procedure returns to step 1301, so that the operating parts 241, 242 become a state ready for operation. The operating processes after the step 1301 are the same as the above description.

On the other hand, the set value selecting means 1101 judges at step 1301 as to whether the operation in the direction of B as shown in FIG. 1, i.e., as to whether the operating part 242 of the central console unit 200 has been operated by pressing or not (step 1315). If a judgement is made at this step 1315 that the operation of the operating part 242 has been made, the set value selecting means 1101 judges how many times the pressing operation of the operating part 242 has been made within a predetermined time (e.g., within 2 seconds) (step 1316). The memory contents of the memory which is provided inside the casing and which stores therein, with constant renewal, the position set for the central console unit 200 are extracted by the set value selecting means 1101 (step 1317). The memory is provided inside the set value selecting means 1101 and determines the moving set value, or the like, by comparing with this memory.

Then, based on the content of the step 1317, the set value selecting means 1101 judges as to whether the movement shall be made by one position or not (step 1318). If a judgement is made at this step 1318 that the movement is to be made by on position, the set value selecting means 1101 selects based on the contents of the step 1317: the moving direction and the moving distance of the central console unit 200 corresponding to the position obtained by subtracting one position from the present position; the display set value as to whether the display 220 shall be projected above the upper surface of the casing 210 or not; and the device operation control part set value as to whether the device operation control part 230 shall be projected above the upper surface of the casing 210 or not, thereby outputting them to the movement control means 1103 (step 1319). After processing this step 1319, the movement control means 1103 receives an output from the set value selecting means 1101 and outputs a movement control signal to the moving means 1104 so as to perform the predetermined moving operation, thereby moving the central console unit 200. At the same time, if the set value is to project the display 220 and the device operation control part 230, they are projected and, if the set value is to house them inside the casing 210, they are housed inside the casing 210 (step 1320). After the operation of this step 1320, the procedure returns to step 1301, so that the operating parts 241, 242 become a state ready for receiving an operation. The operating processes after the step 1301 are the same as the above description.

In case a judgement is made at step 1318 that the movement is to be made not by one position, the set value selecting means 1101 judges as to whether the movement shall be moved by two positions or not (step 1321). If a judgement is made at this step 1321 that the movement is to be made by two positions, the set position selecting means 1101 selects based on the contents of the step 1317: the moving direction and the moving distance of the central console unit 200 corresponding to the position obtained by subtracting two positions from the pr sent position; the display set value as to whether the display 220 shall be projected above the upper surface of the casing 210 or not; and the device operation control part set value as to whether the control part 230 shall be projected above the upper surface of the casing 210, thereby outputting them to the movement control means 1103 (step 1322). After processing this step 1322, the movement control means 1103 receives an output from the set value selecting means 1101 and outputs a movement control signal to the moving means 1104 so as to perform a predetermined movement, thereby moving the central console unit 200. At the same time, if the set value is to project the display 220 and the device operation control part 230, they are projected and, if the set value is to house them inside the casing 210, they are housed inside the casing 210 (step 1323). After the operation of this step 1323, the procedure returns to step 1301, so that the operating parts 241, 242 become a state ready for receiving an operation. The operating processes after the step 1301 are the same as the above description.

In case a judgement is made at step 1321 that the movement shall be made not by two positions, the set value selecting means 1101 judges as to whether the movement shall be made by three positions or not (step 1324). If a judgement is made at this step 1324 that the movement is to be made by three positions, the set position selecting means 1101 selects based on the contents of the step 1303: the moving direction and the moving distance of the central console unit 200 corresponding to the position obtained by subtracting three positions from the present position; the display set value as to whether the display 220 shall be projected above the upper surface of the casing 210 or not; and the device operation control part set value as to whether the device operation control part 230 shall be projected above the upper surface of the casing 210 or not, thereby outputting them to the movement control means 1103 (step 1325). After the processing of this step 1325, the movement control part 1103 receives an output from the set position selecting means 1101 and outputs to the moving means 1104 the movement control signal so as to perform a predetermined moving operation, thereby moving the central console unit 200. At the same time, if the set value is to project the display 220 and the device operation control part 230, they are projected and, if the set value is to house them inside the casing 210, they are housed into the casing 210 (step 1326). After the operation of this step 1326, the procedure returns to the step 1301, so that the operating parts 241, 242 become a state ready for operation. The operating processes after the step 1301 are the same as the above description.

In case a judgement is made at step 1324 that the movement shall be made not by three positions, the set value selecting means 1101 judges that the movement is to be made by four positions. The set position selecting means 1101 then selects based on the contents of the step 1303: the moving direction and the moving distance of the central console unit 200 corresponding to the position obtained by subtracting four positions from the present position; the display set value as to whether the display 220 shall be projected above the upper surface of the casing 210 or not; and the device operation control part set value as to whether the control part 230 shall be projected above the upper surface of the casing 210 or not, thereby outputting them to the movement control means 1103 (step 1327). After processing this step 1327, the movement control means 1103 receives an output from the set value selecting means 1101 and outputs a movement control signal to the moving means 1104 so as to perform a predetermined moving operation, thereby moving the central console unit 200 and housing the display 220 and the device operation control part 230 (step 1328). After the operation of this step 1328, the procedure returns to step 1301, so that the operating parts 241, 242 become a state ready for operation. The operating processes after the step 1301 are the same as the above description.

If the set value selecting means 1101 judges at step 1315 that the operation of the operating part 242 has not been made, the procedure returns to step 1301, so that the operating parts 241, 242 become a state ready for operation. The operating processes after the step 1301 are the same as the above description.

Next, in the first embodiment, there is provided an information processing equipment in a mobile body which is equipped with cameras 108, 250 as imaging means, in addition to the device disposing apparatus in a mobile body. The information processing equipment in a mobile body will be described with reference to FIGS. 1, 2, 19 through 21.

Figure 19:
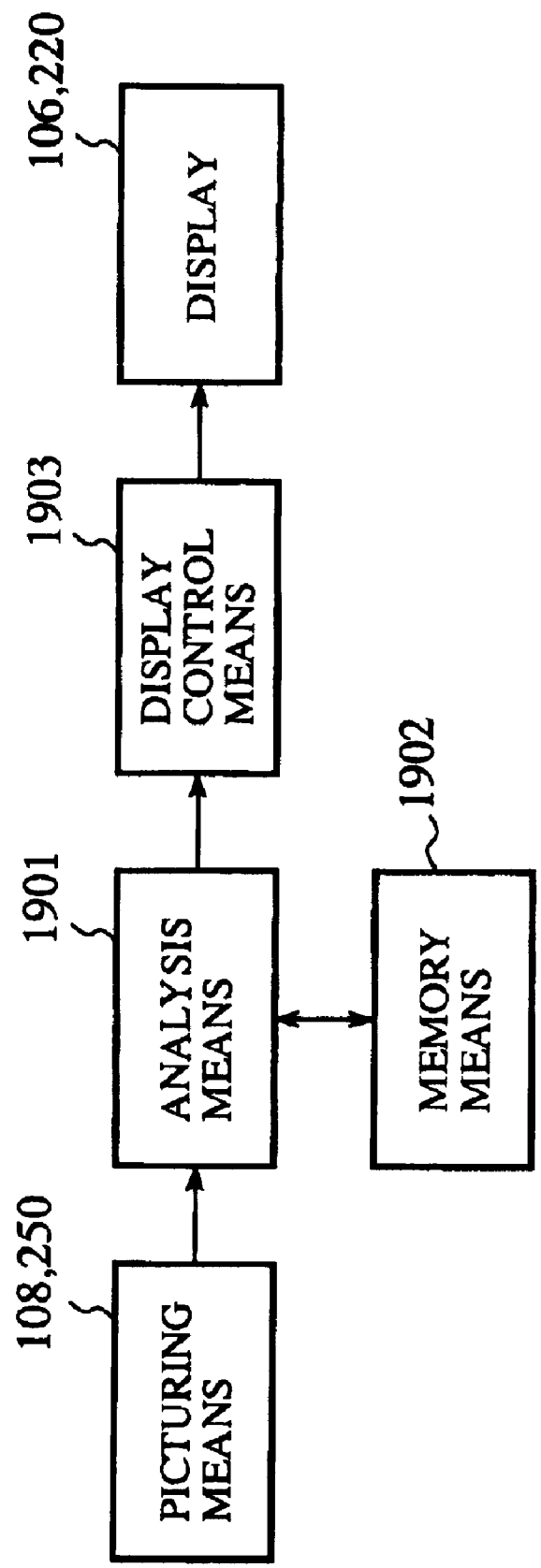
FIG. 19 is a block diagram showing an arrangement of essential parts of an information processing equipment for a mobile body according to the first embodiment.
Figure 21:
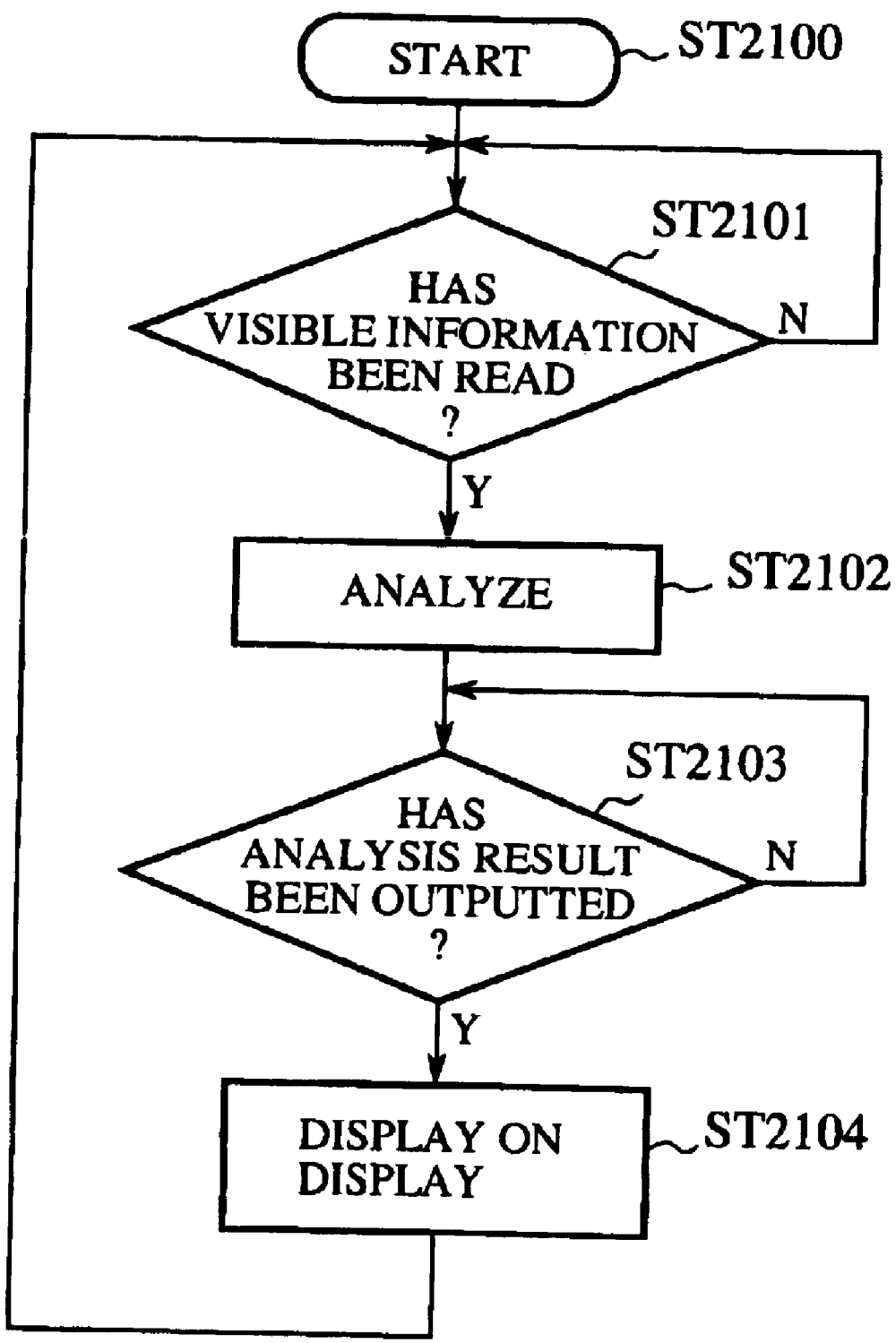
FIG. 21 is a flow chart showing the flow of operations of the information processing equipment according to a first embodiment.

FIG. 19 is a schematic drawing showing an arrangement showing an information processing equipment in a mobile body. FIG. 20 is an explanatory drawing showing an object to be imaged by a camera which is an essential part in FIG. 19. FIG. 21 is a flow chart showing the flow of operations of the information processing equipment in a mobile body in FIG. 18.

Reference numeral 108 denotes a camera as imaging means which is provided in the instrument panel 102. Reference numeral 250 denotes a camera as imaging means which is provided in a front of the central console unit 200.

These cameras 108, 250 have the same functions and are used to image visible information while placing objects to be imaged in front of the cameras 108, 250. These objects to be imaged are, for example, contents of receipts issued by a shop when commodities are purchased, inserted handbills in a newspaper, sightseeing guidebooks, or the like.

These information sources are captured by the cameras 108, 250 and are displayed on the display 106 provided in the instrument panel 102 or on the display 220 provided in the central console unit 200.

Reference numeral 1901 denotes analysis means which makes a comparison and analysis between the visible information obtained by the cameras 108, 250 and outputted, and dictionary information showing visible information for analyzing that visible information obtained by the cameras 108, 250 which is stored in memory means which is described in more detail hereinafter. Reference numeral 1902 denotes the memory means which stores therein the dictionary information as the visible information which is an object of comparison at the time of analysing, by the analysing means, the contents of the visible information obtained by the cameras 108, 250. This memory means 1902 stores therein the dictionary information required in recognising the characters such as figures, marks, alphabets, hiragana characters, katakana characters, Chinese characters, numerals, or the like. Reference numeral 1903 denotes display control means which outputs the results of analysis by the analysis means 1901 and displays them. The information processing equipment in a mobile body is made up of the above-described means.

FIG. 20 is an example of a receipt issued by a shop. Reference numeral 2001 denotes the name of the shop, reference numeral 2002 the place of presence (address) of the shop, reference numeral 2003 the date of purchasing, reference numeral 2004 the name of the commodity as an object for payment, and reference numeral 2005 particulars of the payment.

Each piece of information 2001 through 2005 used in FIG. 20 is obtained by the camera 108 or 250. The contents are analysed by the analysis means 1901 after comparison with the dictionary information stored in the memory means 1902, i.e., the letter information, or the like, of each piece of information 2001 through 2005 is recognised, and the result of this recognition (analysis result) is displayed on the display 106 or the display 220.

The operation will next be described with reference to FIG. 21. This FIG. 21 is a flow chart showing the flow of operations of the information processing equipment in a mobile body.

First, when the power source of the motor vehicle is switched on, there will be started a state which is ready for receiving imaging operation of the apparatus (step 2100) and the operation will be started. Then, the analysis means 1901 judges as to whether visible information has been read from the camera 108 or camera 250 (step 2101). If it is judged at this step 2101 that the visible information has been read, the analysis means 1901 selects and extracts out of the memory means 1902 the information which corresponds to the information corresponding to the visible information read by the camera, and then analyses (step 2102).

The display control means 1903 judges whether the result analysed at step 2102 has been outputted from the analysis means 1901 or not (step 2103). If a judgement is made that the analysis result has been outputted, this result is displayed on the display 106 or the display 220 (step 2104).

After the completion of the processing at step 2104, the procedure returns again to step 2101 to become a state ready for receiving the imaging operation of the apparatus. The processing similar to the above is carried out at step 2101 and thereafter.

If a judgement is made at step 2101 that the analysis means 1901 has not read the visible information, the procedure returns again to step 2101 to become a state ready for receiving the imaging operation of the apparatus. The processing similar to the above is carried out at step 2101 and thereafter.

If a judgement is made at step 2103 that the analysis result has not been outputted, the procedure returns to step 2103 and becomes a standby state until the analysis result is outputted.

As described above, the central console unit 200 having disposing means is provided in a position between the driver's seat 121 and the front-passenger's seat 122 in a motor vehicle 100 and into which can be disposed a CD player, a cassette tape recorder, a DVD player, or the like, and is movable along the rail 110. The disposing means has a device operation control part for performing the operation to these devices and display means for displaying the visible information of these devices as images such that the device operation control part and the display means can be housed into, and projected from, the disposing means. This central console unit 200 is arranged to be movable along the rail 110. The movement set value of the central console unit 200, the projection set value of the display 220, and the projection set value of the device operation control part 230 are stored in advance in correlation to each of the seats so that the central console unit 200 can be used adequately depending on the contents of operation. Therefore, it becomes possible for the passenger in any of the seats to operate the audio devices and the video reproducing devices at an appropriate position thereof. The central console unit 200 is automatically moved, based on the operation, to a position corresponding to the seated passenger in each seat. The central console unit 200 is thus automatically set to the most suitable position without the trouble on the part of the user of setting with fine-adjusting the position of the central console unit 200. The user is thus free from the trouble of setting operations, resulting in an improvement in the convenience of the user. In other words, it is possible to automatically project upward or to house the display 220 and the device operation control part 230 only by the operation of the device operation control parts. The troublesome operations can thus be eliminated, thereby improving the convenience of the user.

In addition, since it is possible to read the visible information, e.g., of a receipt, or the like, with the camera disposed inside the motor vehicle and then to display the result of analysis on the display provided inside the motor vehicle. The convenience of the user can thus be improved.

Second Embodiment

A device disposing apparatus in a mobile body according to the second embodiment of the present invention will be described.

The second embodiment is described with reference to the device disposing apparatus in a mobile body in which a display for a mobile body is used.

In the above-described first embodiment, a description is made based on an arrangement in which the rail 110 and the central console unit 200 are provided on the floor inside the motor vehicle. These rail 110 and the central console unit 200 may alternatively be provided on the ceiling inside the motor vehicle.

Figure 22:
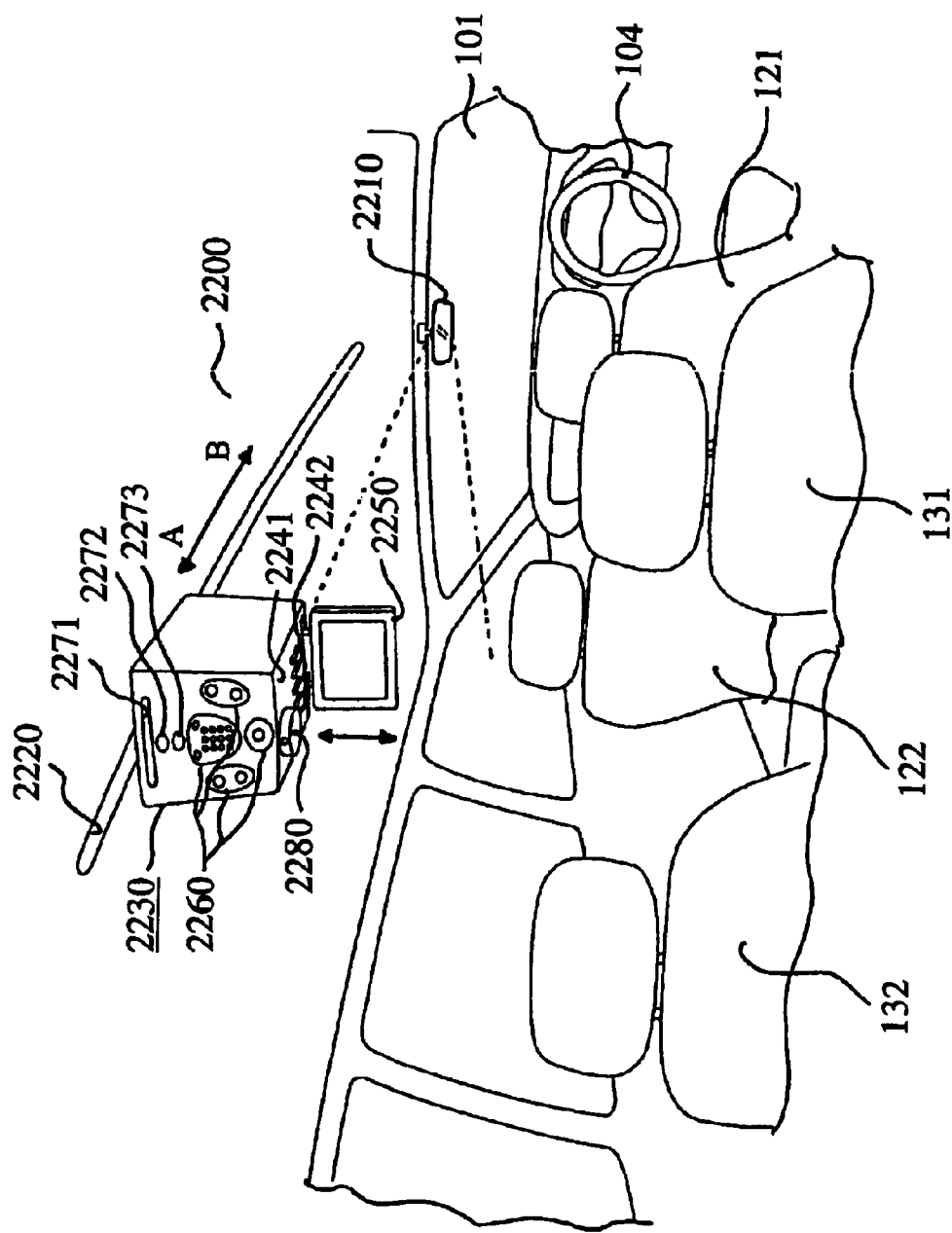
FIG. 22 is a schematic diagram showing an arrangement of essential parts of a device disposing apparatus for a mobile body and a display for a mobile body according to a second embodiment.

FIG. 22 is a schematic drawing showing an arrangement of the device disposing apparatus in a mobile body in which a display for a mobile body is used according to the second embodiment. Referring to FIG. 22, reference numeral 121 denotes a driver's seat, reference numeral 122 a front-passenger's seat, reference numeral 131 a right-side intermediate seat which is positioned behind the driver's seat, and reference numeral 132 a left-side intermediate seat which is positioned on the left side of the right-side intermediate seat.

Reference numeral 2200 denotes a ceiling inside the motor vehicle compartment. This ceiling 2200 is provided with a room mirror 2210 as first display means; a rail 2220 as guide means which is provided in a position between the seats 121, 131 disposed on the right side and the seats 122, 132 disposed on the left side so as to be elongated in the back and forth direction of the motor vehicle; and a central console unit 2230 which is guided by this rail 2220 so as to be movable in the A direction and the B direction in the same manner as in FIG. 1 and which contains therein a plurality of audio devices and video reproducing devices.

Figure 23:
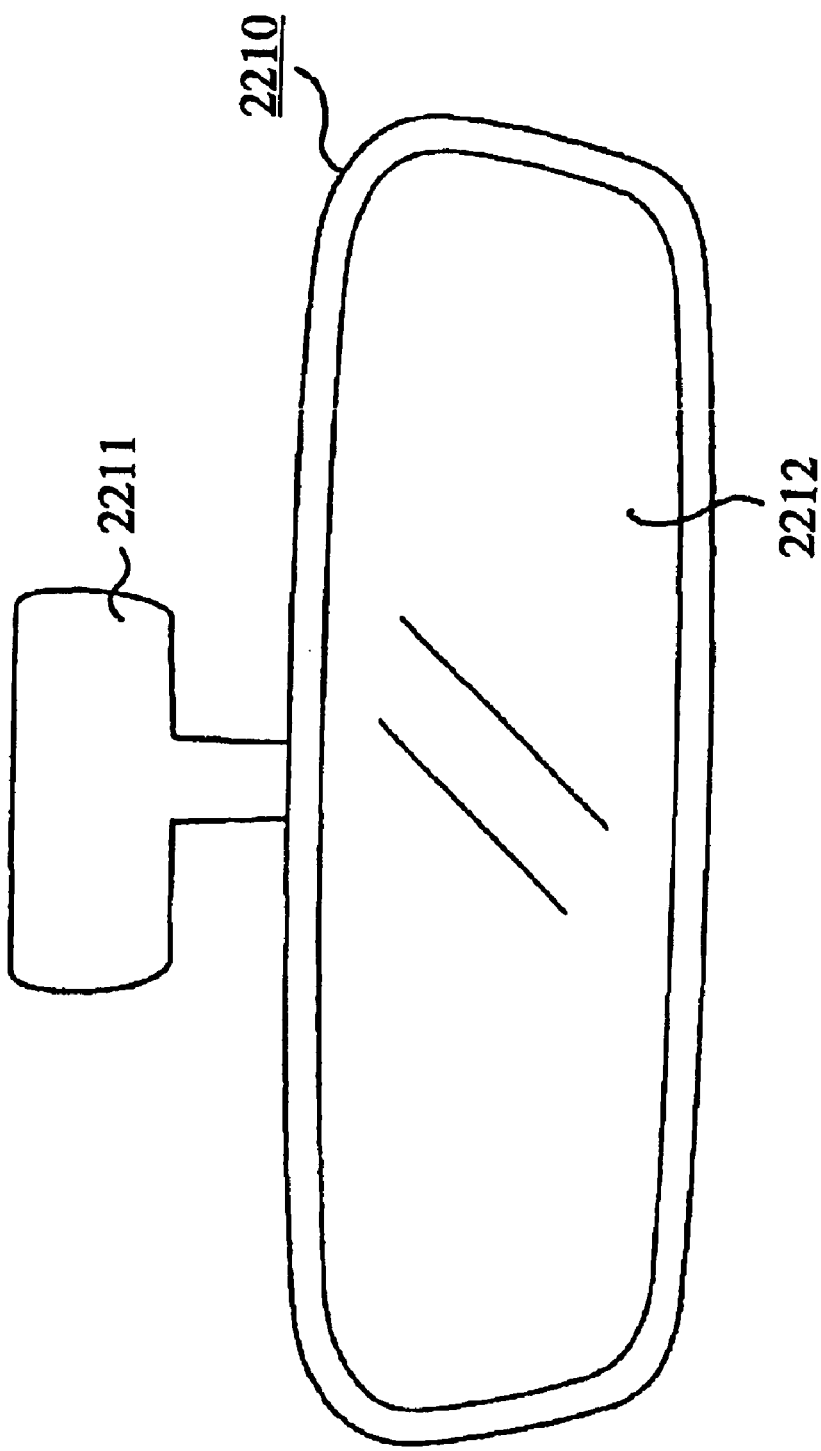
FIG. 23 is an explanatory drawing showing essential parts in FIG. 22.

The room mirror 2210 is disposed on the ceiling surface in front of the driver's seat 121 and has a function to display the status in the rear of, and in the inside of, the motor vehicle. Its external appearance is as shown in FIG. 23. The backward field of vision of this room mirror 2210 is shown in dotted lines.

The rail 2220 has formed therein a groove and the opening of this groove is formed shorter in length than the groove. When the console unit 2230, which is described in more detail hereinafter, is mounted on the rail 2220, the wheel of the central console unit 2230 is supported by the rear surface of the opening of the groove, thereby preventing the central console unit 2230 from dropping out of position.

On the rear surface of the groove opening of the rail 2220, there is formed an engaging part which comes into engagement with the engaging part formed in the wheel. By means of a driving motor housed inside the wheel, i.e., by rotatable operation of the wheel by the rotation of the driving motor, the central console unit 2230 is moved in the A direction or in the B direction.

Figure 50:
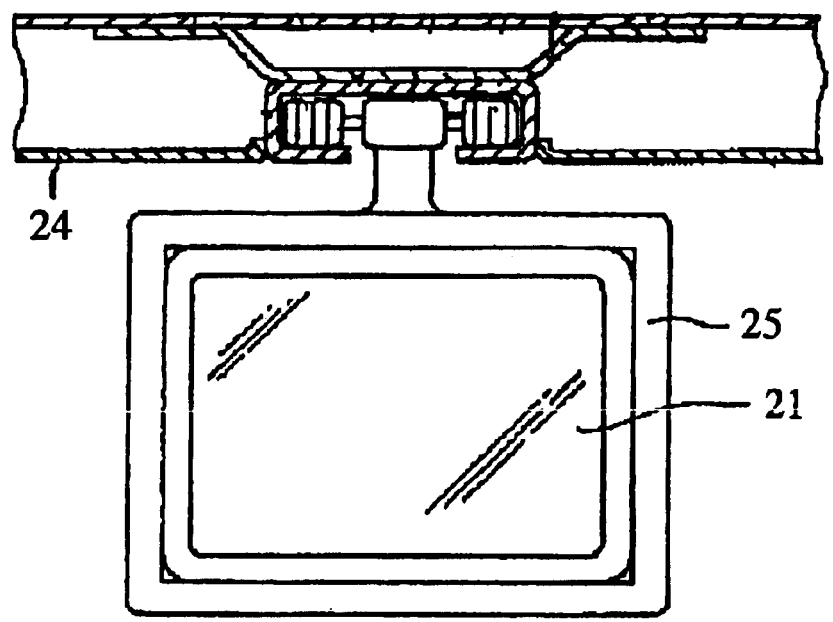
FIG. 50 is a sectional view showing a section of the conventional essential parts.

The sectional view to show the relationship between the rail 2220 and the central console unit 2230 has a similar mechanism as the one described in the paragraph of the prior art with reference to FIG. 50.

The central console unit 2230 will be described.

Reference numeral 2230 denotes the central console unit, which is made up of a casing 2240 of the central console unit; a display 2250 as display means which is disposed so as to be housed into an opening which is partly formed in the casing 2240 and which is projected downward when in use; a device operation control part 2260 which is disposed in a rear surface (this side as seen in FIG. 22) of the casing 2240; an inserting opening 2271 which is formed in the casing 2240 and into which are inserted memory media such as a CD, an MD, a DVD, or the like; an operating part 2271 which is operated when the central console part 2230 is to be moved in the A direction; and an operating part 2272 which is operated when the central console unit 2230 is to be moved in the B direction.

Reference numeral 2280 denotes a camera as imaging means which is disposed on the lower surface of the central console unit 2230 and which images the rear and the surrounding of the motor vehicle, as well as the inside of the motor vehicle. In order to enable to image along the back and forth direction as well as the right and left direction of the motor vehicle, the camera is arranged to be rotatable about 360°. This camera 2280 is normally held in a position in which the rear of the motor vehicle can be imaged.

In the lower surface 2241 of the casing 2240 there are formed a plurality of openings 2242. These plurality of openings 2242 constitute inserting ports into which memory cards such as IC cards can be inserted. In this embodiment, five memory cards can be inserted.

As the driving mechanism to project the display 2250 out of the lower surface 2241 of the casing 2240 and to house it into the casing 2240, there is provided inside the casing 2240 an arrangement which is similar to the driving mechanism as shown in FIGS. 4 through 6.

Depending on which position the casing pat 2240 is located along the rail 2220, the display 2250 is moved in the C direction so as to be projected below the lower surface of the casing 2240 or is moved in the D direction so as to be housed inside the casing 2240.

Figure 28:
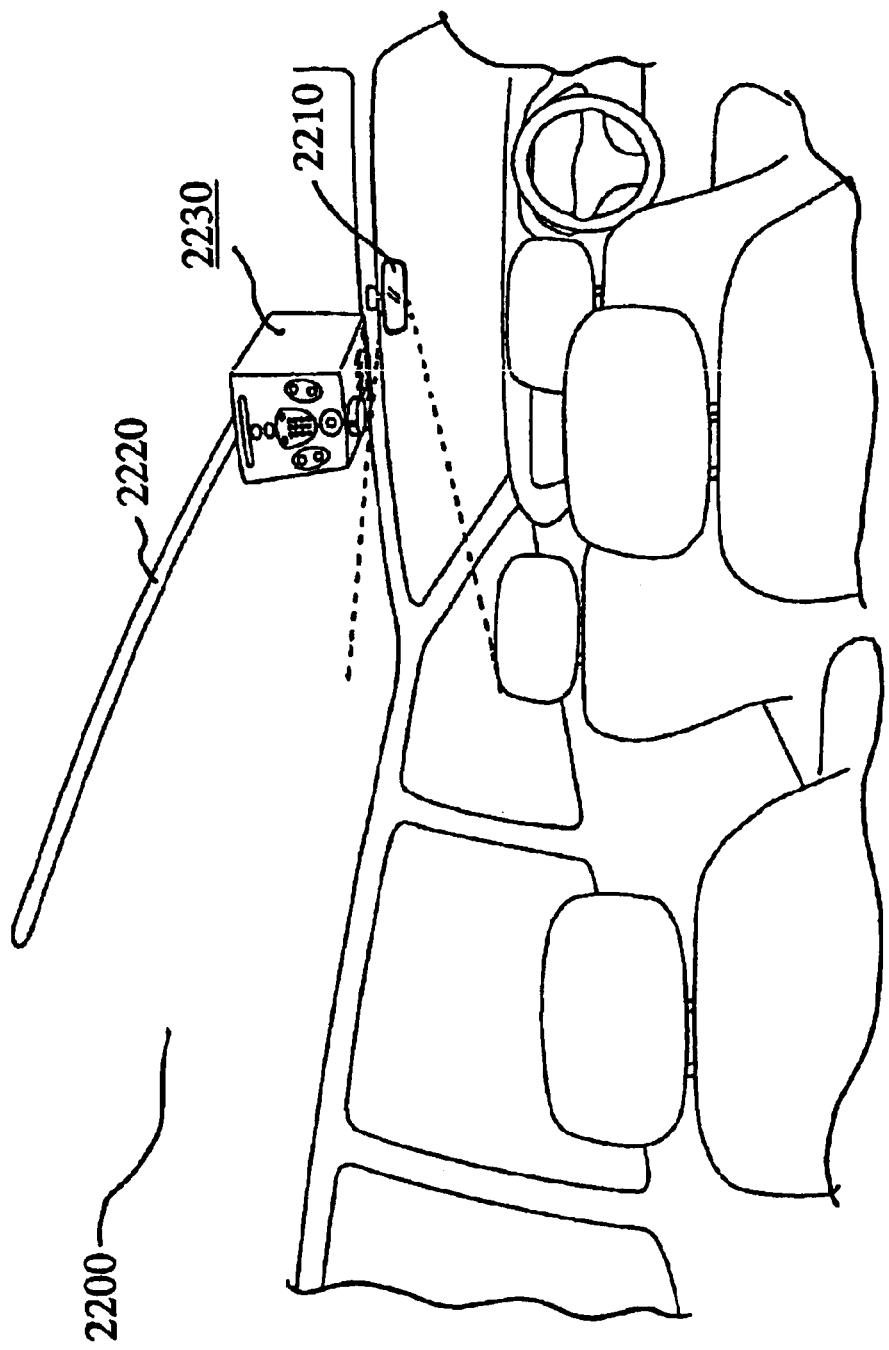
FIG. 28 is a schematic drawing showing essential parts which have transitioned from the state in FIG. 22.

When the central console unit 2230 is not in use, the central console unit is moved to the front endmost position inside the motor vehicle as shown in FIG. 28 (the initial position of the central console unit 2230).

The differences of this embodiment from that in FIG. 1 as described with reference to the first embodiment are as follows, i.e.: the up and down orientation of the central console unit 2230 is opposite to each other; the device operation control part 2260 is disposed on the front side of the side surface of the central console unit 2230 and is therefore not constituted so as to be housed inside the casing 2240; and the camera that is rotatable about 360° is disposed on the lower surface 2241 of the casing 2240.

Figure 24:
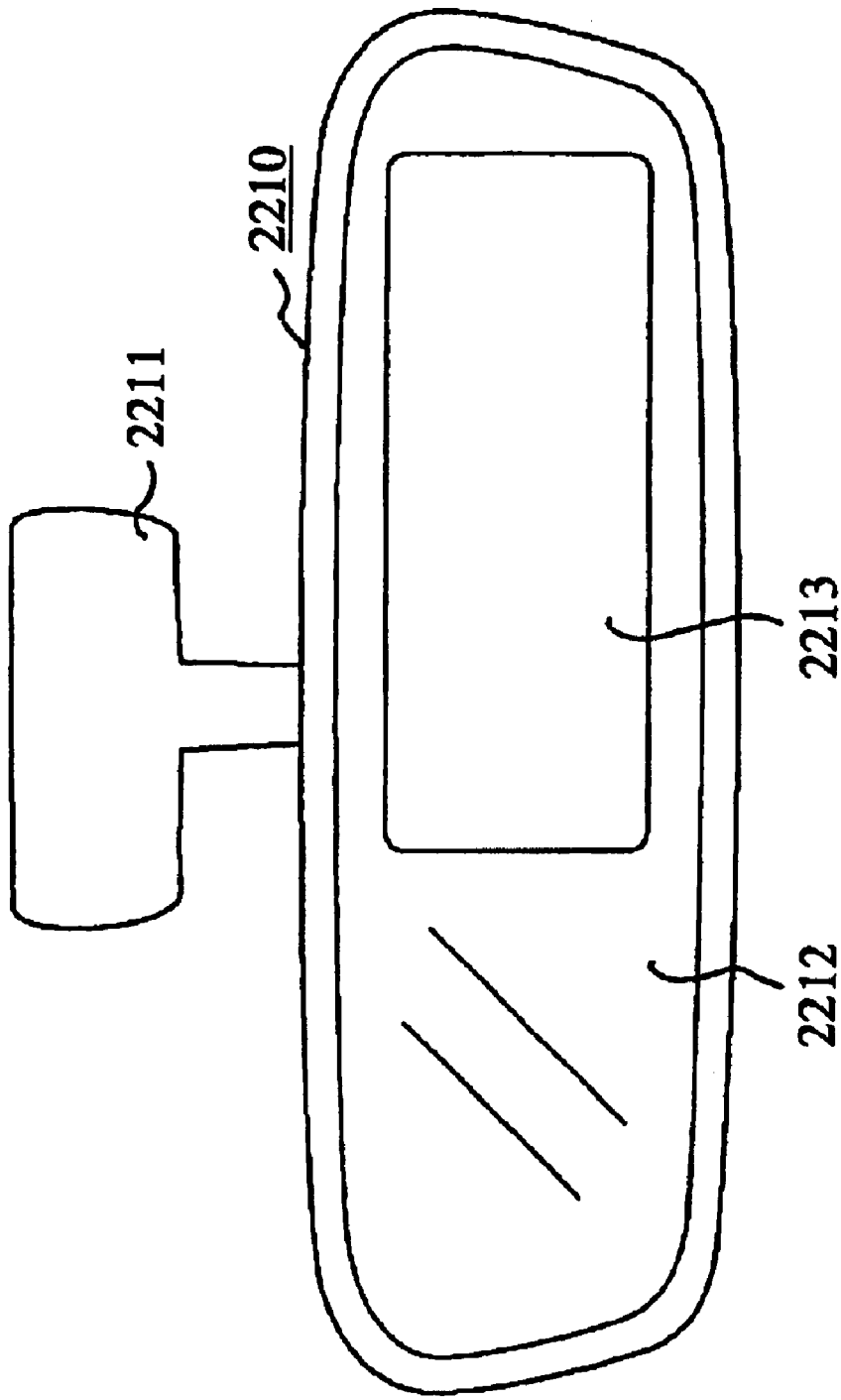
FIG. 24 is an explanatory drawing showing essential parts in FIG. 22.
Figure 25:
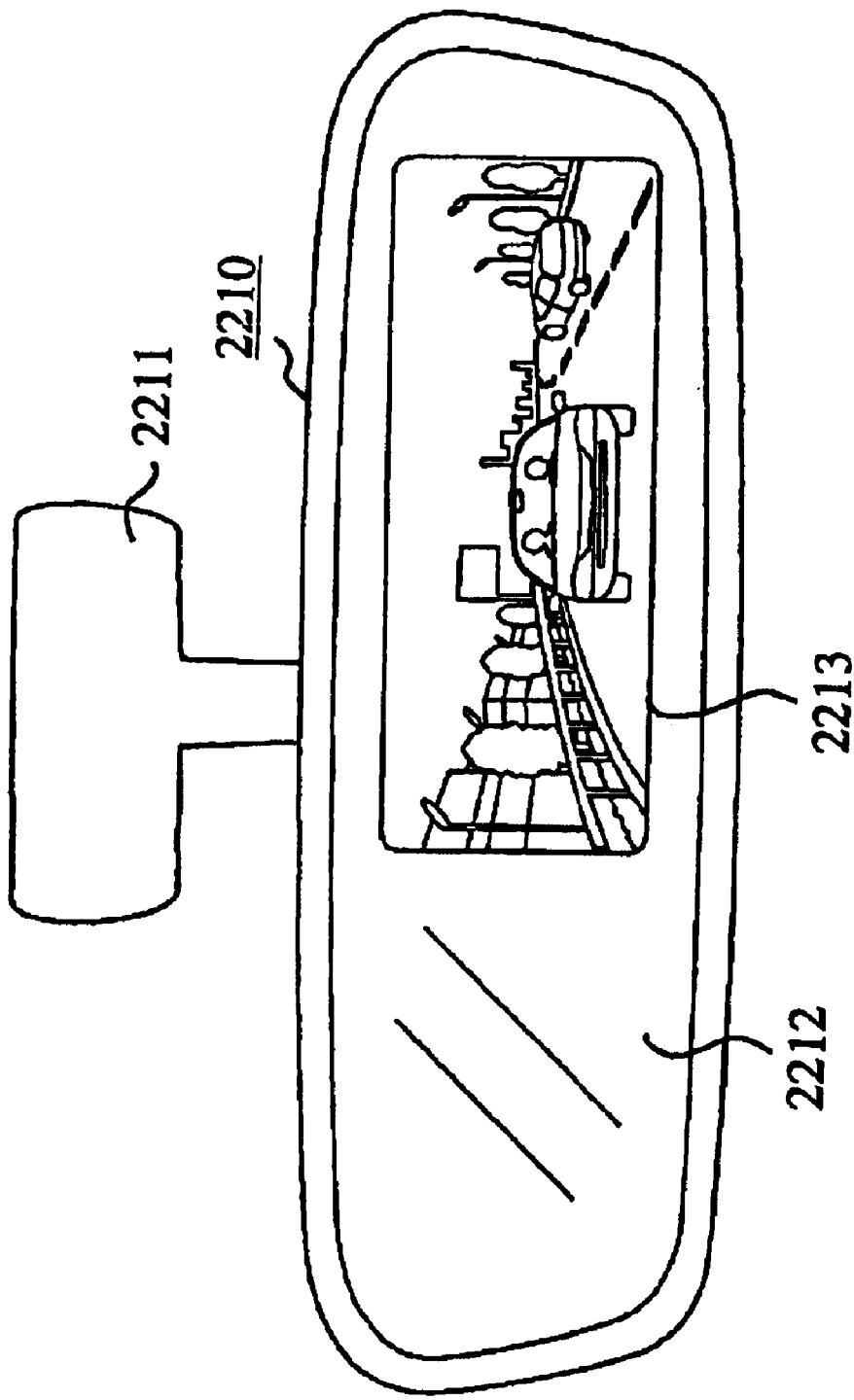
FIG. 25 is an explanatory drawing showing essential parts in FIG. 22.
Figure 51:
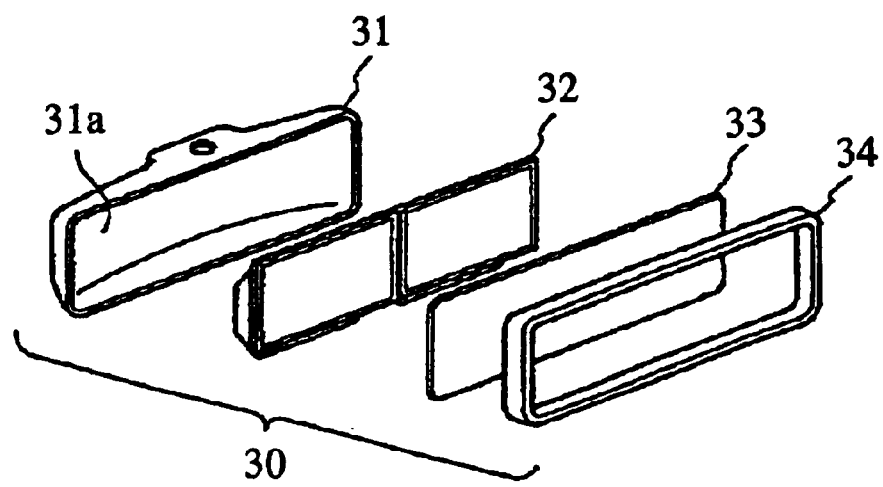
FIG. 51 is an exploded arrangement drawing showing an exploded arrangement of essential parts provided inside the conventional mobile body.
Figure 52:
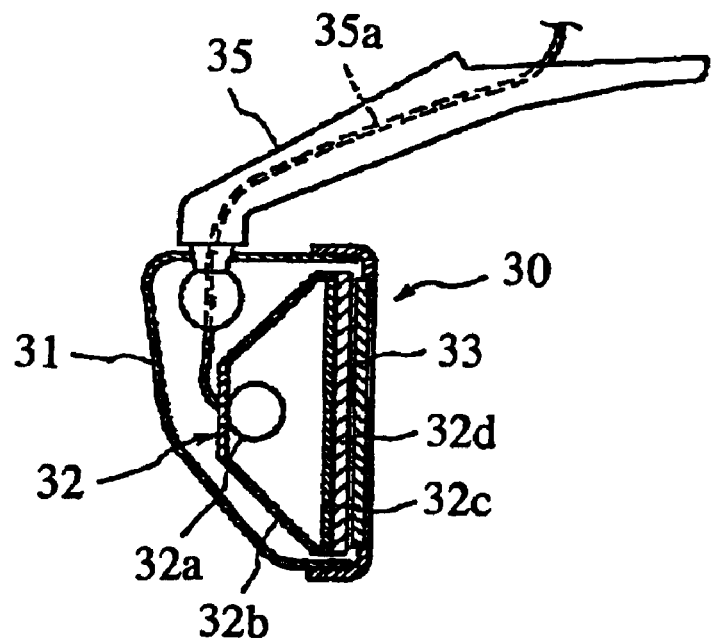
FIG. 52 is a sectional view showing a section of the conventional essential parts.
Figure 53:
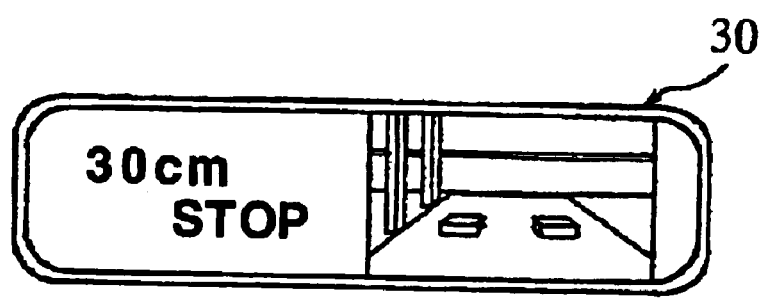
FIG. 53 is an explanatory drawing showing an example of display of the conventional essential parts.
Figure 54:
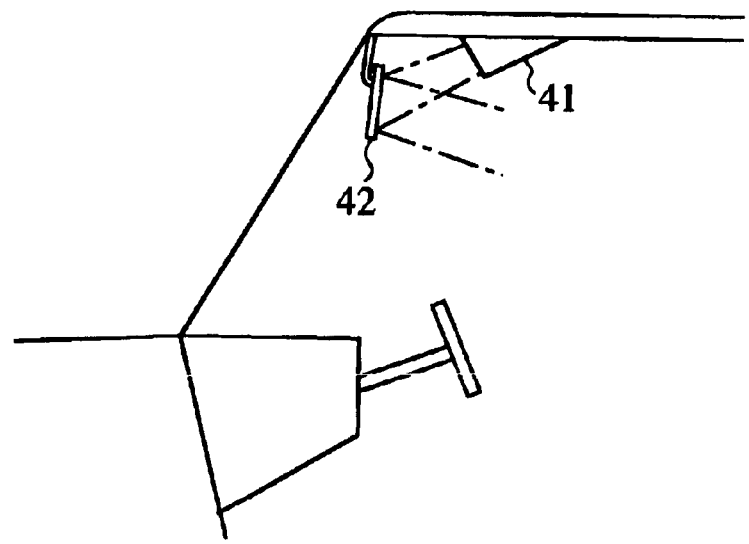
FIG. 54 is an explanatory drawing of essential parts provided inside the conventional mobile body.
Figure 55:
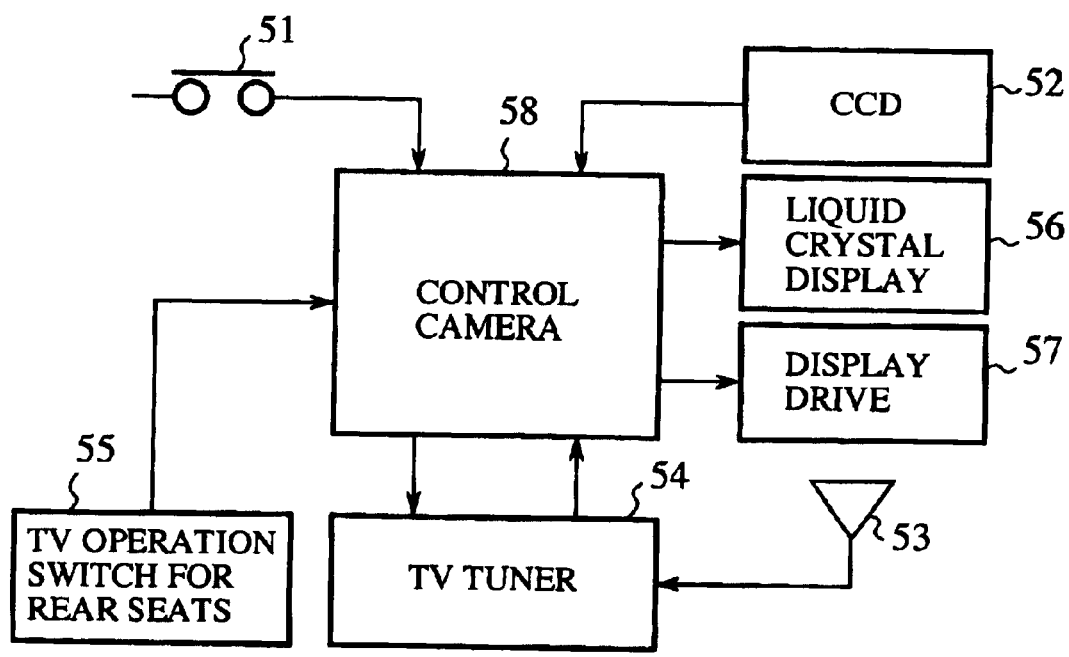
FIG. 55 is an explanatory drawing showing essential parts provided inside the conventional mobile body.

The display by the room mirror 2210 will be described with reference to FIGS. 23 through 25. The construction of the room mirror 2210 is similar to that as described with reference to FIGS. 51 and 52.

The room mirror 2210 is ordinarily formed into a mirror surface 2212 and the rear view is reflected in the entire surface of the mirror surface 2212. In this connection, when a crystal liquid (not shown) provided inside the room mirror 2210 becomes conductive based on a command, a display 2213 of the liquid crystal is displayed on a part of the mirror surface 2212 as shown in FIG. 24. The rear view as imaged by the camera 2280 is displayed as shown in FIG. 25.

Reference numeral 2211 denotes a supporting part to fix the room mirror 2210 to the ceiling 2200 of the vehicle 100. Instead of fixing this supporting part 2211 to the ceiling 2200, it may alternatively be fixed to the central upper part of the windshield 101.

Next, the arrangement of essential parts and the flow of operations in controlling the operations in the second embodiment will be described with reference to FIGS. 26 and 27.

Figure 26:
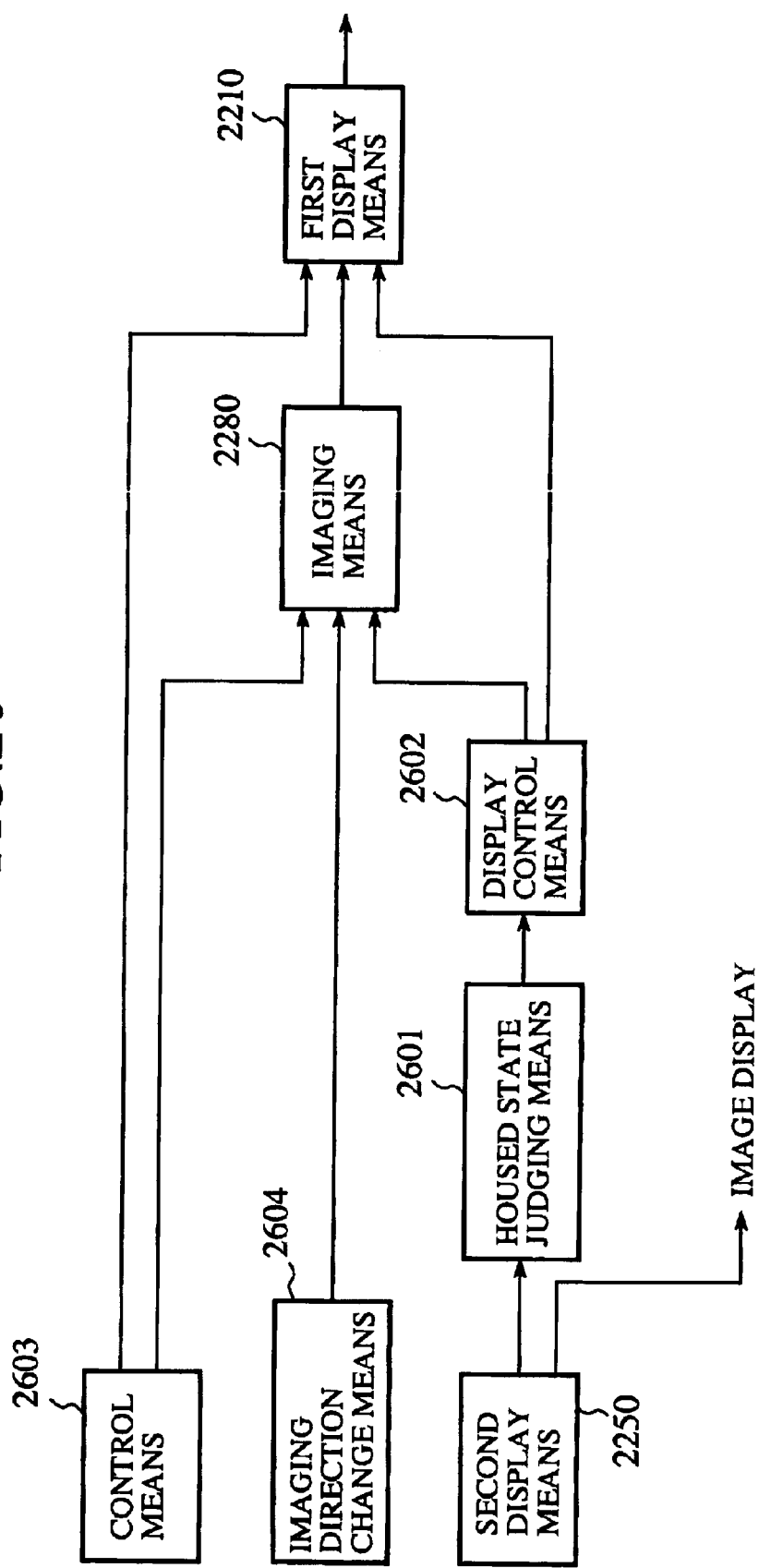
FIG. 26 is a block diagram showing an arrangement of essential parts of a display for a mobile body according to a second embodiment.
Figure 27:
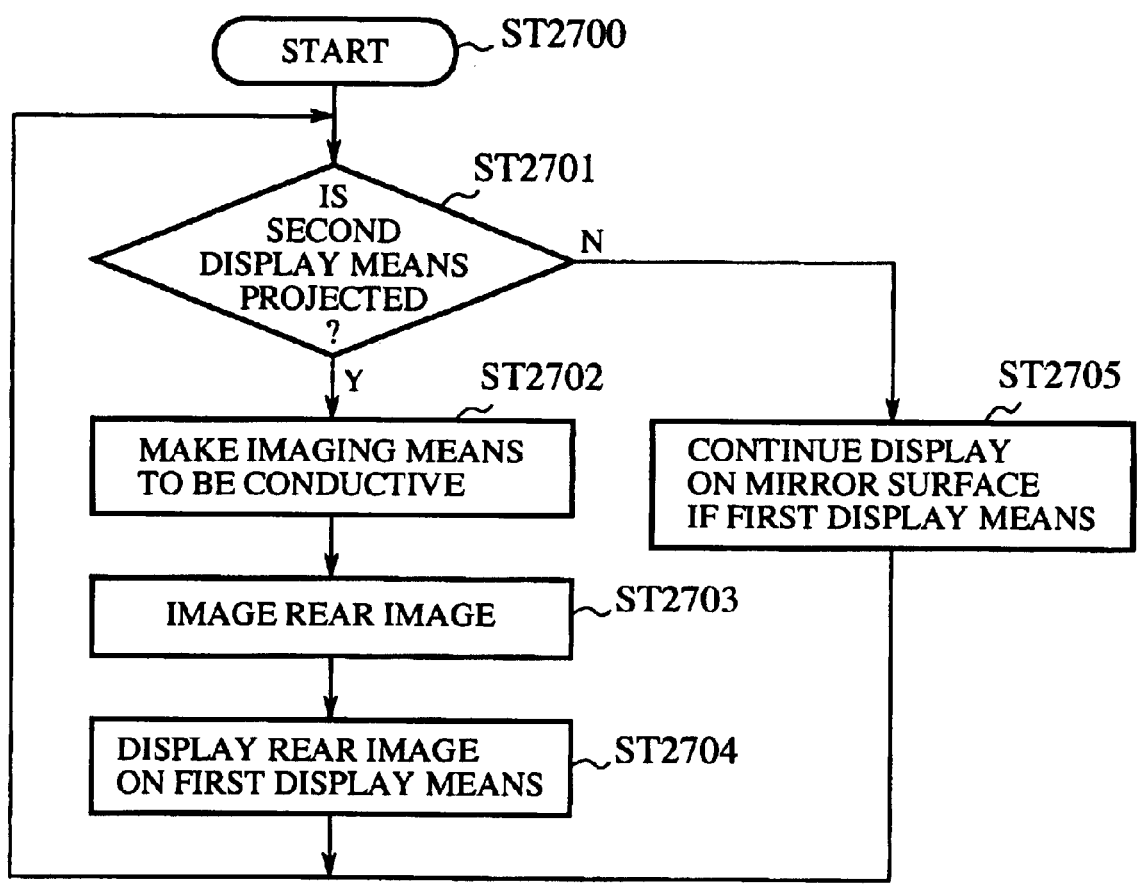
FIG. 27 is a flow chart showing the flow of operations of the display for a mobile body according to a second embodiment.

In FIGS. 26 and 27, reference numeral 2250 denotes a display as second display means which is formed in the central console unit 2230 so as to be projected/housed. Reference numeral 2601 denotes housing state judging means which judges as to whether the display 2250 is projected or not, i. e., which judges the housing state of the display 2250 based on the display set value selected by the set value selecting means as shown in FIG. 11 whose description was made in the first embodiment. Reference numeral 2602 denotes display control means which outputs an operation command to the imaging means 2280, which is described in more detail hereinafter, and to the first display means 2210 based on the result of judgement made by the housing state judgement means 2261. When the housing state judgement means has judged that the display 2250 is housed inside the casing 2240, this display control means 2602 does not output an operation command to the imaging means 2280 and the first display means 2210. If the housing state judgement means has judged that the display 2250 is projected downward from the lower surface 2241 of the casing 2240, the display control means 2602 outputs an operation command to the imaging means 2280 and the first display means 2210.

The room mirror 2210 as the first display means operates as follows, i.e., based on the operation command outputted by the display control means 2602, the imaging operation is started and, based on the operation command outputted by the camera 2280 such as a CCD camera as the imaging means to output the images, and by the display control means 2602, it attains a conducted state to thereby display the images to be outputted from the camera 2280. When this room mirror has becomes a conducted state, it attains a state as shown in FIG. 23. When an image is outputted from the camera 2280, this image is displayed on the display 2213 of the liquid crystal as shown in FIG. 24.

In the second embodiment, it is so arranged that the camera 2280 is operated and the image picked up by the imaging means 2280 is displayed on the display 2240 depending on the housing state of the display 2250 provided in the central console unit 2230. Alternatively, the following arrangement may be made; FIG. 26 includes these constituent elements.

Namely, control means 2603 is provided near the driver's seat 121. When this control means 2603 is operated, an operating command is outputted to the camera 2280 and the room mirror 2210 irrespective of whether the display 2250 provided in the central console unit 2230 is projected or housed so that the image picked up by the camera 2280 is displayed on the display of the liquid crystal. Therefore, this arrangement is useful to the driver when he wishes to see the images picked up by the camera 2280 by displaying them on the room mirror when the display 2250 of the central console unit 2230 is housed inside the casing 2240.

In addition, the camera 2280 is constituted to be rotatable about 360° so that the direction of imaging can be changed in response to the user's preference. In other words, there is provided near the driver's seat 121 imaging direction change means 2604 to change the direction of imaging of the camera 2280. Although an ordinary orientation of the camera 2280 is in the true rear direction, the orientation of the camera 2280 can be changed by a simple operation when the driver wishes to see whichever direction he prefers.

As regards the change in the imaging direction of the camera, the rotation of the camera 2280 may alternatively be controlled or may be rotated clockwise by 2° at each operation to the imaging direction change means 2604 while the pushing operation to the imaging direction change means 2604 is being continued.

The flow of operations in the second embodiment will now be described with reference to FIG. 27. FIG. 27 is a flow chart showing the flow of operations in the second embodiment.

When the power source of the motor vehicle is switched on, the op ration of the apparatus is started (step 2700). First, the housing state judgement means 2601 judges as to whether the display 2250 is housed inside the casing 2240 of the central console unit 2230 or not (step 2701). If the housing state judgement means 2601 judges at this step 2701 that the display 2250 is projected downward from the lower surface 2241 of the casing 2240, the display control means 2602 causes the camera 2280 and the display 2213 of the liquid crystal disposed inside the room mirror 2210 to become conductive to thereby operate the camera 2280 and the display 2213 (step 2702). As a result of this step 2702, the image in the direction to which the camera 2280 is directed is imaged (step 2703). The image picked up at this step 2703 is displayed on the display 2213 (step 2704).

After the processing of this step 2704, the procedure returns to step 2701 and, thereafter, the steps similar to the above are repeated.

If the housing state judgement means 2601 judges at step 2701 that the display 2250 is not projected from the casing 2240 of the central console unit 2230, i.e., that the display is housed, the display control means 2602 causes the camera 2280 and the liquid crystal of the room mirror 2210 to become non-conductive so that the entire mirror surface 2211 functions as a mirror (step 2705). After the processing of this step 2705, the procedure returns again to the step 2701 to repeat the processing.

Here, the moving operation of the central console unit 2230 is similar to the above-described operation in the first embodiment, i.e., the operation of movement by one position at a time will be as follows.

When the central console unit 2230 is not in use, the central console unit 2230 is supported as shown in FIG. 28 in the groove of the rail 2220 in the central forward position of the ceiling 2200, and the display is housed inside the casing 2230 (first position).

Figure 29:
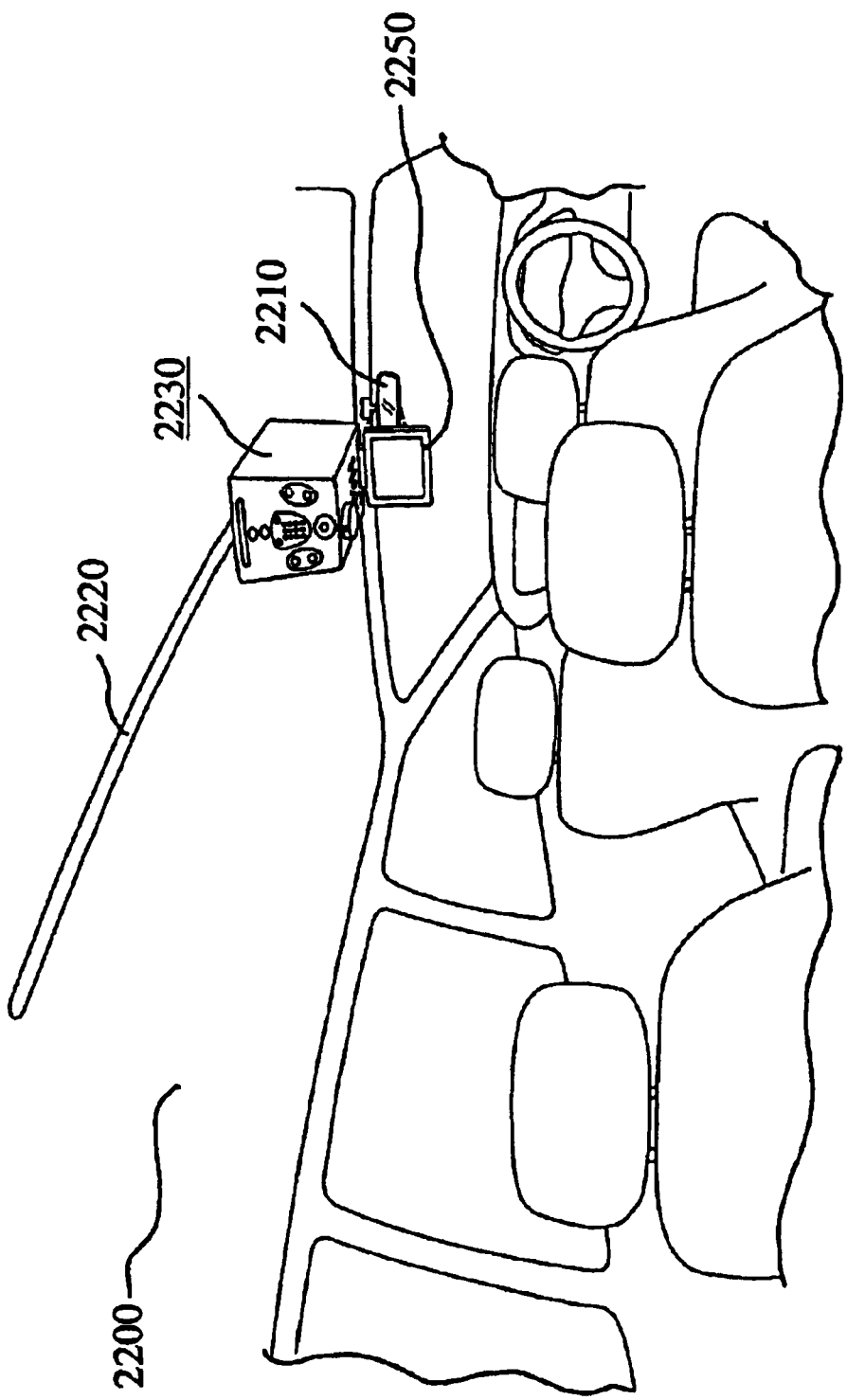
FIG. 29 is a schematic drawing showing essential parts which have been transitioned from the state in FIG. 22.

In this first position, if the pressing operation to the operating part 2272 is made once, i.e., if an operation is made to command the movement by one position in the A direction, the central console unit moves from the first position to the position as shown in FIG. 29 which corresponds to the front seat which is the front-passenger's seat (second position). If another pressing operation is made once to the control part 2272 as in the above-described manner, a movement is made from the second position by one position in the A direction to the position as shown in FIG. 22 which corresponds to the right and left intermediate seats 131, 132 (third position). If there is a further operation to command the movement by one position, a movement is made from the third position by one position in the A direction to the position corresponding to the rear seats (not shown) (fourth position).

On the other hand, in case the movement is made in the B direction, the movements in the order opposite to those as described above will be made from the fourth position to the one shown in FIG. 22 (third position), to the one shown in FIG. 29 (second position) and to the one shown in FIG. 28 (first position).

In the second embodiment, the set positions of the central console unit 2230 were four in number, but they may be five in number as described in the first embodiment.

In addition, the central console unit 2230 is so arranged, when the power source of the mobile body is switched off, to be automatically set and moved to the initial position which is the first position as shown in FIG. 28 whichever position it must have been set to.

Alternatively, the rail 2220 may be respectively provided on both the floor and on the ceiling so that, depending on the object of use, the central console unit 2230 can be replaced to either rail 2220.

In the second embodiment, as described above, the rail 2220 and the central console box 2230 are arranged to be provided on the ceiling inside the motor vehicle compartment. Therefore, in a mobile body such as a bus, an electric car, an airplane, or the like, in which the floor of the motor vehicle (floor) is not available for use, i.e., in case the floor must be reserved as a passage for the passengers, it is possible to offer a circumstance in which the above-described apparatus can still be used. There can thus be obtained an effect in that the range of use of the apparatus is improved and that the limited space within the mobile body can be effectively utilised.

Further, as described above, a camera for iamging mainly the backward images is provided in the central console unit 2230. When the display 2250 of the central console unit 2230 is projected downward, part of those dotted lines as shown in FIG. 22 which represent the backward scope of view of the room mirror 2210 is blocked in case the backward direction is looked at by the room mirror 2210, resulting in a poor backward scope of view. In such a state, if the backward images as imaged by the camera are displayed on the display of the liquid crystal provided in a part of the room mirror 2210, the driver can always obtain a good backward view even if the backward view is blocked. This results in an improvement in the convenience of the apparatus.

In the above-described second embodiment, a description has been made on the premise that the floor of the motor vehicle is not available for the above purpose. This apparatus can of course be used even in a case in which the floor of the vehicle is available for use.

Third Embodiment

Next, the device disposing apparatus in a mobile body according to the third embodiment of the present invention will be described.

In the above-described first and second embodiments, a description has been made that the memory means 1102 has stored therein each of the set values as shown in FIG. 12. However, each of these set values may be used as initial set values so that they may be arbitrarily changed by the user. Have been taken such an arrangement the convenience of the user can further be improved.

Fourth Embodiment

Next, the device disposing apparatus in a mobile body according to the fourth embodiment of the present invention will be described.

In the above-described the first through third embodiments, when the central console unit 200, 2230 is moved, a description has been made that the operating part 241, 242, 2272, 2273 provided in the front surface of the central console unit 200, 2230 is operated. Alternatively, a remote controller (not shown) may also be provided in each of the seats so that the central console unit is movable by the operation from the remote controller. Have been taken such an arrangement, the convenience of the user can further be improved.

Fifth Embodiment

Next, the device disposing apparatus in a mobile body according to the fifth embodiment of the present invention will be described.

In the above-described the first through fourth embodiments, a description has been made that the display 220 provided in the central console unit 200 is movable only up and down. Alternatively, there may be provided a direction change mechanism between the display surface and the supporting part 221 of the display 220 to enable to change the display 220 up and down as well as right and left. Have been taken such an arrangement, it is possible to adapt to the physical shape, or the like, of the user. When the user looks at the display surface of the display 220, he can look at it at the most suitable angle, resulting in a further improvement in the convenience of the user.

Sixth Embodiment

Next, the device disposing apparatus in a mobile body as well as about the display for a mobile body according to the sixth embodiment of the present invention will be described.

In the above-described second embodiment, a description has been made about an arrangement in which the central console unit 2230 provided on the ceiling 2200 is movable in the back and forth direction of the motor vehicle guided by the rail 2220 provided on the ceiling 2200. In the sixth embodiment, on the other hand, a device disposing apparatus for a mobile body is disposed so as to be movable on the floor inside the motor vehicle like in the first embodiment, and a display for a mobile body is disposed in a predetermined position of the ceiling, e.g., in a position between the front seats and the intermediate seats provided inside the motor vehicle as shown in FIG. 30.

Figure 30:
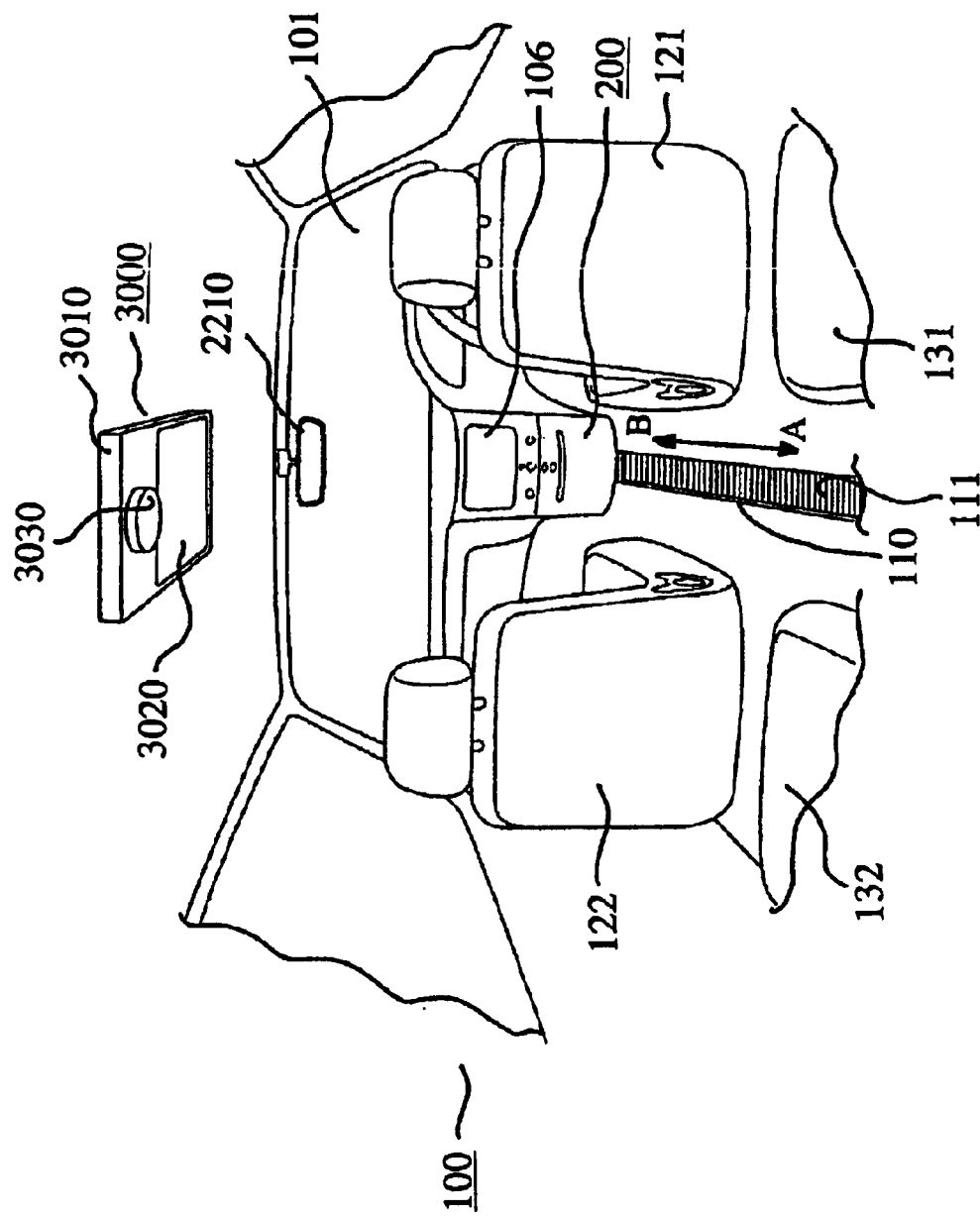
FIG. 30 is a schematic drawing showing an arrangement of a device disposing apparatus for a mobile body and a display for a mobile body according to a sixth embodiment.
Figure 31:
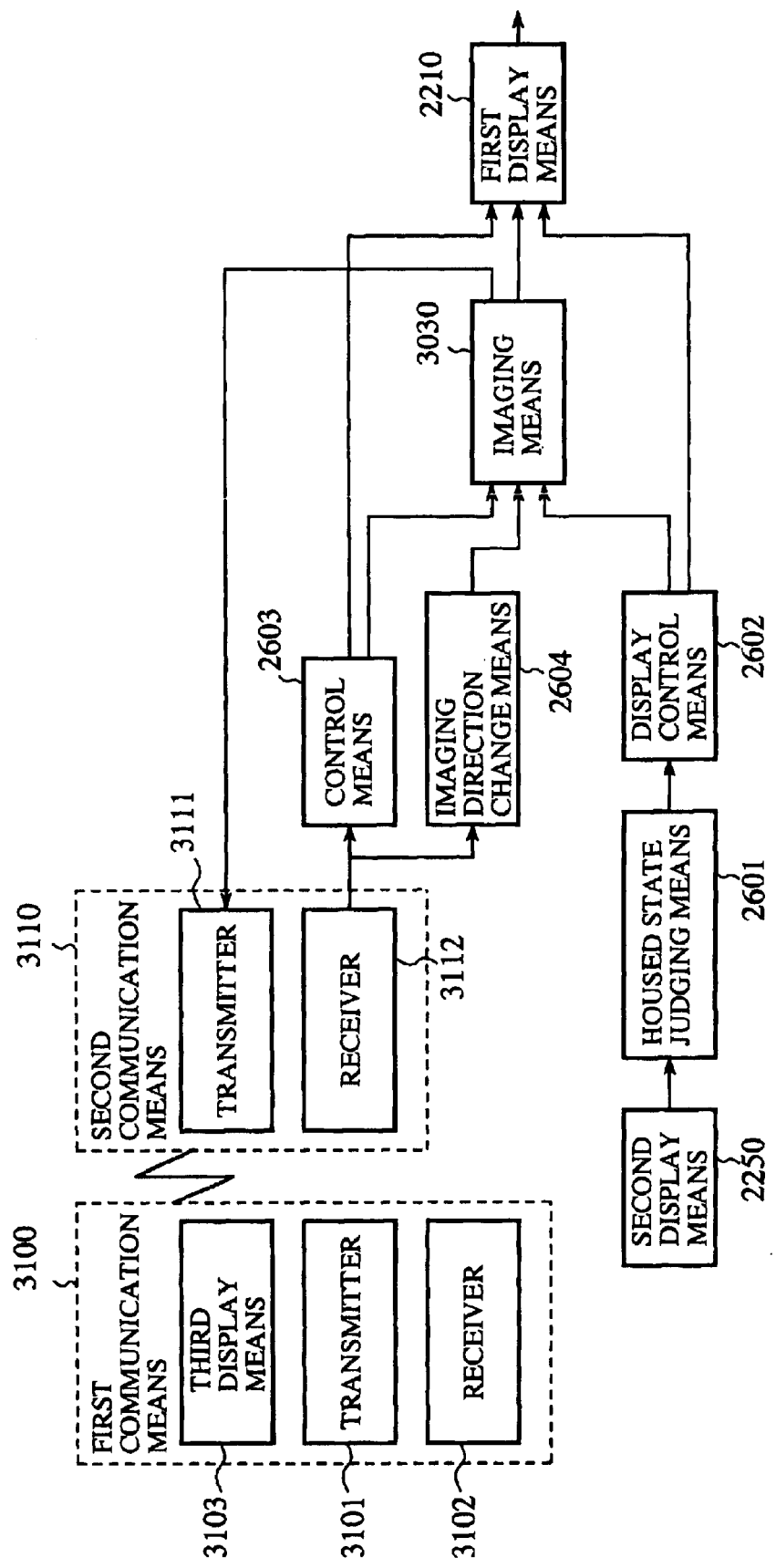
FIG. 31 is a block diagram showing an arrangement of essential parts of the display for a mobile body according to a sixth embodiment.
Figure 32:
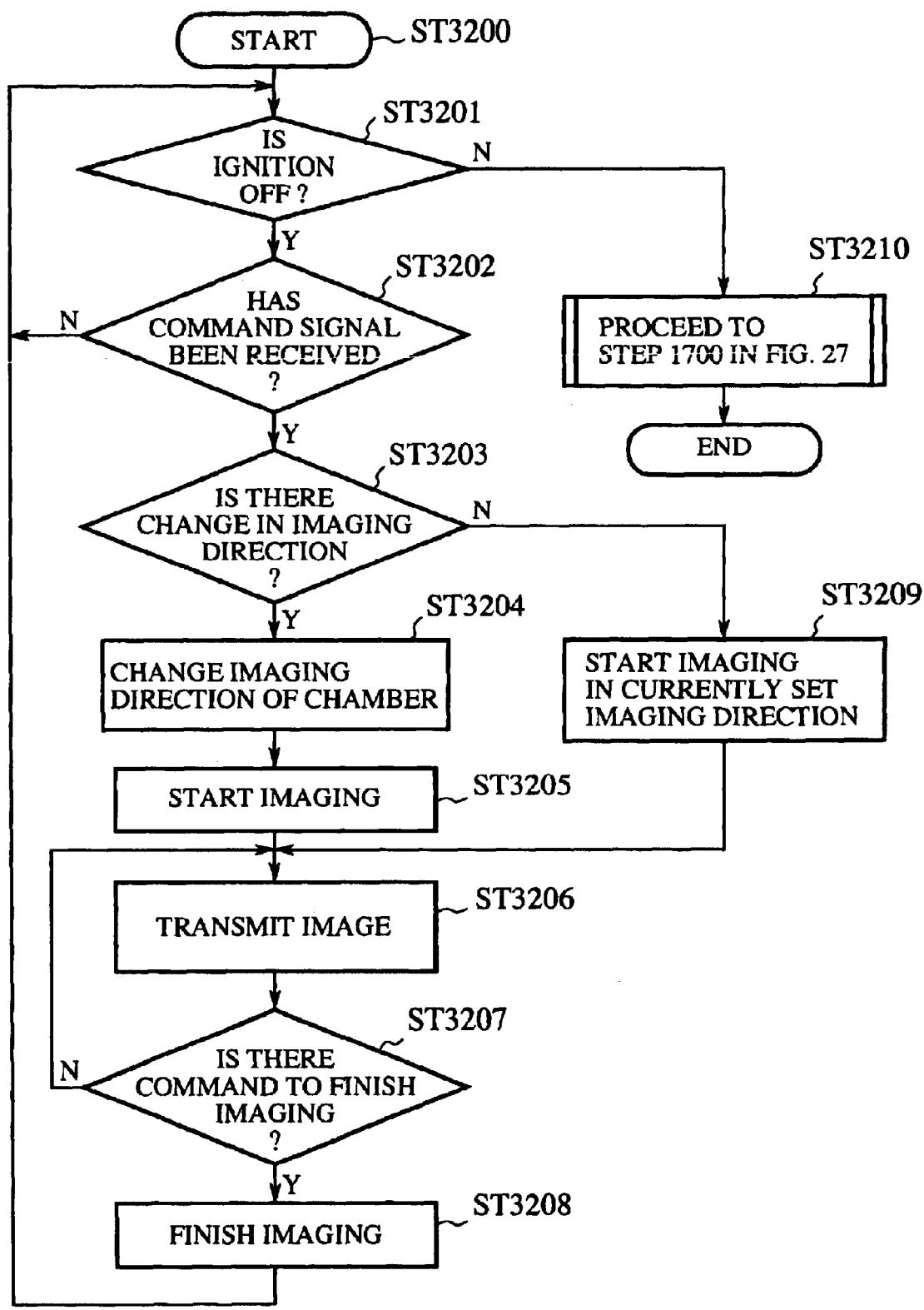
FIG. 32 is a flow chart showing the flow of operations of the display for a mobile body according to a sixth embodiment.
Figure 33:
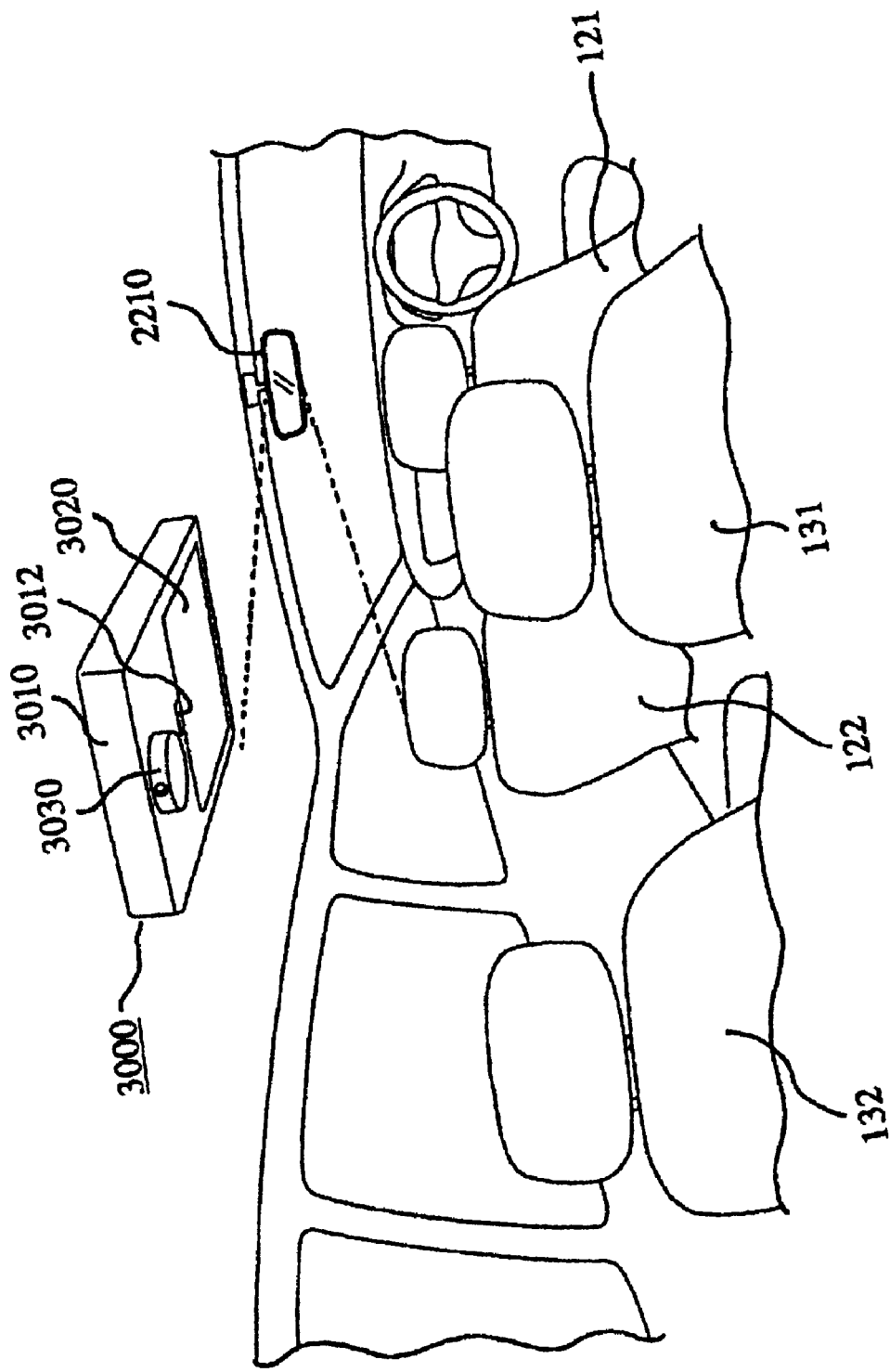
FIG. 33 is an explanatory drawing showing essential parts of FIG. 30.
Figure 34:
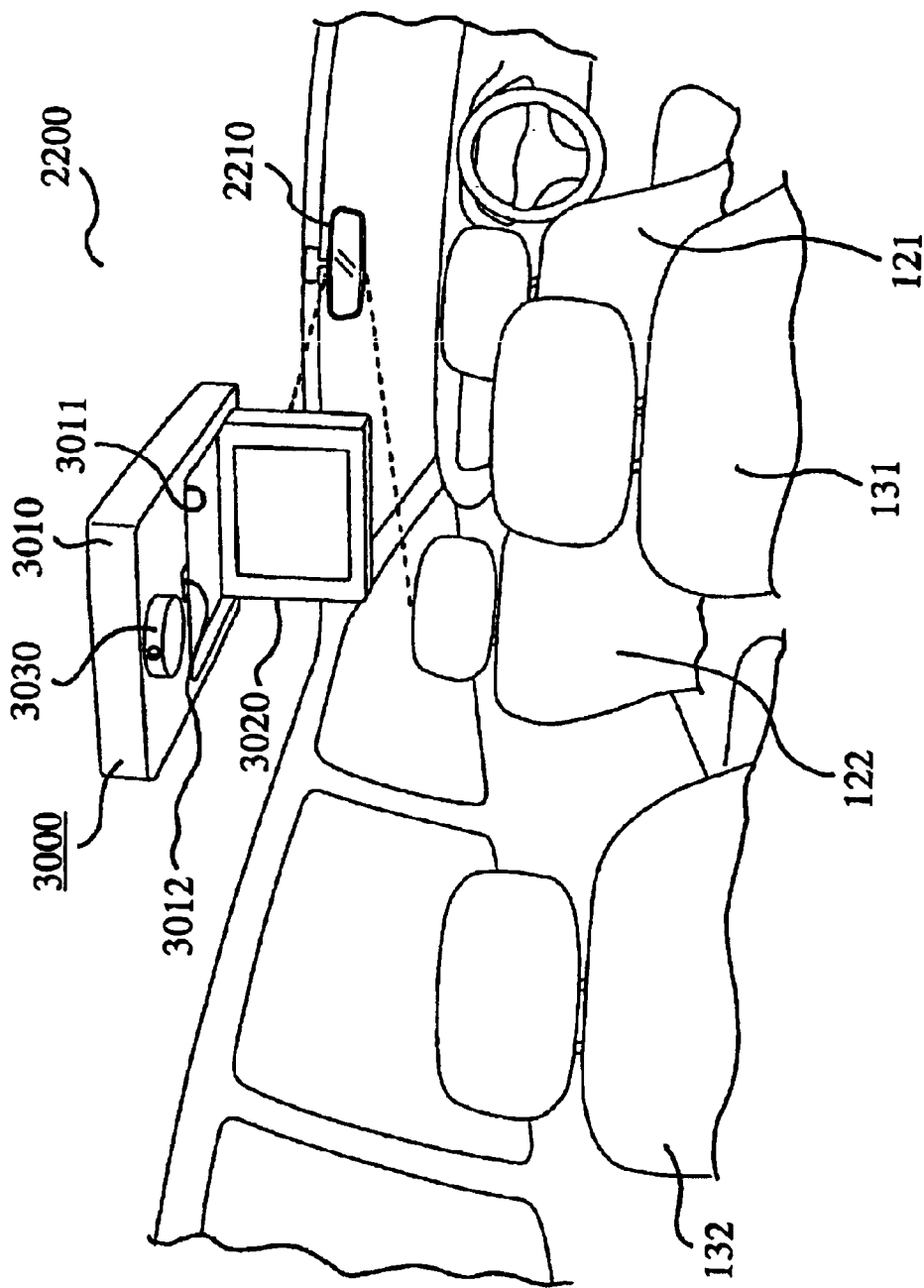
FIG. 34 is a schematic drawing showing essential parts which have been transitioned from the state in FIG. 33.

FIG. 30 is a schematic drawing showing an arrangement of a device disposing apparatus for a mobile body as well as of a display for a mobile body. FIG. 31 is a block diagram showing the arrangement of essential parts in FIG. 30. FIG. 32 is a flow chart showing the flow of operations of the display for a mobile body according to the sixth embodiment. FIG. 33 is an explanatory drawing showing the state in which the display, which is an essential part in FIG. 30, is housed inside the casing FIG. 34 is an explanatory drawing showing the state in which the display, which is an essential part in FIG. 30, is housed inside the casing.

In these FIGS. 30 through 34, the floor inside the motor vehicle 100 is provided with a device disposing apparatus for a mobile body, made up of a rail 110 disposed between the driver's seat and the front-passenger's seat, and a central console unit 200 guided inside a groove in this rail so as to be movable in the A direction or in the B direction. The ceiling 2200 thereof is provided with a display for a mobile body made up of a room mirror 2210 disposed above the driver's seat mainly for displaying backward images, and a display unit 3000 mainly used by passengers seated in the seats rearward of the front seats.

The display unit 3000 is made up of a casing 3010 having formed in a part thereof a housing 3021 for housing therein a display 3020 which is described in more detail hereinafter; the display 3020 which can be housed inside the housing 3021 of this casing 3010 and which projects a display surface, when used by a user, downward by releasing the engagement of an engaging part 3012; and a camera 3030 as imaging means which is disposed in the rear of the display 3020 (on this side as seen in FIG. 30) and which is capable of imaging around 360° based on a command.

The arrangement of essential parts for performing the operational control and the flow of operations of the sixth embodiment will now be described with reference to FIGS. 31 and 32.

Referring to FIGS. 31 and 32, reference numeral 3100 denotes first communication means which is provided with a transmitter 3101 for transmitting a command from outside a motor vehicle, and a receiver 3102. This first communication means 3100 is provided with a display 3103 as third display means which displays thereon the visible information received by the receiver 3102.

Reference numeral 3110 denotes second communication means which is provided with a transmitter 3111 for transmitting the image information obtained by imaging means 3030, which is described in more detail hereinafter, to the receiver 3102 of the first communication means 3200; and a receiver 3112 for receiving the signal transmitted from the transmitter 3101 of the first communication means 3100.

While the owner of the motor vehicle provided with the device disposing apparatus for a mobile body as well as a display for a mobile body according to the sixth embodiment is at home and if he wishes to know the state around the motor vehicle or inside the motor vehicle to see whether his motor vehicle in the parking lot is being tampered with or has suffered from burglary, or the like, he operates to transmit a command signal from the transmitter 3101 of the first communication means 3100 to command to image inside the vehicle compartment and therearound. The receiver 3101 of the second communication means 3110 receives this command signal transmitted from the transmitter 3112, and communicate it to the imaging means 3030 through the control means 2603 so that the imaging means 3030 images. If the operator wishes to see the neighbourhood of the motor vehicle, i.e., the 360°-image around the motor vehicle or wishes to see a particular direction, this command is also transmitted from the transmitter part 3101. Therefore, the imaging direction of the imaging means 3030 is commanded by the imaging direction change means 2604.

Upon receipt of this command, the imaging means 3030 images the particular direction and this image information is outputted to the transmitter 3111 of the second transmission means, thereby transmitting it from the transmitter 3111 to the first transmission means 3100.

Upon receipt of this transmission, the transmitter 3102 of the first communication means 3100 receives the transmission signal. Based on this receiving, the image picked up by the imaging means 3030 is displayed on the third display means 3103.

Now, the first communication means 3100 will be described with reference to FIGS. 35 and 36.

Figure 35:
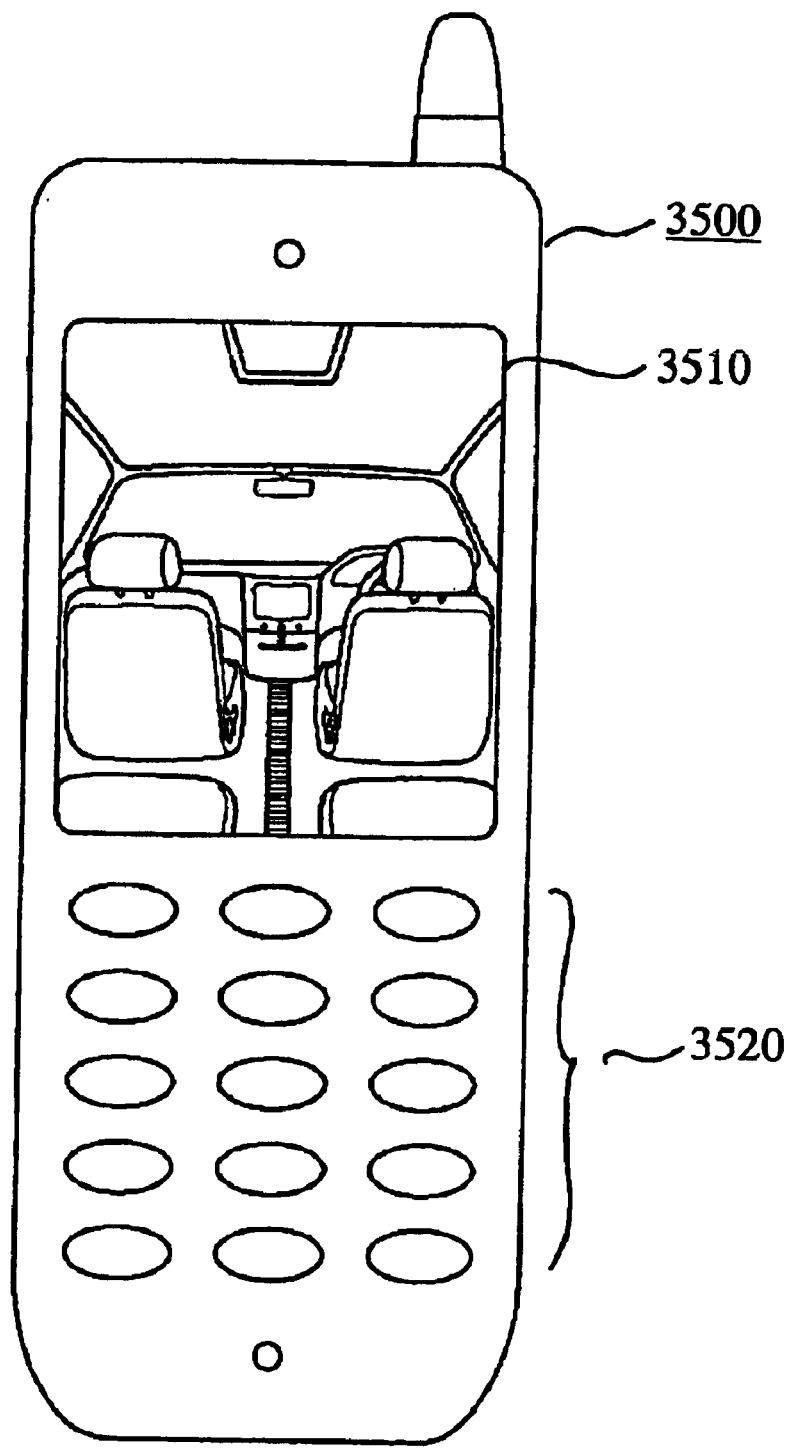
FIG. 35 is an explanatory drawing showing an example of display of visible information outputted by the display for a mobile body according to a sixth embodiment.

FIG. 35 shows an example in which a portable telephone 3500 is used as the first communication means 3100. This portable telephone 3500 is made up of a display 3510 as the third display means, and a control part 3520 which outputs a command signal to the second communication means 3110. Though not shown, the portable telephone 3500 is provided inside thereof with a transmitter 3501 and a receiver 3502. The contents displayed on the display 3510 is an image picked up by the camera 3030 with the forward direction as the imaging direction.

Figure 36:
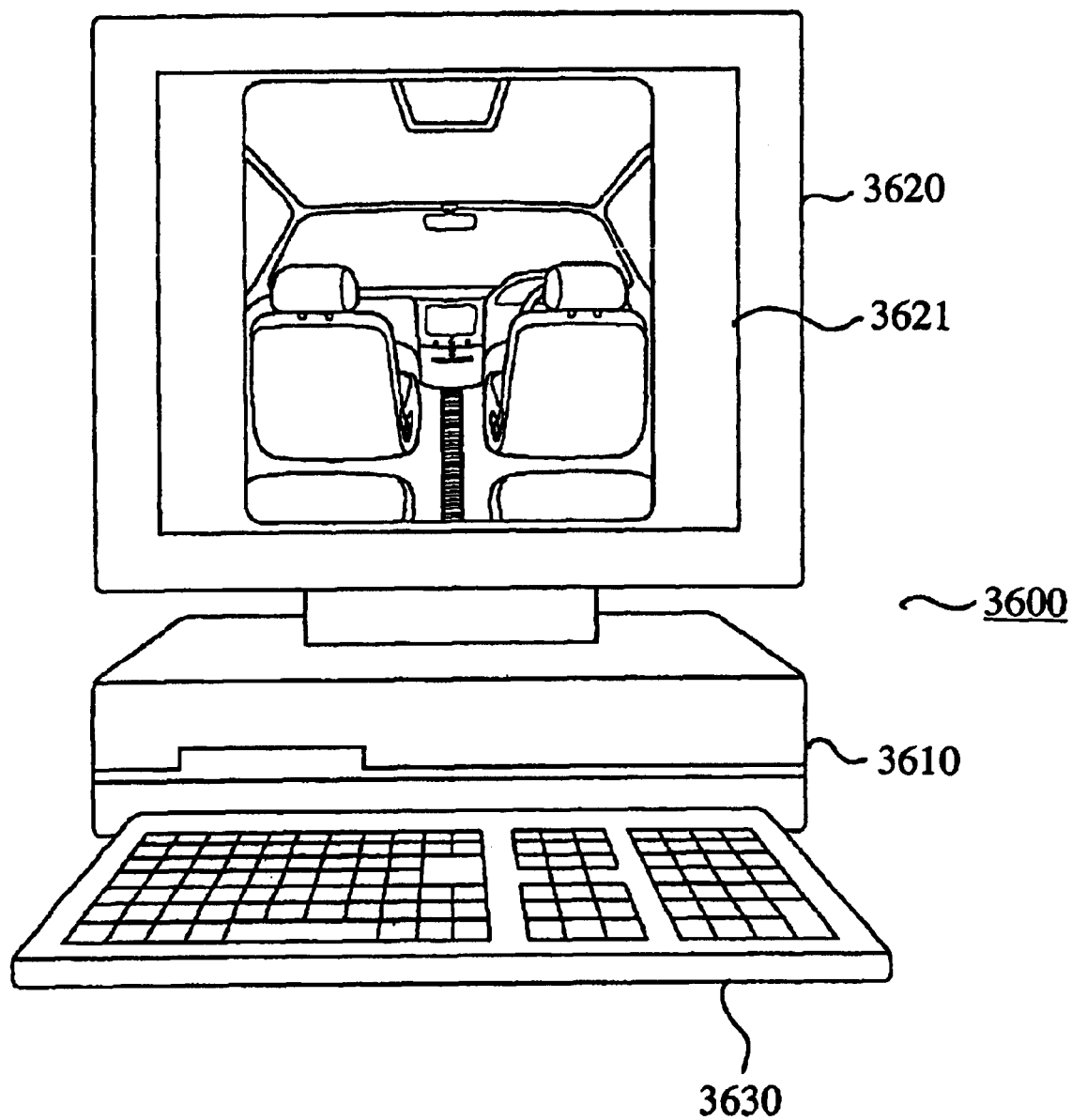
FIG. 36 is an explanatory drawing showing an example of display of visible information outputted by the display for a mobile body according to a sixth embodiment.

FIG. 36 shows an example in which a personal computer 3600 is used as the first communication means 3100, and is made up of a personal computer main body 3610; a display 3620 for displaying the information from the personal computer main body 3610; and a keyboard 3630 for performing a control of the personal computer main body 3610.

Though not shown, the personal computer 3610 is provided with a communication adapter for communicating with the outside, and has a function as the transmitter 3501 and the receiver 3502 due to this communication adapter. The contents displayed on the display surface 3621 of the display 3620 is, similar to that in FIG. 35, an image picked up by the camera 3030 with the forward direction as the imaging direction.

As described above, after switching on the ignition which is the power source operation, the ordinary imaging means 3030 is controlled in its operation based on the housing state of the second display means 2250. If, on the other hand, there is a command through the control means 2603 and the imaging direction change means 2604, the imaging means 3030 is arranged to become conductive.

Next, the flow of operations in the sixth embodiment will be described with reference to FIG. 32.

First, the operation is started in an initial state (step 3200) and judges as to whether the ignition is OFF or ON (step 3201). If the ignition is judged at this step 3201 to be OFF, the receiver 3112 of the second communication means 3110 judges as to whether the command signal from the first communication means 3100 has been transmitted or not (step 3202).

If the receiver 3112 of the second communication means 3110 judges at step 3202 that the command signal has been received, the receiver 3112 of the second communication means 3110 judges as to whether the command to change the imaging direction is contained or not in the command signal transmitted from the first communication means 3100 (step 3203).

If a judgement is made at this step 3203 that the imaging direction is to be changed, the imaging direction change means 2604 changes the imaging direction of the imaging means 3030 based on the command (step 3204), and the control means 2603 causes the imaging means 3030 to start imaging (step 3205).

The transmitter 3111 of the second communication means 3110 transmits the image information obtained at this step 3205 to the first communication means 3100 (step 3206), and the receiver 3112 of the second communication means 3110 judges as to whether a command to finish the imaging has been transmitted from the first communication means 3100 (step 3207). If a judgement is made at this step 3207 that the command of finishing the imaging has been given, the imaging by the imaging means 3030 is finished (step 3208) and the procedure returns to step 3201 and repeat the processing.

If a judgement is made at step 3201 that the ignition is in a switched-on state, the procedure proceeds to step 1701 as shown in FIG. 27, and the subsequent operations are performed.

If a judgement is made at step 3202 that the command signal from the first communication means 3100 has not been transmitted yet, the procedure returns to step 3201 once again to repeat the operations.

In addition, in case a command to change the imaging direction of the imaging means 3030 has not been received at step 3203, a judgement is made that the imaging direction may remain as it is set at present, and the imaging by the imaging means 3030 is started without changing the imaging direction (step 3209).

If a judgement is made at step 3207 that the command to finish the imaging has not been transmitted, the procedure returns to step 3206 once again to repeat the processing.

FIGS. 33 and 34 are explanatory drawings as seen from the right rearward of the motor vehicle. FIG. 33 shows a state in which the display 3020 provided in the display unit 3000 is housed and in which the imaging direction of the camera 3030 as the imaging means looks backward of the motor vehicle (this side as seen in FIG. 33). FIG. 34 shows a state in which the engaging part 3012 is operated to thereby project the display 3020 formed in the casing 3010 downward from the housing 3011. The direction of imaging of the camera 3030 is the same as that in FIG. 33.

As described above, in the sixth embodiment, since the second communication means to communicate with the portable telephone 3500 and the personal computer 3600 is provided inside the motor vehicle to enable to look at the images inside and around the motor vehicle by using the portable telephone 3500 and the personal computer 3600 as the first communication means 3100, the monitoring of the unmanned motor vehicle can be easily made and has an effect in that the convenience of the user is improved.

Seventh Embodiment

Figure 38:
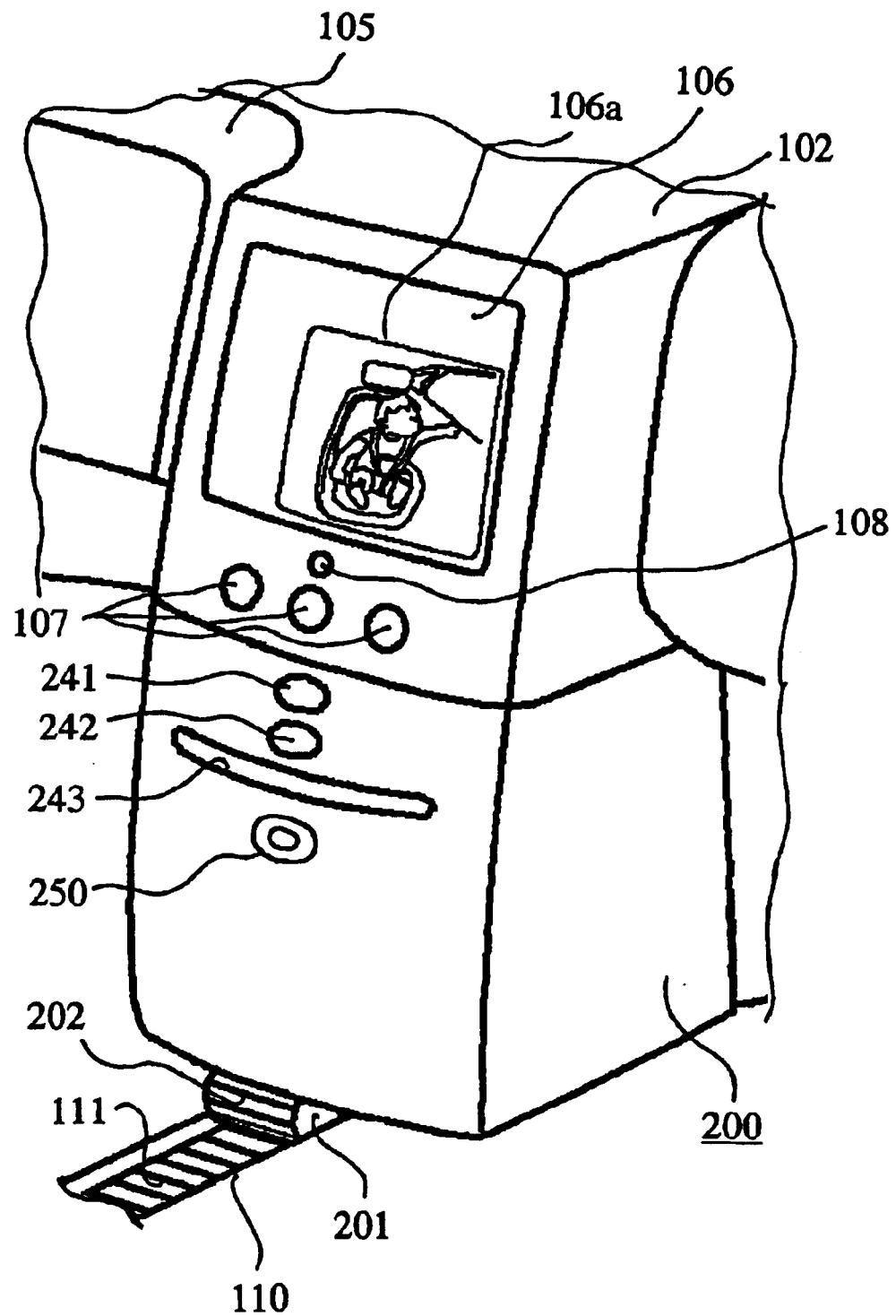
FIG. 38 is an explanatory drawing showing essential parts of the display for a mobile body and a device disposing apparatus for a mobile body according to a seventh embodiment.
Figure 39:
FIG. 39 is an enlarged explanatory drawing showing an example of display according to an eighth embodiment.

Next, a device disposing apparatus for a mobile body using a display for a mobile body according to the seventh embodiment of the present invention will be described with reference to FIGS. 37 through 39.

Figure 37:
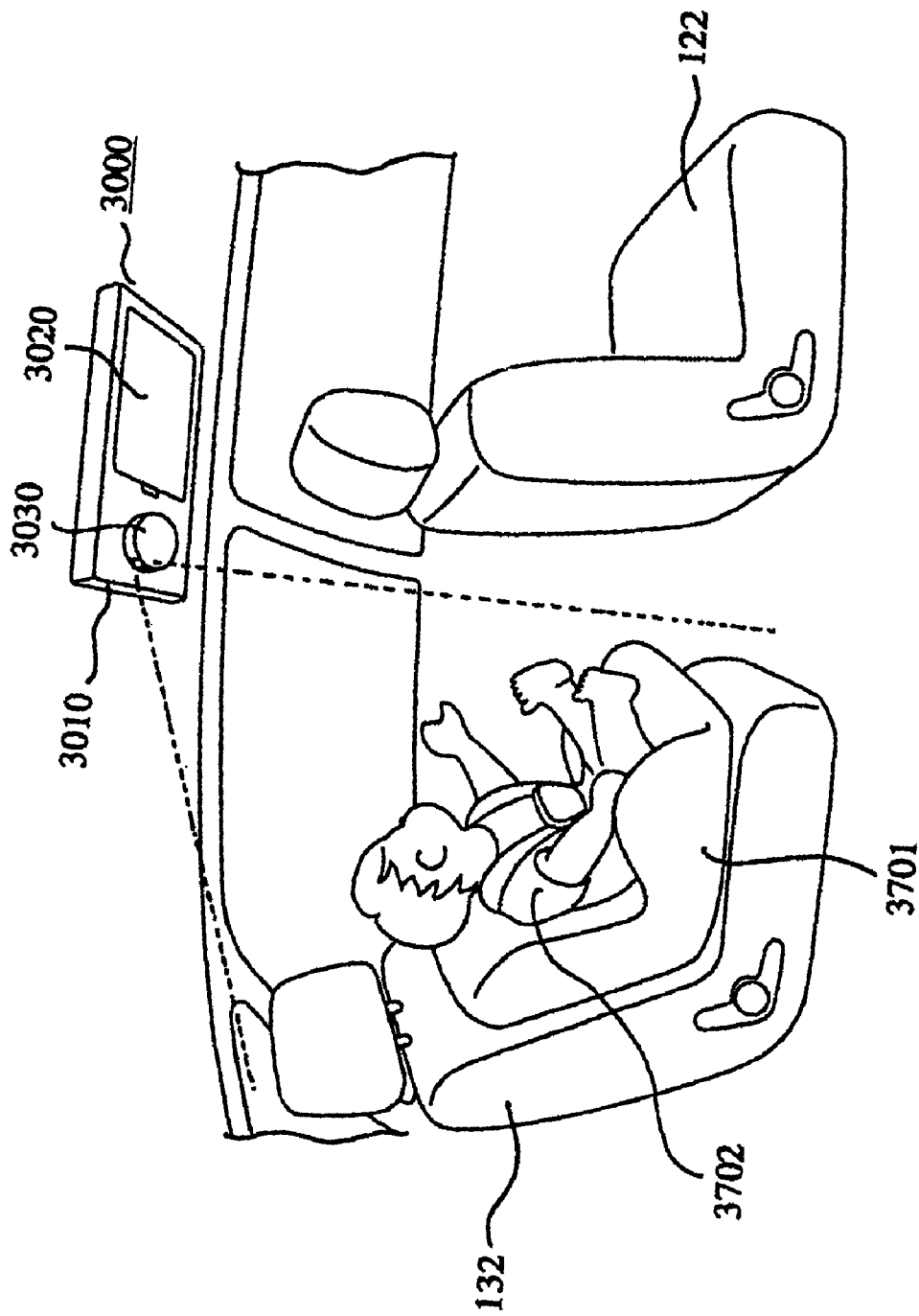
FIG. 37 is a schematic drawing showing an arrangement of a display for a mobile body according to a seventh embodiment.

FIG. 37 is an explanatory drawing showing a state in which a child seat is mounted on an intermediate seat provided inside the motor vehicle and in which an infant is seated in this child seat. FIG. 38 is an explanatory drawing showing a state in which the image of the infant seated in the child seat as imaged by the camera 3030 is displayed on the display provided inside the motor vehicle. FIG. 39 is an enlarged drawing showing the display as explained in FIG. 38.

In the above-described sixth embodiment, an arrangement will be described in which the state inside the motor vehicle compartment and the state around the motor vehicle are transmitted to the outside first communication means 3100. Alternatively, the image inside the motor vehicle as imaged by the camera 3030 may be displayed on the display 106 provided in the instrument panel 102 inside the motor vehicle.

In particular, in case an infant or a pregnant woman on whom constant watch must be kept is onboard the motor vehicle, the driver cannot afford to look backward while driving. As a solution, the image picked up by the camera 3030 is displayed on the display device 106 provided in the instrument panel 102. The control part (not shown) for causing the camera 3030 to image is provided near the driver's seat. When the state inside the motor vehicle is to be displayed on the display 106 provided in the instrument panel 102, the control part is operated to thereby cause the camera 3030 to image for displaying on the display 106. In addition, in FIG. 37, although the direction of imaging of the camera 3030 looks backward, the direction of imaging can of course be changed.

Since an arrangement has been made as described above, it is possible in the seventh embodiment to display the image inside the motor vehicle on the nearby display. The range of utilization of the apparatus becomes wider and the convenience of the apparatus is further improved.

Eighth Embodiment

Figure 41:
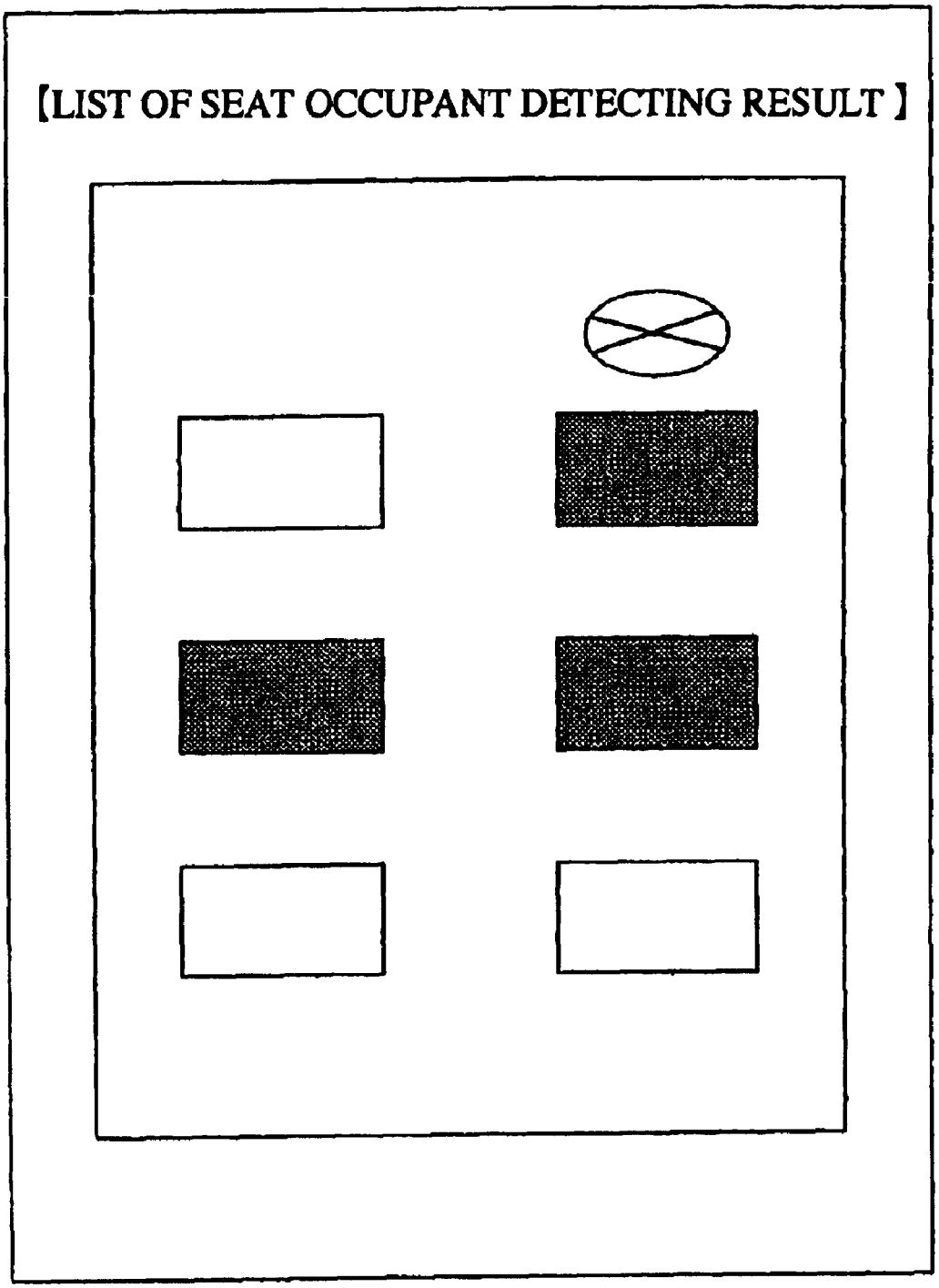
FIG. 41 is an explanatory drawing showing an example of display of FIG. 40.
Figure 42:
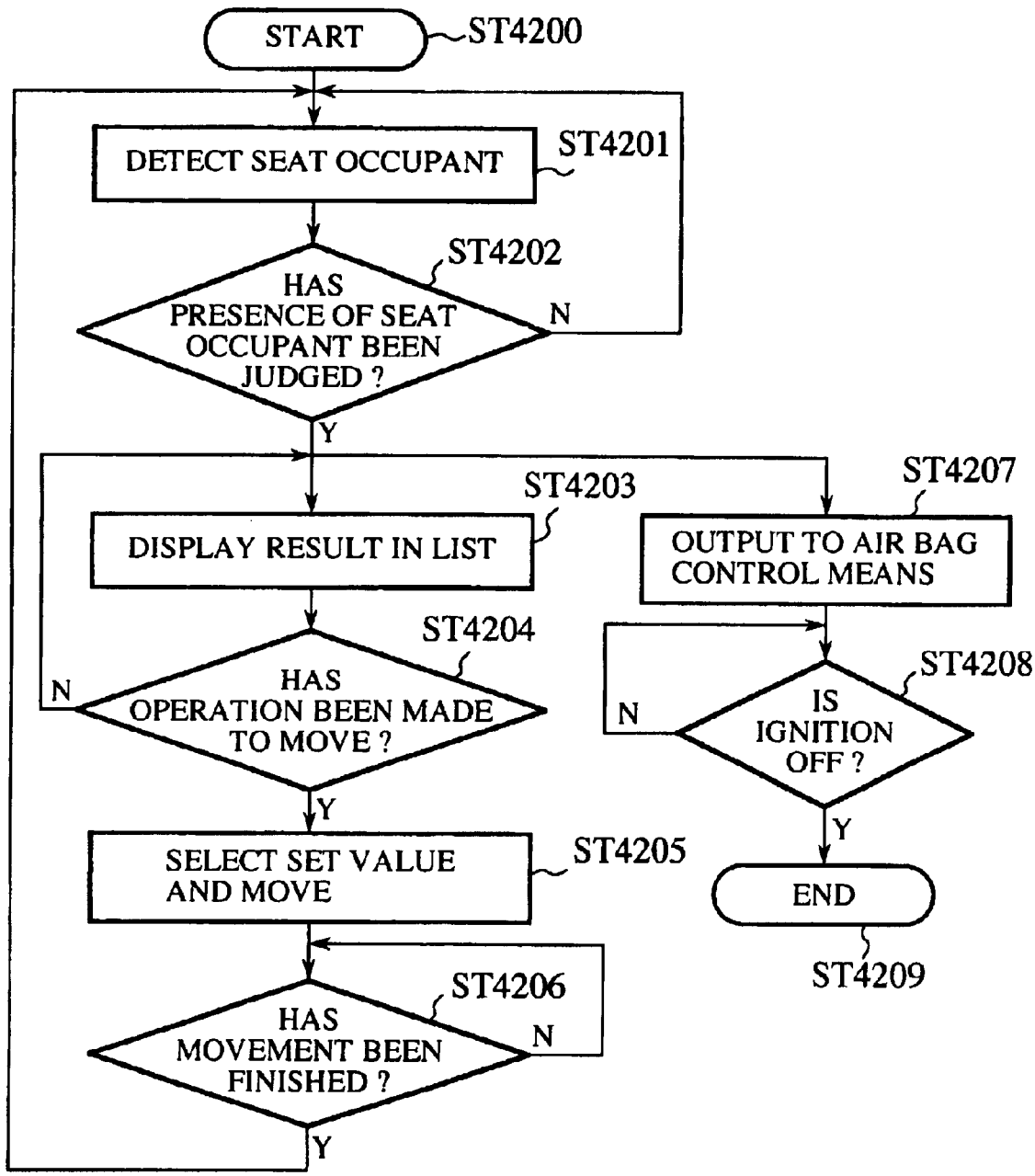
FIG. 42 is a flow chart showing the flow of operations of the device disposing apparatus for a mobile body according to an eighth embodiment.

Next, a device disposing apparatus for a mobile body according to the eighth embodiment of the present invention will be described with reference to FIGS. 40 through 42.

In the first and second embodiments, an arrangement will be described in which, when the central console unit 200 is moved, the operating parts 241, 242 which are provided in the front surface of the central console unit 200 are operated. In the eighth embodiment, on the other hand, a person seated in each of the seats provided inside the motor vehicle is detected so that the movement to the position corresponding to the occupied seat can be more easily selected.

Figure 40:
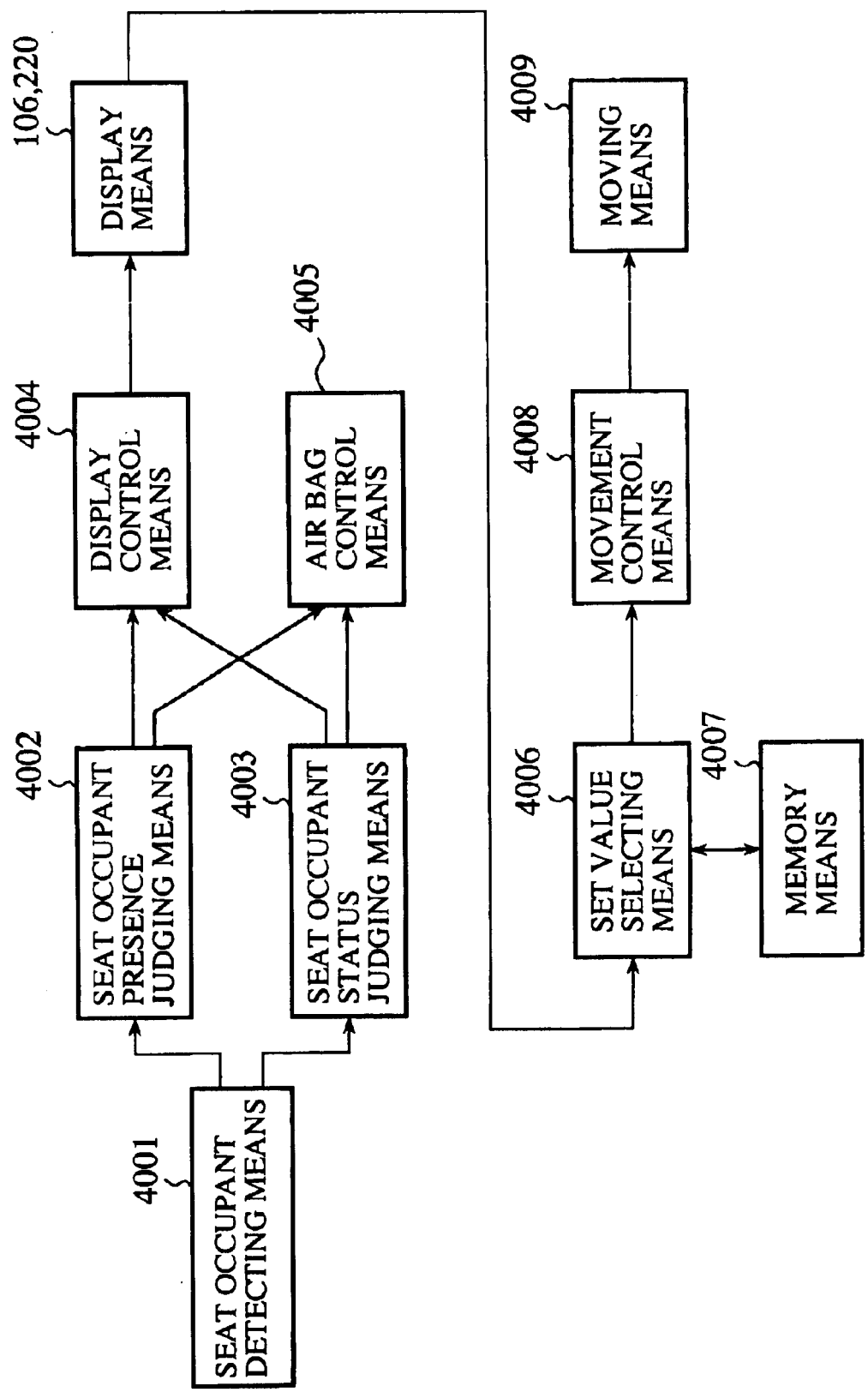
FIG. 40 is a block diagram showing an arrangement of the device disposing apparatus for a mobile body according to an eighth embodiment.

In FIG. 40, reference numeral 4001 denotes a seat occupant detecting means for detecting whether there is a person seated in each of the seats provided inside the motor vehicle. This seat occupant detecting means 4001 is provided substantially in the center thereof with a pressure sensor and a passenger camera, or the like (not shown). If there is an occupant, a pressing force is applied to the pressure sensor, whereby a detection is made that there is an occupant. Further, by imaging onto the seats with the passenger camera, an analysis is made to detect whether there is an occupant on the seat or not. Reference numeral 4002 denotes seat occupant presence judging means to judge whether there is an occupant in each of the seats. This seat occupant presence judging means 4002 judges, based on the result of detection by the seat occupant detecting means 4001, that there is no occupant in the seat which is occupied by luggage only.

Reference numeral 4003 denotes a position sensor (not shown) which judges the posture, physical shape, or the like of an occupant in the seat which has been judged by the seat occupant detecting means 4001 to have an occupant. Reference numeral 4004 denotes display control means which, based on the result outputted from the seat occupant presence judging means 4002 and the seat occupant status judging means 4003, controls to make a display on the display 106, 220 in the form of a list. Based on the control of this display control means 4004, a display in the form of a list is made on the display 106, 220 as shown in FIG. 41. The user confirms this content and operates for selection and, based on this operation, set value selecting means 4006 selects a predetermined set value from the movement set value stored in memory means 4007, which is described in more detail hereinafter, and outputs this set value. Reference numeral 4007 denotes the memory means which stores therein for each of the positions of the seats 120, 130 provided inside the motor vehicle compartment as shown in FIG. 12: the direction and distance of the movement of the wheel 201; a set value as to whether the display 220 provided in the central console unit 200 shall be projected above the upper surface of the central console unit 200; and a set value as to whether the device operation control part 230 provided in the central console unit 200 shall be projected above the upper surface of the central console unit 200 or not, while keeping a correlation among the seat positions, the direction, the distance and the values.

Reference numeral 4008 denotes movement control means which moves the central console unit 200 defending on a movement set value, a display set value as display means projection set value, and a device operation control part set value as device operation control means projection set value as selected from the memory means 4007 and as outputted from the set value selecting means 4006, to thereby project the display 220 and the device operation control part 230 above the upper surface of the casing 210 or house them into the casing 210. Reference numeral 4009 denotes moving means in which, based on the control signal outputted by the movement control means 4008, the central console unit 200 is moved in the A direction or in the B direction as shown in FIG. 1 to thereby project the display 220 and the device operation control part 230 above the upper surface of the casing 210 or house them into the casing 210. This moving means 4009 is made up, in the same manner as described with reference to the first embodiment, of: a wheel 201; an engaging part 202 which is formed in the periphery of this wheel 201; a driving part (not shown) which is housed inside the wheel 201; a rail 110; an engaging part 111 which is formed inside the groove of the rail 110; and a driving mechanism for the display 220 and the driving mechanism for the device operation control part 230.

Reference numeral 4005 denotes air bag control means which, based on the result outputted from the seat occupant presence judging means 4002 and the seat occupant status judging means 4003, controls the operation of an air bag (not shown) provided inside the motor vehicle. The air bags which are the objects to be controlled by this air bag control means 4005 are called advanced air bag apparatuses.

Next, the flow of operations will be described with reference to FIG. 42.

When the ignition of the motor vehicle is switched on, the operation of the apparatus is started (step 4200). The occupant in each of the seats inside the motor vehicle is detected by the seat occupant detecting means 4001 (step 4201). After processing this step 4201, the seat occupant presence judging means judges as to whether the presence or absence of the seat occupants has been judged or not (step 4202). If it is judged that the presence or absence in the seats has been judged at step 4202, the display control means 4004 causes the displays 106, 220 to display a list of seat occupants (step 4203). A judgement is made as to whether the user has selected a position corresponding to the seat to which the central console unit 200 is to be moved out of the displayed list displayed at this step 4203 (step 4204). If a judgement is made at this step 4204 that the selection has been made, the set value selection means 4006 selects each of the set values corresponding to this selection from the memory means 4007. Based on this selected value, the movement control means 4008 moves the moving means 4009 (step 4205). After the processing of this step 4205, a judgement is made as to whether the movement has been finished or not (step 4206). If the movement is judged to have been finished at step 4206, the procedure returns to step 4201 and repeats the processing.

If a judgement is made at step 4202 that the presence or absence of the seat occupants has not been judged yet, the procedure returns once again to step 4201 and repeats the processing.

In addition, if a judgement is made at step 4202 that the presence or absence of the seat occupants has been made, the procedure proceeds to step 4203 and also outputs the result of judging of the seat occupant presence judging means to the air bag control means 4005, so that the air bag apparatus becomes ready for operation (step 4207). Thereafter, a judgement is made as to whether the ignition has been switched off or not (step 4208). If, at this step 4208, the ignition switch is judged to have been switched off, the operation control of the air bag apparatus is finished (step 4209).

Then, if the set value selection means 4006 judges at step 4204 that no selection operation has been made, the procedure returns to step 4203 once again and repeats the processing.

If a judgement is made at step 4206 that the movement of the central console unit 200 has not been finished, the procedure returns to step 4206 and repeats the processing.

In addition, if a judgement is made at step 4208 that the ignition has not been switched off, the procedure returns to step 4208 once again and continues the state for the air bag apparatus to be ready for operation.

As described above, the seat occupation information intended for use by the air bag apparatus is effectively utilized for the movement setting of the device disposing apparatus for a mobile body. Therefore, the troublesome operations to be done by the user at the time of moving the central console unit 200 can be reduced to the minimum-required operations. The operability of the apparatus and the convenience of the apparatus are further improved.

Ninth Embodiment

Figure 43:
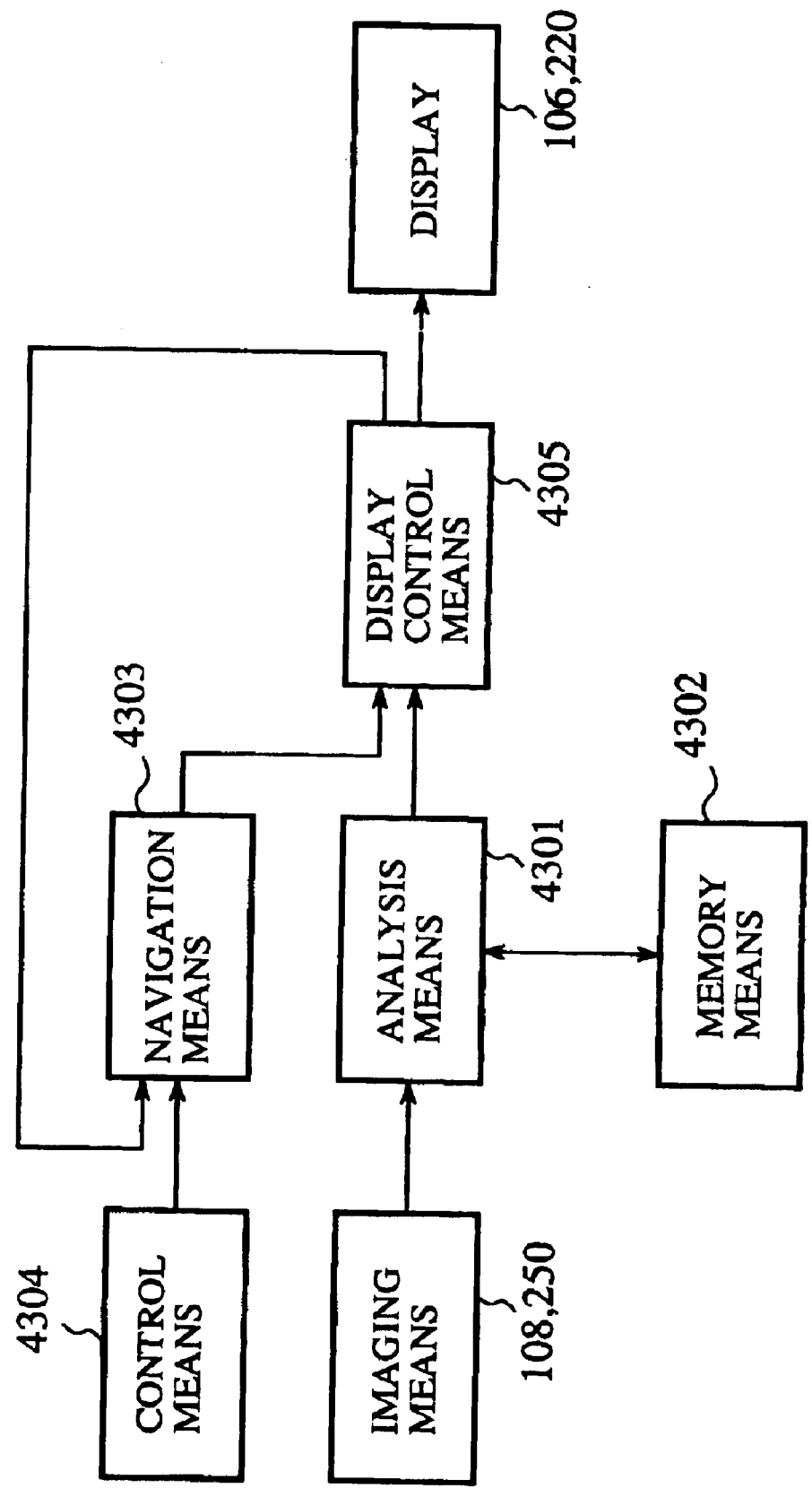
FIG. 43 is a block diagram showing an arrangement of an information processing equipment for a mobile body according to a ninth embodiment.
Figure 44:
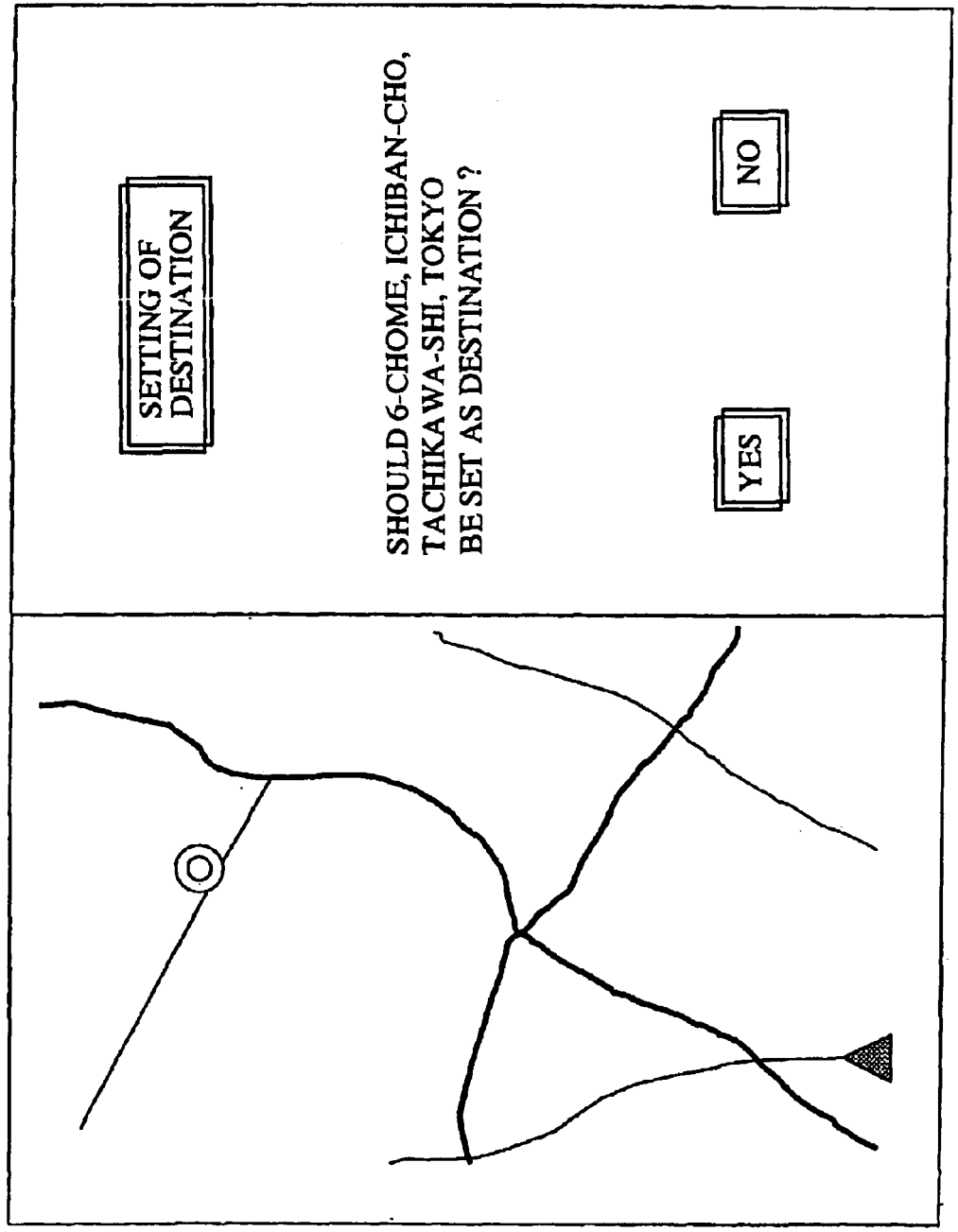
FIG. 44 is an explanatory drawing showing an example of display of FIG. 43.
Figure 45:
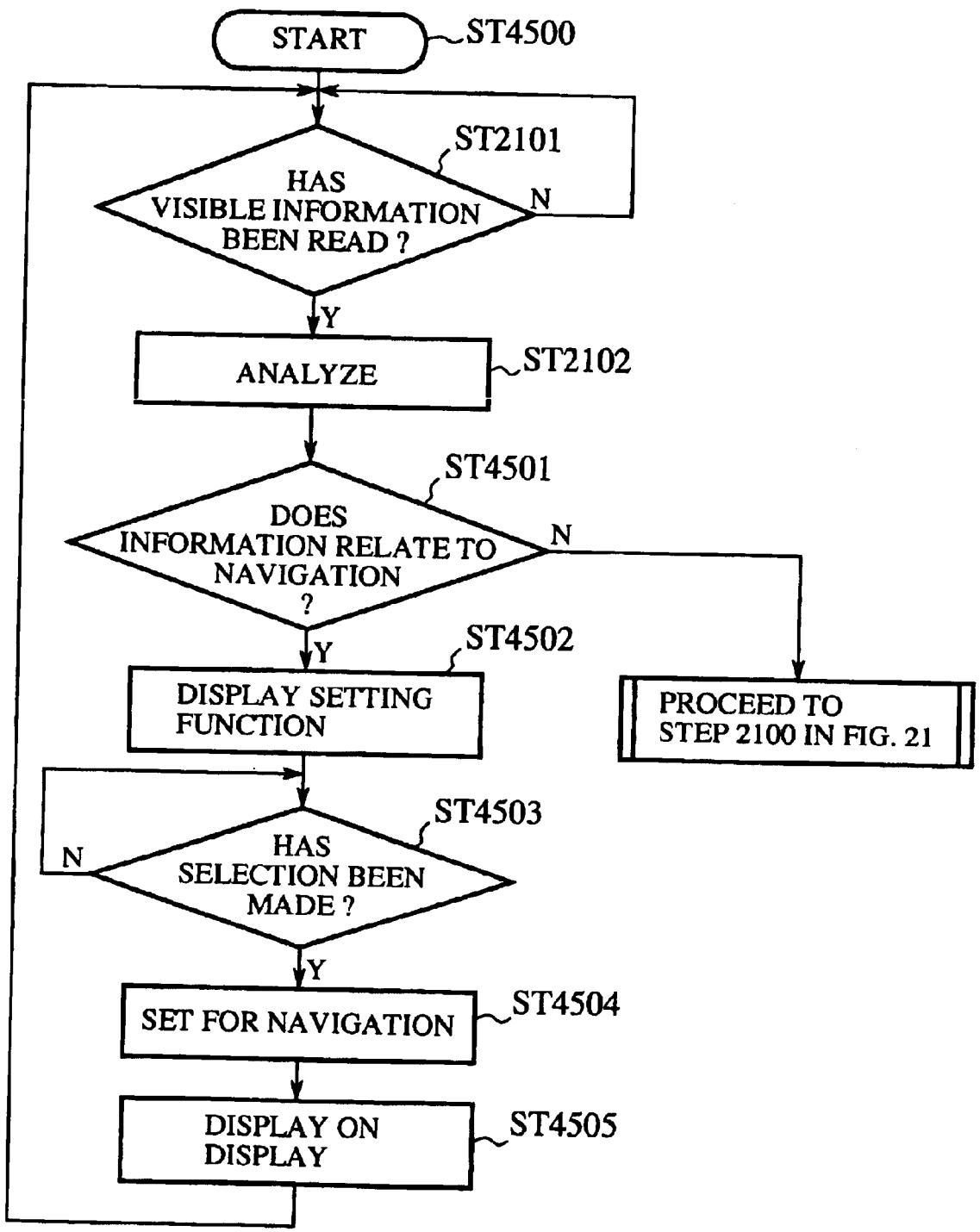
FIG. 45 is a flow chart showing the flow of operations in the information processing equipment for a mobile body according to a ninth embodiment.
Figure 46:
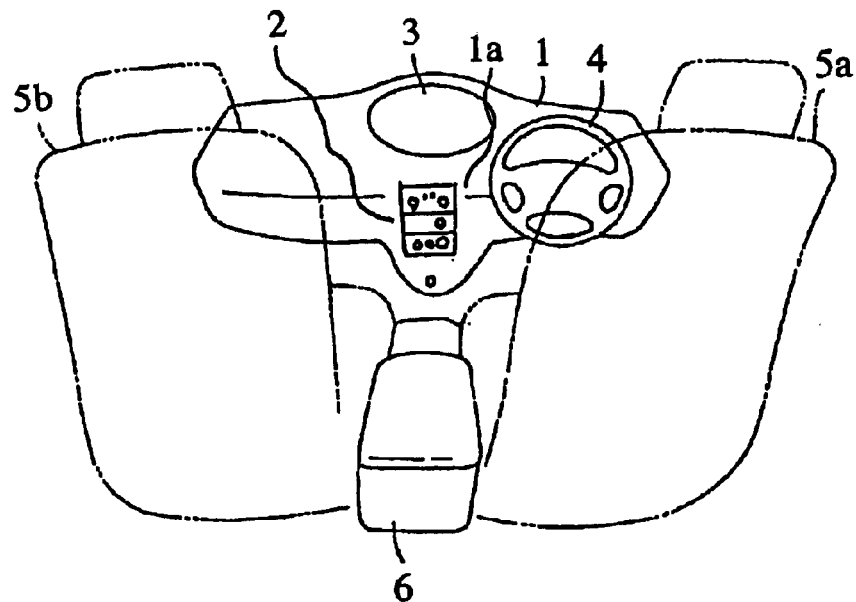
FIG. 46 is a detail drawing showing essential parts inside the conventional mobile body.
Figure 47:
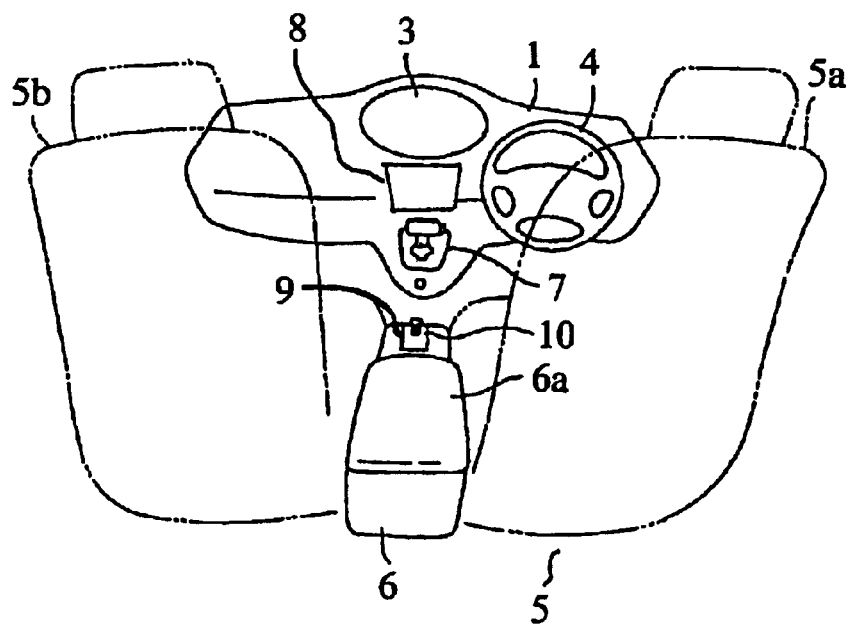
FIG. 47 is a detail drawing showing essential parts inside the conventional mobile body.
Figure 48:
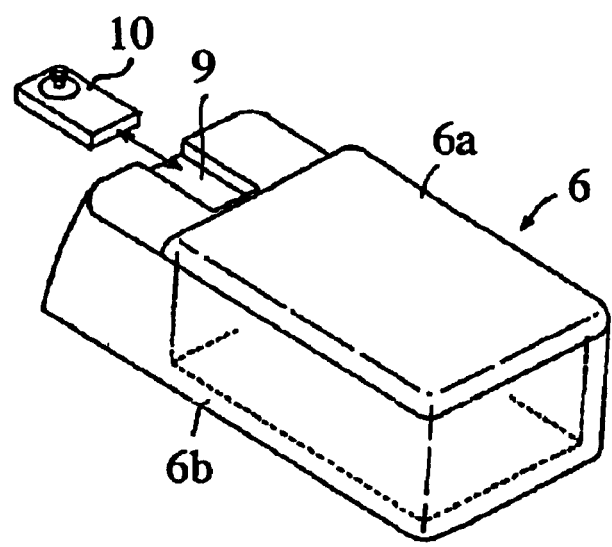
FIG. 48 is a schematic drawing showing an arrangement of essential parts provided inside the conventional mobile body.
Figure 49:
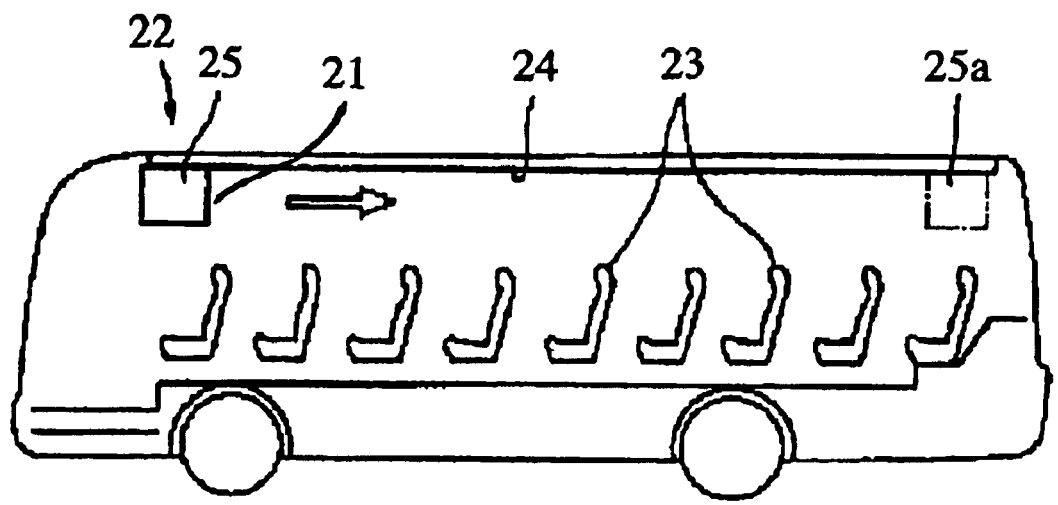
FIG. 49 is a schematic drawing showing an arrangement of essential parts provided inside the conventional mobile body.

A device disposing apparatus for a mobile body using a display for a mobile body according to the ninth embodiment of the present invention will be described with reference to FIGS. 43 through 45. FIG. 43 is a block diagram showing an arrangement in which a navigation apparatus is provided in an information processing equipment for a mobile body. FIG. 44 is an explanatory drawing showing an example of display to be displayed on the apparatus in FIG. 43. FIG. 45 is a flow chart showing the flow of operations in the information processing equipment for a mobile body shown in FIG. 43.

In FIG. 43, the information source such as a receipt, or the like, is captured by the camera 108 or the camera 250 which serves as imaging means and is displayed on the display 106 provided in the instrument panel 102 or on the display 220 provided in the central console unit 200. Reference numeral 4301 denotes analysis means for analyzing the visible information obtained by the camera 108, 250 and outputted in comparison with a dictionary information in which is illustrated visible information for the purpose of analyzing the visible information as obtained by the camera 105, 250 and stored in memory means. Reference numeral 4302 denotes the memory means which stores therein the dictionary information as the visible information which is made an object of comparison when the analysis means 4301 analyzes the contents of the visible information obtained by the camera 108, 250. This memory means 4302 stores therein, as described in the first embodiment, the dictionary information required in recognizing the characters such as figures, marks, alphabets, hiragana characters, katakana characters, Chinese characters, numerals, or the like.

Reference numeral 4303 denotes navigation means which displays the map information or the like of the present position of one's own motor vehicle and the neighborhood of the present position on the display 106 or the display 220. This navigation means 4303 is capable of performing the setting of the destination, the searching of routes to the destination, guiding to the destination, or the like. Reference numeral 4304 denotes device operation control means to perform the predetermined operations to the navigation means 4303. This device operation control means 4304 is operated to determine the setting of the destination, route searching, or the like.

Reference numeral 4305 denotes display control means to cause the display 106 or the display 220 to display based on the result of analysis by the analysis means 4301, the present position information from the navigation means 4303, or the like. The display control signal of this display control means 4305 is outputted to the navigation means 4303. Upon receipt of this display control signal, the navigation means 4303 outputs again to the display control means 4305 the result of analysis by the analysis means 4301 after reflecting thereupon the setting of the destination, the searching of the routes, the setting of the route guides, or the like, and displays on the display 106 or the display 220.

A description will now be made with reference to FIG. 20 which is referred to in the description about the first embodiment. Suppose an example in which one has a receipt of a favorite shop and a resort is made to the navigation means 4303 for the route guiding to this shop. The contents of the receipt are read by the camera 128 or 250 and analysis of characters or the like is performed by the analysis means 4301. At this time, since the receipt has a description of an address of 6-chome, Ichiban-cho, Tachikawa-shi, Tokyo as shown in reference numeral 2002, the navigation means 4303 causes the user to confirm whether this address data shall be set as the destination or not. The example of display at this time on the display 106 or the display 220 is as shown in FIG. 44. If "YES" is selected, the address as described on the receipt is set as the destination. Without the inputting of the address, or the like, on the part of the user, the setting of the destination, the route searching to the destination after the setting of the destination, and the route guiding can be performed.

The flow of operations will be described with reference to FIG. 45.

When the ignition is switched on, the operation of the apparatus is started (step 4500). A judgement is made as to whether the character information on the receipt as the visible information has been read by the camera 128, 250 or not (step 2102). If a judgement is made that the information has been read, the analysis means 4301 analyses to which of the character information stored in the memory means the read character information corresponds (step 2102). At this step 2102, the analysis means 4301 judges as to whether the analysed contents are the related information used in the navigation means 4303 or not (step 4501). If a judgement has been made at this step 4501 that the information relates to the navigation means 4303, the setting function to make the setting in the navigation means 4303 is displayed (step 4502). The example displayed at this step 4502 is the one shown in FIG. 44.

Then, the navigation means 4303 judges as to whether the selecting operation has been made or not regarding the contents displayed at step 4502 (step 4503). This selecting operation means the selection of YES or NO in the case of the display as shown in FIG. 44.

If the selecting operation is judged to have been made at this step 4503, the navigation means 4303 makes the setting operation (step 4504). If the contents are as shown in FIG. 44, the setting operation is made regarding the destination.

Then, at step 4504, the display control means 4305 displays the contents containing therein the contents of the performed setting operation on the display 106 or the display 220 (step 4505). After the processing of this step 4505, the procedure returns to step 2101 and thereafter repeats the processing.

If a judgement is made at step 2101 that the visible information has not been read, the procedure returns to step 2101 once again to repeat the processing until the reading of the visible information has been finished.

If the navigation means 4303 has judged at step 4501 that the characters are not the character information according to the set value, the procedure proceeds to step 2100 as shown in FIG. 21 (step 4506).

In addition, if a judgement is made at step 4503 that the selecting operation has not been made, the procedure returns to step 4503 once again and repeats the processing.

As described above, the information according to the navigation function is analysed from the visible information in the receipt or the like, thereby facilitating the selecting operation. Therefore, the setting operation for the navigation is extremely simplified and the convenience on the part of the user as well as the operability of the apparatus are improved.

Tenth Embodiment

The information processing equipment for a mobile body according to the tenth embodiment of the present invention will be described.

In the above-described ninth embodiment, a description has been made about an example in which, if one has a receipt, a map, or the like, of a favorite shop, the position of the shop is stored in the navigation apparatus disposed in the motor vehicle so that the information can be readily available in the future driving. Alternatively, an arrangement may also be made that the calculation is made of the expenses paid during the driving.

In other words, the amounts, or the like, of the receipt shown in FIG. 22 are summed and the item-wise details and the expenses paid therefor may be displayed in the form of a list. Have been taken such an arrangement, this list can be used as a substitute for a housekeeping account book. The range of use of the apparatus can thus be enlarged and the gender and age for which this apparatus is used may also be extended.

Eleventh Embodiment

A device disposing apparatus for a mobile body according to the eleventh embodiment of the present invention will be described.

In the above-described embodiments 1 and 2, a description has been made about an arrangement in which the central console unit 200, 2200 is automatically moved by the operation by the user. It may also be arranged that, when the power source of the motor vehicle is switched off, i.e., when the ignition is switched off, the central console unit 200, 2200 is automatically returned to a position set in advance, i.e., to the default position. According to the above-described arrangement, the position set in advance is the position which is convenient to the user. Therefore, the position of the central console unit 200, 2200 changed as a result of the movement thereof can be reset when the ignition of the motor vehicle is switched off so as to be automatically moved to the default position. In this manner, the user is not obliged to move the central console unit 200, 2200 whenever the user gets onboard the motor vehicle, resulting in an improvement in the convenience on the part of the user.

Twelfth Embodiment

The device disposing apparatus for a mobile body according to the twelfth embodiment of the present invention will be described.

In the above-described eleventh embodiment, a description has been made about an arrangement in which, when the power source of the motor vehicle is switched off, i.e., when the ignition switch is switched off, the central console unit 200, 2200 is automatically moved to a position set in advance, i.e., to the default position. The default position may be set to the seat of the driver who is the passenger having the highest frequency of using the motor vehicle, i.e., to the position between the driver's seat and the front-seat passenger's seat.

Since the position corresponding to the seat of the driver who has the highest frequency of using the motor vehicle is set in advance as the default position, the convenience of the driver is improved.

Thirteenth Embodiment

The device disposing apparatus for a mobile body according to the thirteenth embodiment of the present invention will be described.

In the above-described the first through twelfth embodiments, a description has not been made about the relationship between the information on the display 106 provided in the instrument panel 102 and the information on the display 220, the display 2250 provided in the central console unit 200, 2200 as well as on the display 3020 provided in the display unit 3000. These displays may be each provided with a transmitter and a receiver.

In other words, an arrangement may be made such that the contents displayed on one of the displays is displayed on the other of the displays by using the respective transmitters and receivers. When there are many passengers in the motor vehicle, all members can share the same information. The range of utilization of the apparatus can thus be increased and the convenience of the users can be improved.

The above-described transmitters and receivers may be the ones using the infrared rays or the ones using the technology of Bluetooth.

Fourteenth Embodiment

The device disposing apparatus for a mobile body according to fourteenth embodiment of the present invention will be described.

In the above-d scribed first and second embodiments, a description has been made about an arrangement in which there are stored three kinds of set values of the central console unit 200, 2200, i.e.: the movement set value of the central console unit 200, 2200; the projection set value of the display; and the projection set value of the device operation control part. Each set value may of course be constituted by only one kind of set value. In such an arrangement, the memory capacity of the memory means is minimized to the maximum extent possible, and the convenience of the apparatus can be obtained.

INDUSTRIAL APPLICABILITY

As described above, the device disposing apparatus for a mobile body according to the present invention is suitable for use as a device disposing apparatus for a mobile body in which, in a mobile body such as a motor vehicle, audio devices and video reproducing devices are disposed so as to be movable in a back and forth direction of the motor vehicle.

What is claimed is:

1. A device disposing apparatus for a mobile body comprising:
    disposing means which is provided in a position between a driver's seat and a front-passenger's seat in the mobile body and is able to dispose desired devices;
    guide means for movably guiding said disposing means in a back and forth direction relative to the mobile body;
    moving means for moving said disposing means along said guide means based on a command;
    memory means having stored therein in correspondence with each of seat positions of a plurality of seats provided in the mobile body and a movement set value for positioning said disposing means to a predetermined position by said moving means;
    operating means for outputting a command signal so as to move said disposing means;
    set value selecting means for selecting a predetermined movement set value from said memory means based on a command output from said operating means; and
    movement control means for movement controlling such that said moving means moves said disposing means along said guide means to the predetermined position based on the movement set value selected by said set value selecting means.

2. The device disposing apparatus for a mobile body according to claim 1, further comprising display means which is housed inside said disposing means and projected therefrom,
    wherein said memory means stores therein, together with the movement set value, a display means projection set value which is set in correspondence with each of the seats as to whether said display means should be projected or not,
    wherein said set value selecting means selects the predetermined movement set value and the display means projection set value from said memory means, and
    wherein said movement control means moves said disposing means by said moving means along said guide means for positioning said disposing means to the predetermined position based on the movement set value and the display means projection set value selected by said set value selecting means and controls said display means so as to be projected to a predetermined position or to be housed.

3. The device disposing apparatus for a mobile body according to claim 2, wherein said display means comprises angle adjusting means for enabling it to adjust an angle thereof relative to supporting means which supports said display means when said display means is projected from said disposing means.

4. The device disposing apparatus for a mobile body according to claim 1, wherein said disposing means comprises device operation control means which projected from a surface of a casing of said disposing means and operates a predetermined device,
    wherein said memory means stores therein, together with the movement set value, a device operation control means projection set value which is set in correspondence with each of the seats as to whether said device operation control means should be projected or not,
    wherein said set value selecting means selects the predetermined movement set value and the device operation control means projection set value from said memory means, and
    wherein said movement control means moves said disposing means by said moving means along said guide means for positioning said disposing means to the predetermined position based on the movement set value and the device operation control means projection set value selected by said set value selecting means and controls said device operation control means so as to be projected to a predetermined position or to be housed.

5. The device disposing apparatus for a mobile body according to claim 1, wherein a housing space is formed under equipment disposed in a front of the mobile body so as to contain at least a part of said disposing means, and wherein said guide means guides said disposing means to the housing space.

6. The device disposing apparatus for a mobile body according to claim 1, further comprising second operating means for each of the seats provided in the mobile body and wherein, when said moving means moves said disposing means to position along said guide means, a command is given by one of said operating means and said second operating means.

7. The device disposing apparatus for a mobile body according to claim 5,
    wherein said disposing means comprises a housing for housing therein display means, said display means being disposed so as to be projected from said disposing means,
    wherein said memory means stores therein, together with the movement set value, a display means projection set value which is set in correspondence with each of the seats as to whether said display means should be projected or not,
    wher in said set value selecting means selects the predetermined movement set value and the display means projection set value from said memory means, and
    wherein said movement control means moves said disposing means by said moving means along said guide means for positioning said disposing means to the predetermined position based on the movement set value and the display means projection set value selected by said set value selecting means and controls said display means so as to be projected to a predetermined position or to be housed and, when said display means is guided to the housing space, said display means is housed inside said disposing means so as to display only by a display disposed in a front of the mobile body.

8. A device disposing apparatus for a mobile body comprising:
    disposing means which is provided in a position between a driver's seat and a front-passenger's seat in the mobile body and disposes desired devices, said disposing means comprising display means which is housed inside thereof and projected therefrom, and device operation control means which is projected from a surface of a casing of said disposing means and operates a predetermined device;

guide means for movably guiding said disposing means in a back and forth direction relative to the mobile body;

moving means for moving said disposing means along said guide means based on a command;

memory means having stored therein in correspondence with each of seat positions of a plurality of seats provided in the mobile body, a movement set value of said disposing means for positioning said disposing means to a predetermined position by said moving means, a display means projection set value to set as to whether said display means should be projected or not, and a device operation control means projection set value to set as to whether said device operation control means should be projected or not;

set value selecting means for selecting a predetermined movement set value, a predetermined display means projection set value, and a predetermined device operation control means projection set value from said memory means based on the command, and movement control means which controls such that said moving means moves said disposing means along said guide means to the predetermined position and that said display means and said device operation control means are projected to a predetermined position or housed inside said disposing means based on the movement set value, the display means projection set value, and the device operation control means projection set value selected by said set value selecting means.

9. A device disposing apparatus for a mobile body comprising:

disposing means which is provided in a position between a driver's seat and a front-passenger's seat in the mobile body and disposes desired devices, said disposing means comprising display means which is housed inside thereof and projected therefrom, and device operation control means which is projected from a surface of a casing of said disposing means and operates a predetermined device;

said mobile body having in a front thereof a housing space into which at least a part of said disposing means housed;

guide means for movably guiding said disposing means in a back and forth dir ction relative to the mobile body and guiding said disposing means to the housing space;

moving means for moving said disposing means along said guide means based on a command;

memory means having stored therein in correspondence with each of seat positions of a plurality of seats provided in the mobile body, a movement set value of said disposing means for positioning said disposing means to a predetermined position by said moving means, a display means projection set value to set as to whether said display means should be projected or not, and a device operation control means projection set value to set as to whether said device operation control means should be projected or not;

set value selecting means for selecting a predetermined movement set value, the display means projection set value, and the device operation control means projection set value from said memory means based on the command;

movement control means which controls such that said moving means moves said disposing means along said guide means to a predetermined position and that said display means and said device operation control means are projected to a predetermined position or housed inside said disposing means based on the movement set value, the display means projection set value, and the device operation control means projection set value selected by said set value selecting means wherein, when said display means is guided by said moving means to the housing space, said display means is housed inside said disposing means so as to display only by a display disposed in a front of the mobile body.

10. The device disposing apparatus for a mobile body according to claim 9, wherein an output signal of a device disposed in said disposing means is converted to a radio signal and, based on this converted radio signal, predetermined information is displayed on said display disposed in a front of the mobile body when visible information is contained therein.

11. The device disposing apparatus for a mobile body according to claim 9, wherein, when said disposing means is moved, the information indicative of the plurality of seat positions is displayed in a list on said display means, a desired seat is selected from the list, a movement set value and a display means projection set value as well as a device operation control means projection set value in accordance with this selected seat position are selected from said memory means, and said moving means moves said disposing means to the predetermined position of said guide means.

12. The device disposing apparatus for a mobile body according to claim 11, further comprising seat occupant presence judging means for judging whether an occupant is seated in each of the seats provided inside the mobile body, wherein the seat position is displayed on said display means if judged that an occupant is seated by the seat occupant presence judging means.

13. The device disposing apparatus for a mobile body according to claim 11, further comprising seated passenger protection operation control means for performing a protecting operation control intended for a seat with a seated passenger among all the seats provided inside the mobile body, wherein information of only the seat that is an objective of protecting operation by said seated passenger protection operation control means is displayed in the list on said display means.

* * * * *